(12) United States Patent
Zavadsky et al.

(10) Patent No.: US 9,367,828 B2
(45) Date of Patent: *Jun. 14, 2016

(54) FORWARD-PATH DIGITAL SUMMATION IN DIGITAL RADIO FREQUENCY TRANSPORT

(71) Applicant: ADC Telecommunications, Inc., Shakopee, MN (US)

(72) Inventors: Dean Zavadsky, Shakopee, MN (US); Jody Forland, St. Bonifacius, MN (US); Larry G. Fischer, Waseca, MN (US); Philip M. Wala, Savage, MN (US)

(73) Assignee: CommScope Technologies LLC, Hickory, NC (US)

( * ) Notice: Subject to any disclaimer, the term of this patent is extended or adjusted under 35 U.S.C. 154(b) by 66 days.

This patent is subject to a terminal disclaimer.

(21) Appl. No.: 14/090,139

(22) Filed: Nov. 26, 2013

(65) Prior Publication Data

US 2014/0146906 A1   May 29, 2014

Related U.S. Application Data

(60) Provisional application No. 61/729,792, filed on Nov. 26, 2012.

(51) Int. Cl.
*H04B 7/02* (2006.01)
*G06Q 10/08* (2012.01)

(52) U.S. Cl.
CPC .............. *G06Q 10/087* (2013.01); *H04B 7/022* (2013.01)

(58) Field of Classification Search
None
See application file for complete search history.

(56) References Cited

U.S. PATENT DOCUMENTS

| 3,908,114 | A | 9/1975 | White |
| 7,688,135 | B2 | 3/2010 | Kim et al. |
| 8,050,291 | B1 | 11/2011 | Prasad et al. |
| 8,064,850 | B2 | 11/2011 | Yang et al. |
| 8,149,950 | B2 | 4/2012 | Kim et al. |
| 8,224,266 | B2 | 7/2012 | Liu et al. |
| 8,274,332 | B2 | 9/2012 | Cho et al. |
| 8,326,238 | B2 | 12/2012 | Yang et al. |
| 8,351,877 | B2 | 1/2013 | Kim et al. |
| 8,380,143 | B2 | 2/2013 | Yang et al. |

(Continued)

FOREIGN PATENT DOCUMENTS

| WO | 2008076432 | 6/2008 |
| WO | 2012115843 | 8/2012 |

OTHER PUBLICATIONS

"Intel Heterogeneous Network Solution Brief", 2011, pp. 15, published at least as early as Dec. 2011, Publisher: Intel Corporation.

(Continued)

*Primary Examiner* — Frank Duong
(74) *Attorney, Agent, or Firm* — Foggs & Powers LLC

(57) ABSTRACT

A distributed antenna switch includes a plurality of first interfaces, each of the plurality of first interfaces configured to receive a downlink serialized data stream from a different network interface across a different first digital communication link; at least one second interface, the at least one second interface configured to communicate an aggregate downlink serialized data stream to a remote antenna unit over a second digital communication link; and wherein the distributed antenna switch is configured to aggregate the plurality of downlink serialized data streams from the different network interfaces into the aggregate downlink serialized data stream.

36 Claims, 49 Drawing Sheets

(56) References Cited

U.S. PATENT DOCUMENTS

| | | |
|---|---|---|
| 8,401,499 B2 | 3/2013 | Kim et al. |
| 8,467,747 B2 | 6/2013 | Kim et al. |
| 8,472,897 B1 | 6/2013 | Yang |
| 2005/0111475 A1 | 5/2005 | Borkowski et al. |
| 2005/0157675 A1 | 7/2005 | Feder et al. |
| 2006/0233188 A1 | 10/2006 | Oliver et al. |
| 2007/0241812 A1 | 10/2007 | Yang et al. |
| 2008/0174365 A1 | 7/2008 | Yang et al. |
| 2008/0265996 A1 | 10/2008 | Kim et al. |
| 2008/0284509 A1 | 11/2008 | Kim et al. |
| 2009/0085658 A1 | 4/2009 | Liu et al. |
| 2009/0096521 A1 | 4/2009 | Liu et al. |
| 2009/0285194 A1 | 11/2009 | Kim et al. |
| 2009/0307739 A1 | 12/2009 | Dean et al. |
| 2010/0177760 A1 | 7/2010 | Cannon et al. |
| 2010/0271957 A1 | 10/2010 | Stapleton et al. |
| 2010/0278530 A1 | 11/2010 | Kummetz et al. |
| 2010/0296816 A1 | 11/2010 | Larsen |
| 2011/0156815 A1 | 6/2011 | Kim et al. |
| 2011/0158081 A1 | 6/2011 | Wang et al. |
| 2011/0268449 A1 | 11/2011 | Berlin et al. |
| 2012/0027145 A1 | 2/2012 | Uyehara et al. |
| 2012/0039254 A1 | 2/2012 | Stapleton et al. |
| 2012/0039320 A1 | 2/2012 | Lemson et al. |
| 2012/0057572 A1 | 3/2012 | Evans et al. |
| 2012/0069880 A1 | 3/2012 | Lemson et al. |
| 2012/0135695 A1 | 5/2012 | Yang et al. |
| 2012/0147993 A1 | 6/2012 | Kim et al. |
| 2012/0154038 A1 | 6/2012 | Kim et al. |
| 2012/0155572 A1 | 6/2012 | Kim et al. |
| 2012/0230382 A1 | 9/2012 | Kim et al. |
| 2012/0263152 A1 | 10/2012 | Fischer et al. |
| 2012/0281565 A1 | 11/2012 | Sauer |
| 2012/0281622 A1 | 11/2012 | Saban et al. |
| 2012/0314797 A1* | 12/2012 | Kummetz et al. ............ 375/295 |
| 2013/0009707 A1 | 1/2013 | Kim et al. |
| 2013/0077713 A1 | 3/2013 | Kim et al. |
| 2013/0094612 A1 | 4/2013 | Kim et al. |
| 2013/0114486 A1 | 5/2013 | Spedaliere et al. |
| 2013/0114963 A1 | 5/2013 | Stapleton et al. |
| 2013/0128810 A1 | 5/2013 | Lee et al. |
| 2013/0147550 A1 | 6/2013 | Yang et al. |
| 2014/0146797 A1 | 5/2014 | Zavadsky et al. |
| 2014/0146905 A1 | 5/2014 | Zavadksy et al. |

OTHER PUBLICATIONS

U.S. Patent Office, "Office Action for U.S. Appl. No. 14/090,129", Nov. 24, 2014, pp. 1-45, Published in: US.

International Searching Authority, "International Search Report and Written Opinion from PCT Application No. PCT/US2013/071960 mailed Mar. 14, 2014", "from PCT Counterpart of U.S. Appl. No. 14/090,129", Mar. 14, 2014, pp. 1-13, Published in: WO.

International Searching Authority, "International Search Report and Written Opinion from PCT Application No. PCT/US2013/071967 mailed Mar. 10, 2014", "from PCT Counterpart of U.S. Appl. No. 14/090,135", Mar. 10, 2014, pp. 1-9, Published in: WO.

International Searching Authority, "International Search Report and Written Opinion from PCT Application No. PCT/US2013/071977 mailed Mar. 20, 2014", "from PCT Counterpart of U.S. Appl. No. 14/090,139", Mar. 20, 2014, pp. 1-14, Published in: WO.

U.S. Patent Office, "Office Action", "from U.S. Appl. No. 14/090,129", Sep. 14, 2015, pp. 1-35, Published in: US.

U.S. Patent Office, "Final Office Action", "from U.S. Appl. No. 14/090,129", May 14, 2015, pp. 1-34, Published in: US.

U.S. Patent Office, Advisory Action, from U.S. Appl. No. 14/090,129, Jul. 22, 2015, pp. 1-3.

U.S. Patent Office, Notice of Allowance, from U.S. Appl. No. 14/090,129, Mar. 2, 2016, pp. 1-20, Published in: US.

* cited by examiner

FORWARD-PATH DIGITAL SUMMATION IN DIGITAL RADIO FREQUENCY TRANSPORT

CROSS-REFERENCE TO RELATED APPLICATIONS

This application claims the benefit of U.S. Provisional Patent Application Ser. No. 61/729,792 filed on Nov. 26, 2012, which is hereby incorporated herein by reference.

This application is related to the following United States patent applications, all of which are hereby incorporated herein by reference:

U.S. Provisional Patent Application Ser. No. 61/729,786 filed on Nov. 26, 2012 entitled "FLEXIBLE, RECONFIGURABLE MULTIPOINT-TO-MULTIPOINT DIGITAL RADIO FREQUENCY TRANSPORT ARCHITECTURE", which is hereby incorporated herein by reference; and U.S. Provisional Patent Application Ser. No. 61/729,789 filed on Nov. 26, 2012 entitled "TIMESLOT MAPPING AND/OR AGGREGATION ELEMENT FOR DIGITAL RADIO FREQUENCY TRANSPORT ARCHITECTURE", which is hereby incorporated herein by reference.

BACKGROUND

Distributed Antenna Systems (DAS) are used to distribute wireless signal coverage into building or other substantially closed environments. For example, a DAS may distribute antennas within a building. The antennas are typically connected to a radio frequency (RF) signal source, such as a service provider. Various methods of transporting the RF signal from the RF signal source to the antenna have been implemented in the art.

SUMMARY

A distributed antenna switch includes a plurality of first interfaces, each of the plurality of first interfaces configured to receive a downlink serialized data stream from a different network interface across a different first digital communication link; at least one second interface, the at least one second interface configured to communicate an aggregate downlink serialized data stream to a remote antenna unit over a second digital communication link; and wherein the distributed antenna switch is configured to aggregate the plurality of downlink serialized data streams from the different network interfaces into the aggregate downlink serialized data stream.

DRAWINGS

Understanding that the drawings depict only exemplary embodiments and are not therefore to be considered limiting in scope, the exemplary embodiments will be described with additional specificity and detail through the use of the accompanying drawings, in which.

In accordance with common practice, the various described features are not drawn to scale but are drawn to emphasize specific features relevant to the exemplary embodiments. Like reference numbers and designations in the various drawings indicate like elements.

DETAILED DESCRIPTION

Figure 1:
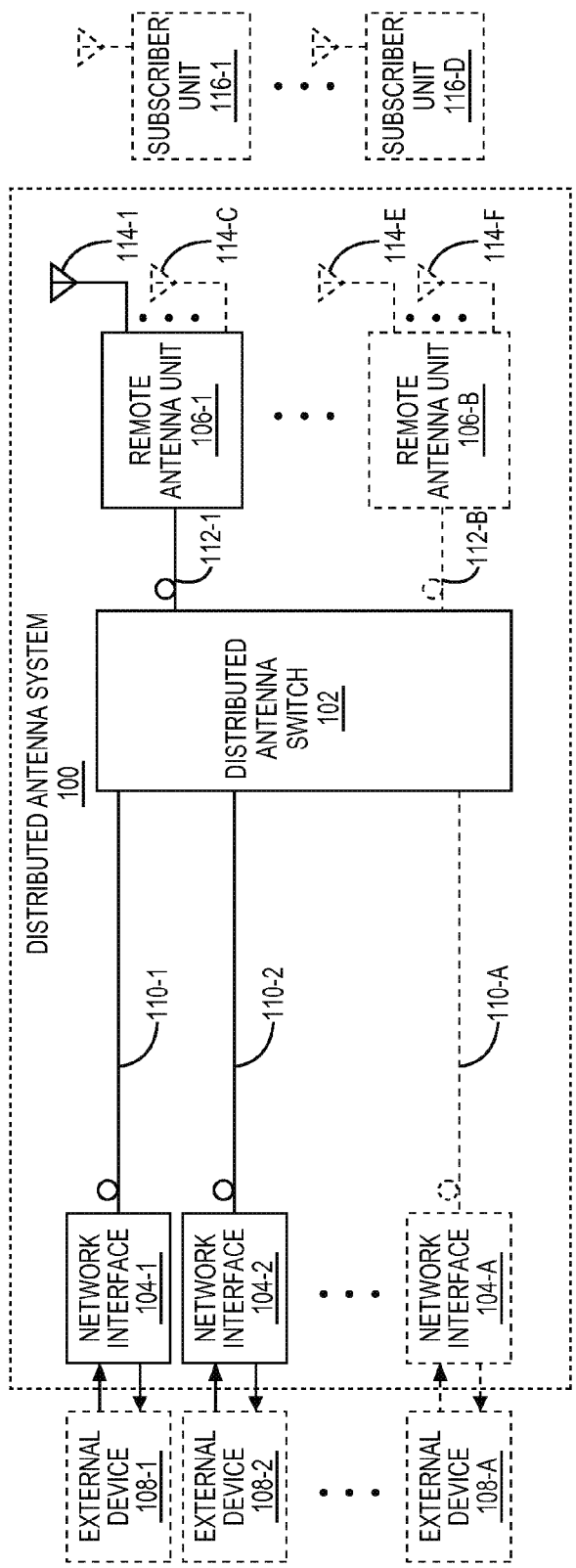
FIG. 1 is a block diagram of one embodiment of an exemplary distributed antenna system.

In the following detailed description, reference is made to the accompanying drawings that form a part hereof, and in which is shown by way of illustration specific illustrative embodiments. However, it is to be understood that other embodiments may be utilized and that logical, mechanical, and electrical changes may be made. Furthermore, the method presented in the drawing figures and the specification is not to be construed as limiting the order in which the individual steps may be performed. The following detailed description is, therefore, not to be taken in a limiting sense.

The embodiments described below describe a distributed antenna system and components within the distributed antenna system. The various components of the distributed antenna system communicate using serialized data streams. In exemplary embodiments, the serialized data stream use different communication rates in different portions of the distributed antenna system. Generally in the forward path, the distributed antenna system includes a single distributed antenna switch that receives a plurality of serialized data streams from a plurality of network interfaces and then routes data from various timeslots of the plurality of serialized data streams to various remote antenna units. Likewise in the reverse path, the single distributed antenna switch of the distributed antenna system receives serialized data streams from various remote antenna units and routes data from various timeslots of the serialized data streams to the plurality of network interfaces.

FIG. 1 is a block diagram of one exemplary embodiment of a digital distributed antenna system (DAS) 100 that includes a distributed antenna switch 102 communicatively coupled to a plurality of network interfaces 104 (including network interface 104-1, network interface 104-2, and any amount of optional network interfaces 104 through optional network interface 104-A) and at least one remote antenna unit 106 (including remote antenna unit 106-1 and any amount of optional remote antenna units 106 through optional remote antenna unit 106-B).

Each network interface 104 is communicatively coupled to an external device 108 that is configured to provide signals to be transported through the distributed antenna system 100 to the network interface 104. In the forward path, each network interface 104 is configured to receive signals from at least one external device 108. Specifically, network interface 104-1 is communicatively coupled to external device 108-1, network interface 104-2 is communicatively coupled to external device 108-2, and optional network interface 104-A is communicatively coupled to optional external device 108-A. Each network interface 104 is also communicatively coupled to the distributed antenna switch 102 across a digital communication link 110. Specifically, network interface 104-1 is communicatively coupled to a port of distributed antenna switch 102 across digital communication link 110-1, network interface 104-2 is communicatively coupled to a port of distributed antenna switch 102 across digital communication link 110-2, and optional network interface 104-A is communicatively coupled to a port of distributed antenna switch 102 across digital communication link 110-A. As described in more detail below, each network interface 104 is configured to convert signals from the external device 108 to which it is communicatively coupled into a downlink serialized data stream and further configured to communicate the downlink serialized data stream to the distributed antenna switch 102 (either directly or through other components of the distributed antenna system 100 (such as serial link interface units) described in detail below) across a respective digital communication link 110.

Similarly in the reverse path, in exemplary embodiments each network interface 104 is configured to receive uplink serialized data streams across a respective digital communication link 110. Each network interface 104 is further configured to convert the received uplink serialized data stream to signals formatted for the associated external device 108 and further configured to communicate the signals formatted for the associated external device 108 to the associated external device 108.

Distributed antenna switch 102 is configured to receive signals from the plurality of network interfaces 104 (including network interface 104-1 and network interface 104-2 and any amount of optional network interfaces 104 through optional network interface 104-A) across the plurality of digital communication links 110 (including digital communication link 110-1 and digital communication link 110-2 and any amount of optional digital communication link 110-1 through optional digital communication link 110-A). In the forward path, an exemplary embodiment of distributed antenna switch 102 is configured to aggregate the plurality of downlink serialized data streams received from the first plurality of digital communication links 110 into an aggregate downlink serialized data stream. In exemplary embodiments, distributed antenna switch 102 is configured to selectively aggregate some of the plurality of downlink serialized data streams into one or more aggregate downlink serialized data stream. For example, one aggregate data stream may include timeslots received from both network interface 104-1 and network interface 104-2, while another aggregate data stream may include timeslots received from optional network interface 104-3 (not shown) and optional network interface 104-A. Alternatively, one aggregate data stream may include timeslots received from both network interface 104-2, optional network interface 104-4, and optional network interface 104-A, while another aggregate data stream may include timeslots received from network interface 104-1, optional network interface 104-3, and optional network interface 104-5. In other embodiments, other combinations of data from serialized data streams are aggregated in different ways and other quantities of aggregate data streams are included. Distributed antenna switch 102 is further configured to communicate the one or more aggregate serialized data streams to one or more remote antenna units 106 across one or more digital communication link 112. In exemplary embodiments where data streams are selectively aggregated at the distributed antenna switch 102, the aggregate data streams can then be selectively communicated to various remote antenna units 106, thereby enabling the distributed antenna system 100 to selectively route traffic between network interfaces and remote antenna units in a number of different ways.

Similarly in the reverse path, in exemplary embodiments the distributed antenna switch 102 is configured to receive one or more uplink aggregate serial data stream across one or more digital communication link 112. The distributed antenna switch 102 is further configured to extract at least one uplink serialized data stream from the one or more uplink aggregate serial data stream. The distributed antenna switch is further configured to communicate the at least one uplink serialized data stream across at least one digital communication link 110 to at least one network interface 104.

Each remote antenna unit 106 is communicatively coupled to the distributed antenna switch 102 across a digital communication link 112. Specifically, remote antenna unit 106-1 is communicatively coupled to a port of the distributed antenna switch 102 across digital communication link 112-1 and optional remote antenna unit 106-B is communicatively coupled to a port of the distributed antenna switch 102 across digital communication link 112-B. Each remote antenna unit includes components configured for extracting at least one downlink serialized data stream from an aggregate downlink serialized data stream and components configured for aggregating at least one uplink serialized data stream into an aggregate uplink serialized data stream as well as at least one radio frequency converter configured to convert between at least one serialized data streams and at least one radio frequency band and at least one radio frequency transceiver and antenna 114 pair configured to transmit and receive signals in the at least one radio frequency band to at least one subscriber unit 116.

In the downstream, each remote antenna unit 106 is configured to extract at least one downlink serialized data stream from the downlink aggregate serialized data stream. Each remote antenna unit 106 is further configured to convert the at least one downlink serialized data stream into a downlink radio frequency (RF) signal in a radio frequency band. In exemplary embodiments, this may include digital to analog converters and oscillators. Each remote antenna unit 106 is further configured to transmit the downlink radio frequency signal in the radio frequency band to at least one subscriber unit using at least one radio frequency transceiver and antenna 114 pair. In a specific exemplary embodiment, remote antenna unit 106-1 is configured to extract at least one downlink serialized data stream from the downlink aggregate serialized data stream received from the distributed antenna switch 102 and further configured to convert the at least one downlink serialized data stream into a downlink radio frequency signal in a radio frequency band. Remote antenna unit 106-1 is further configured to transmit the downlink radio frequency signal in a radio frequency band using a radio frequency and antenna 114-1 pair to at least one subscriber unit 116-1. In exemplary embodiments, remote antenna unit 106-1 is configured to extract a plurality of downlink serialized data streams from the downlink aggregate serialized data stream received from the distributed antenna switch 102 and configured to convert the plurality of downlink serialized data streams to a plurality of downlink radio frequency signals. In exemplary embodiments with a plurality of radio frequency signals, the remote antenna unit 106-1 is further configured to transmit the downlink radio frequency signal in at least one radio frequency band to at least subscriber unit 116-1 using at least radio frequency transceiver and antenna 114-1 pair. In exemplary embodiments, the remote antenna unit 106-1 is configured to transmit one downlink radio frequency signal to one subscriber unit 116-1 using one antenna 114-1 and another radio frequency signal to another subscriber unit 116-D using another antenna 114-C. Other combinations of radio frequency transceiver and antenna 114 pairs are used to communication other combinations of radio frequency signals in other various radio frequency bands to various subscriber units 116.

Similarly in the reverse path, in exemplary embodiments each remote antenna unit 106 is configured to receive uplink radio frequency signals from at least one subscriber unit 116 using at least one radio frequency transceiver and antenna 114 pair. Each remote antenna unit 106 is further configured to convert the radio frequency signals to at least one uplink serialized data stream. Each remote antenna unit 106 is further configured to aggregate the at least one uplink serialized data stream into an aggregate uplink serialized data stream and further configured to communicate the aggregate uplink serialized data stream across at least one digital communication link 112 to the distributed antenna switch 102.

FIG. 2A-2D are block diagrams depicting exemplary embodiments of base station network interfaces 104 used in distributed antenna systems, such as exemplary distributed antenna system 100 described above. Each of FIGS. 2A-2D illustrates a different embodiment of a type of base station network interface 104, labeled 104A-104D respectively.

Figure 2A:
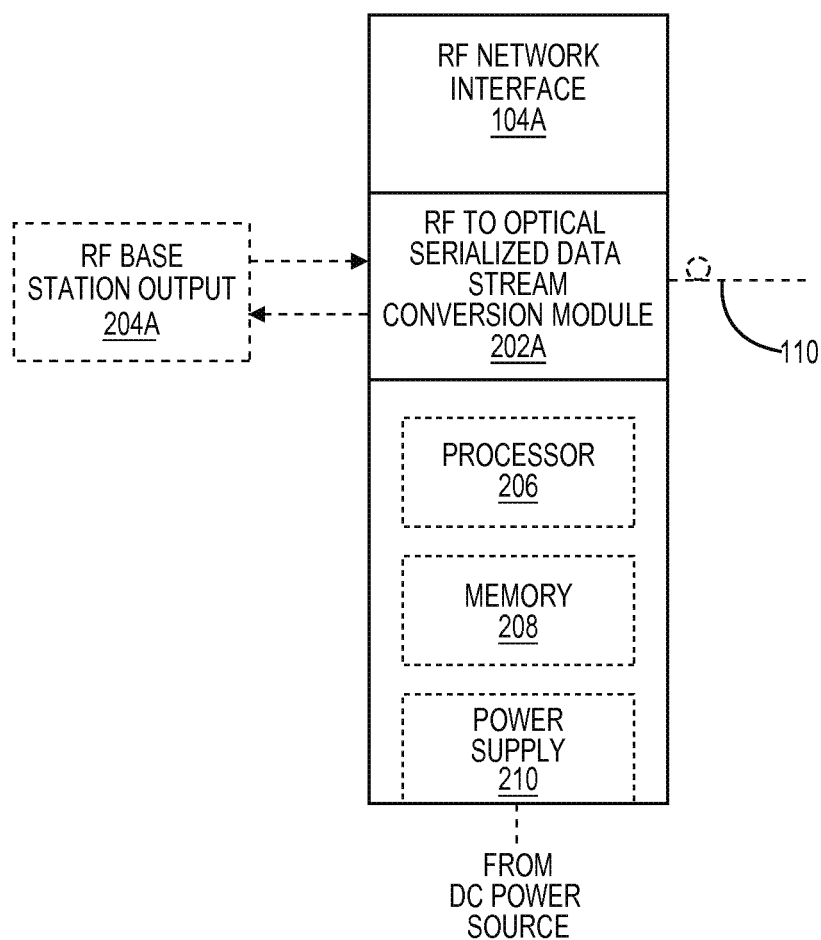
FIGS. 2A-2D are block diagrams of exemplary embodiments of base station network interfaces used in distributed antenna systems, such as the exemplary distributed antenna system of FIG. 1.

FIG. 2A is a block diagram of an exemplary embodiment of a type base station network interface 104, radio frequency (RF) network interface 104A. Radio frequency network interface 104A includes a radio frequency (RF) to optical serialized data stream conversion module 202A communicatively coupled to a radio frequency (RF) base station output 204A of an external device 108 that is a radio frequency access base station. Radio frequency to optical serialized data stream conversion module 202A is also communicatively coupled to at least one digital communication link 110. In exemplary embodiments, the radio frequency to optical serialized data stream conversion module 202A is implemented using optional processor 206 and memory 208. In exemplary embodiments, the radio frequency network interface 104A includes optional power supply 210 to power the radio frequency to optical serialized data stream conversion module 202A and/or optional processor 206 and memory 208.

In the downlink, radio frequency to serialized data stream conversion module 202A is configured to receive radio frequency signals from the radio frequency base station output 204A. The radio frequency to optical serialized data stream conversion module 202A is further configured to convert the received radio frequency signals to a downlink serialized data stream. In exemplary embodiments, this is done using oscillators and mixers. In exemplary embodiments, the radio frequency to optical serialized data stream conversion module 202A further converts the serialized data stream from electrical signals to optical signals for output on digital communication link 110. In other embodiments, the serialized data stream is transported using a conductive communication medium, such as coaxial cable or twisted pair, and the optical conversion is not necessary.

In the uplink, radio frequency to serialized data stream conversion module 202A is configured to receive a serialized data stream across digital communication link 110. In exemplary embodiments where digital communication link 110 is an optical medium, the radio frequency to optical serialized data stream conversion module 202A is configured to convert the uplink serialized data stream between received optical signals and electrical signal. In other embodiments, the serialized data stream is transported using a conductive communication medium, such as coaxial cable or twisted pair, and the optical conversion is not necessary. The radio frequency to optical serialized data stream conversion module is further configured to convert the uplink serialized data stream to radio frequency signals. In exemplary embodiments, this is done using oscillators and mixer. Radio frequency to optical serialized data stream conversion module 202A is further configured to communication the uplink radio frequency signal to the radio frequency base station output 204A.

Figure 2B:
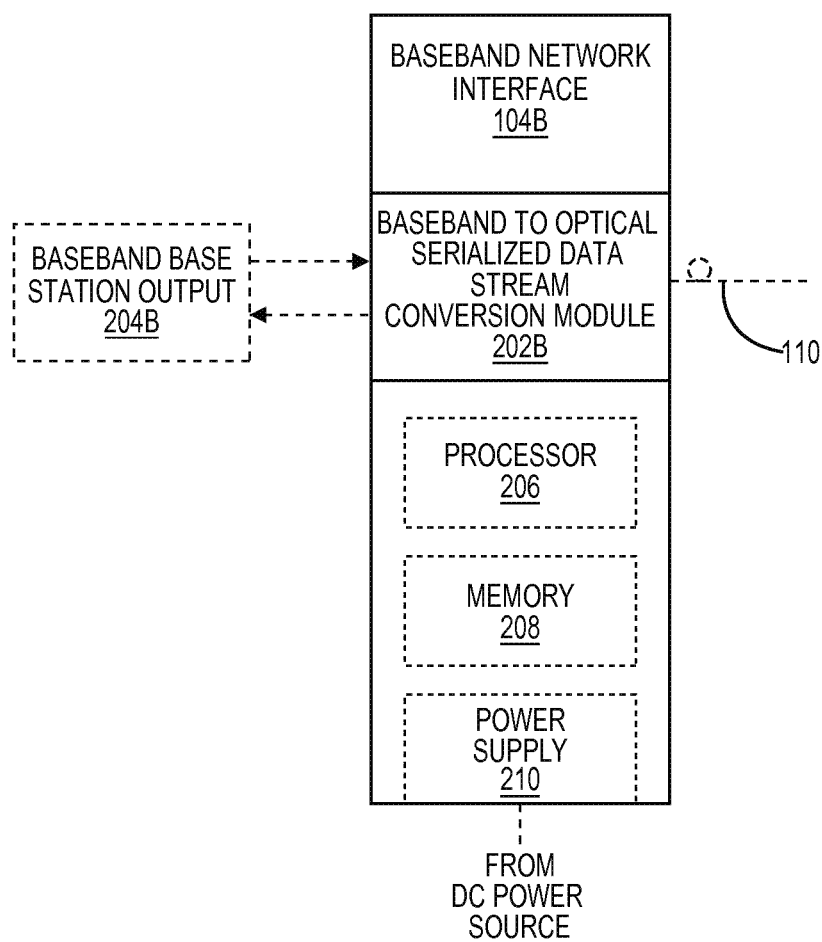

FIG. 2B is a block diagram of an exemplary embodiment of a type of base station network interface 104, baseband network interface 104B. Baseband network interface 104B includes a baseband to optical serialized data stream conversion module 202B communicatively coupled to a baseband base station output 204B of an external device 108 that is a radio frequency access base station. Baseband to optical serialized data stream conversion module 202B is also communicatively coupled to at least one digital communication link 110. In exemplary embodiments, the baseband to optical serialized data stream conversion module 202B is implemented using optional processor 206 and memory 208. In exemplary embodiments, the baseband network interface 104B includes optional power supply 210 to power the baseband to optical serialized baseband conversion module 202B and/or optional processor 206 and memory 208.

In the downlink, baseband to optical serialized data stream conversion module 202B is configured to receive baseband mobile wireless access signals (such as I/Q data) from the baseband base station output 204B. The baseband to optical serialized conversion module 202B is further configured to convert the received baseband mobile wireless access signals to a downlink serialized data stream. In exemplary embodiments, the baseband to optical serialized data stream conversion module 202B further converts the serialized data stream from electrical signals to optical signals for output on the digital communication link 110. In other embodiments, the serialized data stream is transported using a conductive communication medium, such as coaxial cable or twisted pair, and the optical conversion is not necessary.

In the uplink, baseband to optical serialized data stream conversion module 202B is configured to receive a serialized data stream across digital communication link 110. In exemplary embodiments where digital communication link 110 is an optical medium, the baseband to optical serialized data stream conversion module 202B is configured to convert the uplink serialized data stream between received optical signals and electrical signal. In other embodiments, the serialized data stream is transported using a conductive communication medium, such as coaxial cable or twisted pair, and the optical conversion is not necessary. The baseband to optical serialized data stream conversion module 202B is further configured to convert the uplink serialized data stream to uplink baseband wireless access signals. Baseband to optical serialized data stream conversion module 202B is further configured to communicate the uplink baseband wireless access signals to the baseband base station output 204B.

Figure 2C:
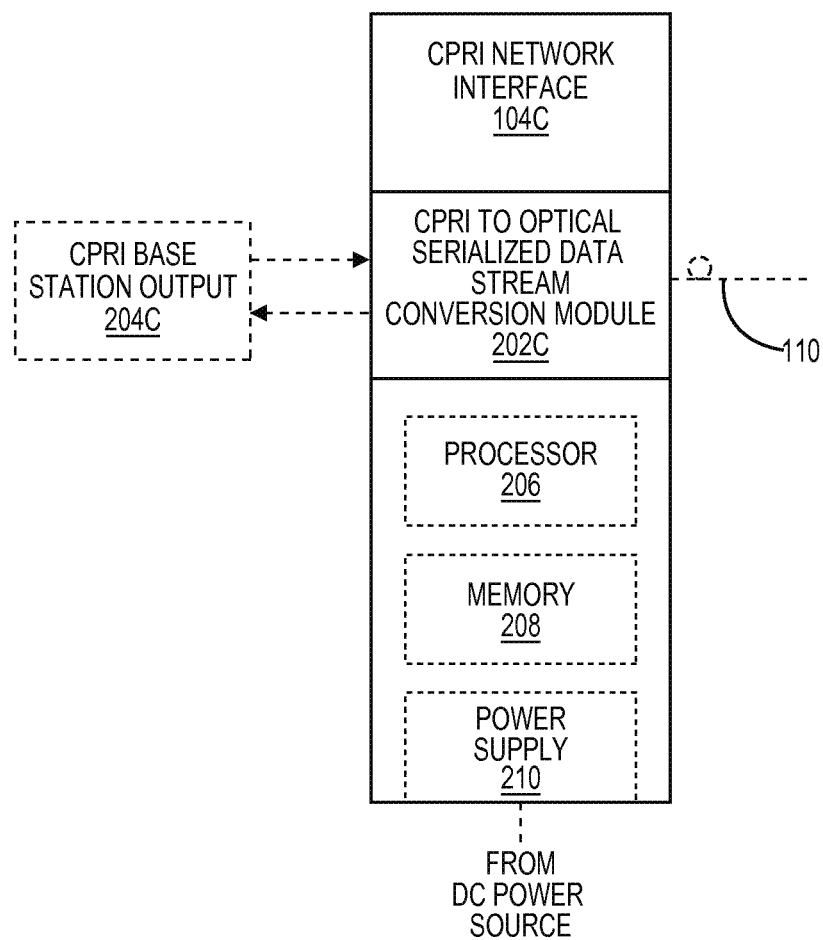

FIG. 2C is a block diagram of an exemplary embodiment of a type of base station network interface 104, Common Public Radio Interface (CPRI) network interface 104C. CPRI network interface 104C includes a CPRI to optical serialized data stream conversion module 202C communicatively coupled to a baseband base station output 204B of an external device 108 that is a radio frequency access base station. CPRI to optical serialized data stream conversion module 202C is also communicatively coupled to at least one digital communication link 110. In exemplary embodiments, the CPRI to optical serialized data stream conversion module 202C is implemented using optional processor 206 and memory 208. In exemplary embodiments, the CPRI network interface 104C includes optional power supply 210 to power the baseband to optical serialized baseband conversion module 202B and/or optional processor 206 and memory 208.

In the downlink, CPRI to optical serialized data stream conversion module 202C is configured to receive CPRI signals from the CPRI base station output 204C. The CPRI to optical serialized data stream conversion module 202C is further configured to convert the received CPRI signals to a downlink serialized data stream. In exemplary embodiments, the CPRI to optical serialized data stream conversion module 202C further converts the serialized data stream from electrical signals to optical signals for output on the digital communication link 110. In other embodiments, the serialized data stream is transported using a conductive communication medium, such as coaxial cable or twisted pair, and the optical conversion is not necessary.

In the uplink, CPRI to optical serialized data stream conversion module 202C is configured to receive a serialized data stream across digital communication link 110. In exemplary embodiments where digital communication link 110 is an optical medium, the CPRI to optical serialized data stream conversion module 202C is configured to convert the uplink serialized data stream between received optical signals and electrical signal. In other embodiments, the serialized data stream is transported using a conductive communication medium, such as coaxial cable or twisted pair, and the optical conversion is not necessary. The CPRI to optical serialized data stream conversion module 202C is further configured to convert the uplink serialized data stream to uplink CPRI signals. CPRI to optical serialized data stream conversion module 202C is further configured to communicate the uplink CPRI signal to the CPRI base station output 204C.

Figure 2D:
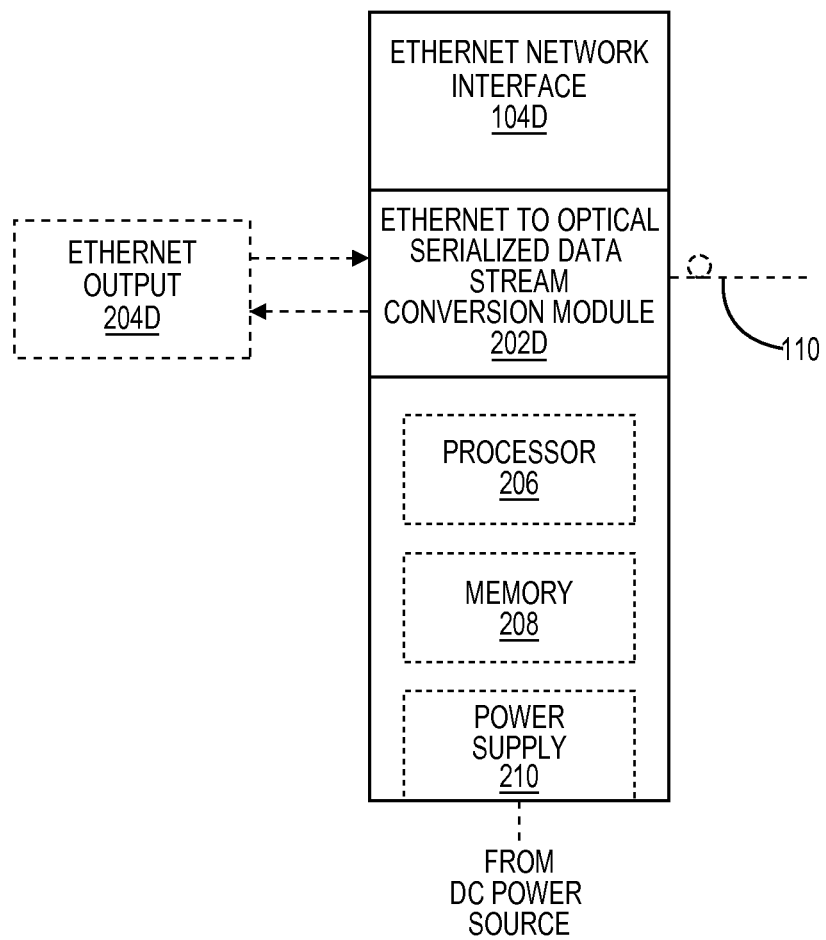

FIG. 2D is a block diagram of an exemplary embodiment of a type of base station network interface 104, Ethernet network interface 104D. Ethernet network interface 104D includes an Ethernet to optical serialized data stream conversion module 202D communicatively coupled to an Ethernet output 204D of an external device 108 that is an Ethernet adapter to a internet protocol (IP) based network. Ethernet to optical serialized data stream conversion module 202D is also communicatively coupled to at least one digital communication link 110. In exemplary embodiments, the Ethernet to optical serialized data stream conversion module 202D is implemented using optional processor 206 and memory 208. In exemplary embodiments, the Ethernet network interface 104D includes optional power supply 210 to power the baseband to optical serialized baseband conversion module 202B and/or optional processor 206 and memory 208.

In the downlink, Ethernet to optical serialized data stream conversion module 202D is configured to receive internet protocol packets from the Ethernet output 204D. The baseband to optical serialized conversion module 202B is further configured to convert the internet protocol packets to a downlink serialized data stream. In exemplary embodiments, the Ethernet to optical serialized data stream conversion module 202D further converts the serialized data stream from electrical signals to optical signals for output on the digital communication link 110. In other embodiments, the serialized data stream is transported using a conductive communication medium, such as coaxial cable or twisted pair, and the optical conversion is not necessary.

In the uplink, Ethernet to optical serialized data stream conversion module 202D is configured to receive a serialized data stream across digital communication link 110. In exemplary embodiments where digital communication link 110 is an optical medium, the Ethernet to optical serialized data stream conversion module 202D is configured to convert the uplink serialized data stream between received optical signals and electrical signal. In other embodiments, the serialized data stream is transported using a conductive communication medium, such as coaxial cable or twisted pair, and the optical conversion is not necessary. The Ethernet to optical serialized data stream conversion module 202D is further configured to convert the uplink serialized data stream to uplink Ethernet frames. Ethernet to optical serialized data stream conversion module 202D is further configured to communicate the uplink Ethernet frames to the Ethernet output 204D.

Figure 3A:
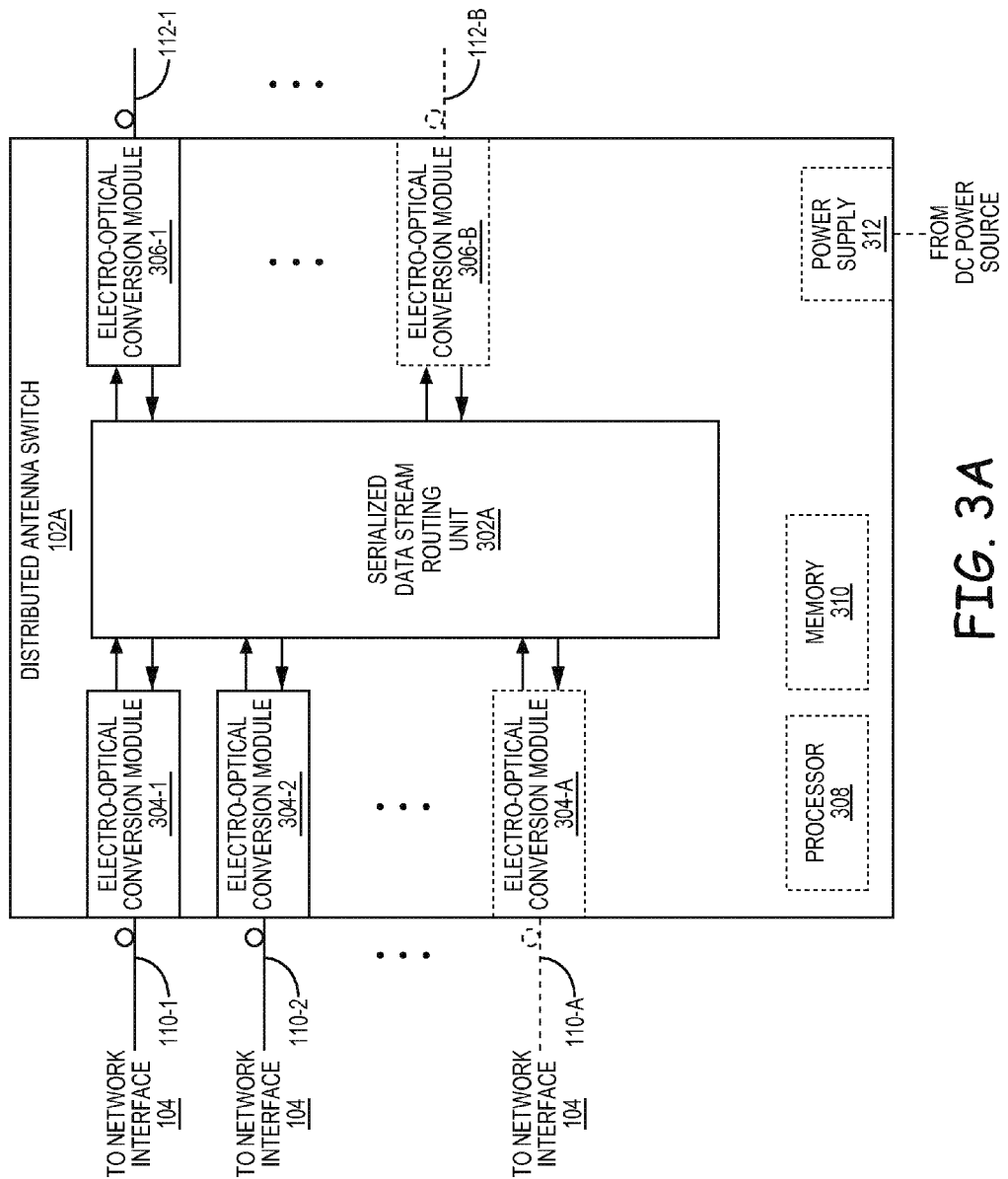
FIGS. 3A-3B are block diagrams of exemplary embodiments of distributed antenna switches used in distributed antenna systems, such as the exemplary distributed antenna system of FIG. 1.
Figure 3B:
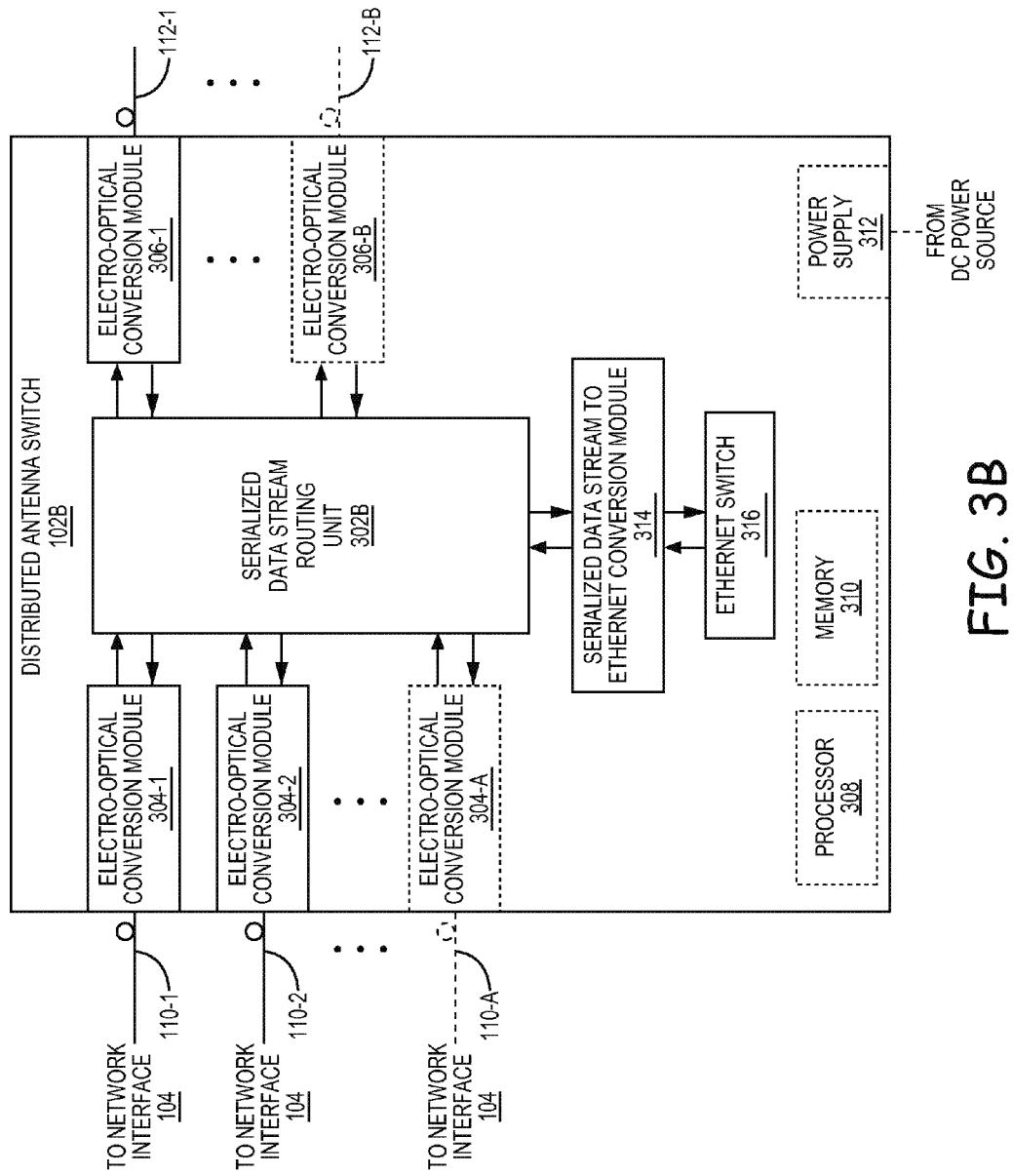

FIGS. 3A-3B are block diagrams depicting exemplary embodiments of distributed antenna switches 102 used in distributed antenna systems, such as the exemplary distributed antenna system 100 described above. Each of FIGS. 3A-3B illustrates a different embodiment of distributed antenna switch 102, labeled distributed antenna switch 102A-102B respectively.

FIG. 3A is a block diagram of an exemplary distributed antenna switch 102A including a serialized data stream routing unit 302A, electro-optical conversion modules 304 (including electro-optical conversion module 304-1, electro-optical conversion module 304-2, and any amount of optional electro-optical conversion modules 304 through optional electro-optical conversion module 304-A) and at least one electro-optical conversion module 306-1 (and any amount of optional electro-optical conversion modules 306 through optional electro-optical conversion modules 306-B). In exemplary embodiments, the serialized data stream routing unit 302A is implemented using optional processor 308 and memory 310. In exemplary embodiments, the serialized data stream routing unit 302A includes optional power supply 312 to power the serialized data stream routing unit 302A and/or optional processor 308 and memory 310.

Each electro-optical conversion module 304 is communicatively coupled to a network interface 104 across a digital communication link 110. In the forward path, each electro-optical conversion module 304 is configured to receive a downlink digitized data stream from at least one network interface 104 across a digital communication link 110. Specifically, electro-optical conversion module 304-1 is configured to receive a downlink digitized data stream from network interface 104-1 across digital communication link 110-1, electro-optical conversion module 304-2 is configured to receive a downlink digitized data stream from network interface 104-2 across digital communication link 110-2, and optional electro-optical conversion module 304-A is configured to receive a downlink digitized data stream from optional network interface 104-A across optional digital communication link 110-A. Each electro-optical conversion module 304 is configured to convert the downlink digitized data streams from optical to electrical signals, which are then passed onto the serialized data stream routing unit 302A. Similarly in the reverse path, in exemplary embodiments each electro-optical conversion module 304 is configured to receive an uplink digitized data stream in an electrical format from the serialized data stream routing unit 302A and to convert them to an optical format for communication across a digital communication link 110 to a network interface 104.

The serialized data stream routing unit 302A is described in more detail below with reference to FIG. 4A. Generally in the forward path, the serialized data stream routing unit 302A receives downlink serialized data streams for a plurality of electro-optical conversion modules 304 and aggregates a plurality of these downlink serialized data streams into at least one downlink aggregate serialized data stream that is routed to at least one electro-optical conversion module 306 (such as electro-optical conversion module 306-1) for eventual transmission to a remote antenna unit 106. In exemplary embodiments, the same or different downlink aggregate serialized data streams are routed to a plurality of electro-optical conversion modules 306. In some embodiments, the serialized data stream routing unit 302A is configured to aggregate and route data from a first subset of network interfaces 104 into a first downlink aggregate data stream that is transferred to at least a first remote antenna unit 106 and is further configured to aggregate and route data from a second subset of network interfaces 104 into a second downlink aggregate data stream that is transferred to at least a second remote antenna unit 106. In exemplary embodiments, the first and second subsets are mutually exclusive. In other exemplary embodiments, the first and second subsets partially overlap. In other exemplary embodiments, the first and second subsets are identical. In other exemplary embodiments, data streams from greater numbers of subsets of network interfaces 104 are aggregated and communicated to greater numbers of remote antenna units 106.

Similarly in the reverse path, the serialized data stream routing unit 302A receives at least one uplink aggregate serialized data stream from at least one electro-optical conversion module 306 (such as electro-optical conversion module 306-1) from a remote antenna unit 106 and splits it into a plurality of uplink serialized data streams which are passed to electro-optical conversion modules 304-1 for eventual communication to a network interface 104. In exemplary embodiments, the same or different uplink aggregate serialized data streams are received from a plurality of electro-optical conversion modules 306. In some embodiments, the serialized data stream routing unit 302A is configured to receive, split apart, and route data from a first uplink aggregate data stream from at least a first remote antenna unit 106-1 to a first subset of electro-optical conversion modules 304 destined for a first subset of network interfaces 104 and is further configured to receive, split apart, and route data from a second uplink aggregate data stream from at least a second remote antenna unit 106-2 to a second subset of electro-optical conversion modules 304 destined for a second subset of network interfaces 104. In exemplary embodiments, the first and second subsets are mutually exclusive. In other exemplary embodiments, the first and second subsets partially overlap. In other exemplary embodiments, the first and second subsets are identical. In other exemplary embodiments, aggregate data streams from greater numbers of remote antenna units 106 are split apart and communicated to greater numbers of subsets of network interfaces 104.

Each electro-optical conversion module 306 is communicatively coupled to a remote antenna unit 106 across a digital communication link 112. In the forward path, each electro-optical conversion module 304 is configured to receive an aggregate downlink serialized data stream in an electrical format from the serialized data stream routing unit 302A. Specifically, electro-optical conversion module 306-1 is configured to receive a first downlink aggregate serialized data stream in an electrical format from the serialized data stream routing unit 302A, and optional electro-optical conversion module 306-B is configured to receive a second downlink aggregate serialized data stream from serialized data stream routing unit 302A. Each electro-optical conversion module 306 is configured to convert the aggregate downlink serialized data streams from electrical signals to optical signals, which are then communicated across a digital communication link 110 to a remote antenna unit 106. Similarly, in the reverse path, in exemplary embodiments each electro-optical conversion module 304 is configured to receive an uplink aggregate digitized data stream from a remote antenna unit 106 across a digital communication link 110 in an optical format and to convert them to an electrical format for communication to the serialized data stream routing unit 302A.

FIG. 3B is a block diagram of an exemplary distributed antenna switch 102B including serialized data stream routing unit 302B, electro-optical conversion modules 304, at least one electro-optical conversion module 306, serialized data stream to Ethernet conversion module 314, Ethernet switch 316, optional processor 308, optional memory 310, and optional power supply 312. Distributed antenna switch 102B includes similar components to distributed antenna switch 102A and operates according to similar principles and methods as distributed antenna switch 102A described above. The difference between distributed antenna switch 102B and distributed antenna switch 102A is that distributed antenna switch 102B includes serialized data stream to Ethernet conversion module 314 and Ethernet switch 316. In exemplary embodiments, serialized data stream to Ethernet conversion module 314 and/or Ethernet switch 316 are also implemented by optional processor 308 and memory 310 and optional power supply 312 also powers serialized data stream to Ethernet conversion module 314 and/or Ethernet switch 316.

In the downlink, in exemplary embodiments serialized data stream to Ethernet conversion module 314 is configured to receive downlink data streams from the serialized data stream routing unit 302B and to convert the downlink data streams to downlink Ethernet frames that are passed onto Ethernet switch 316 that is configured to switch and/or route downlink Ethernet frames and is configured to pass the switched and/or routed downlink Ethernet frames back to the serialized data stream to Ethernet conversion module 314 that converts the switched and/or routed downlink Ethernet frames back to downlink data streams that are aggregated into aggregate downlink data streams as described herein. Similarly, in the uplink in exemplary embodiments serialized data stream to Ethernet conversion module 314 is configured to receive uplink data streams that have been extracted from aggregate data streams from serialized data stream routing unit 302B and to convert the uplink data streams to uplink Ethernet frames that are passed onto Ethernet switch 316 that is configured to switch and/or route uplink Ethernet frames and is configured to pass the switched and/routed uplink Ethernet frames back to the serialized data stream to Ethernet conversion module 314 that converts the switched and/or routed uplink Ethernet frames back to uplink data streams that are aggregated into aggregate uplink data streams as described herein.

Figure 4A:
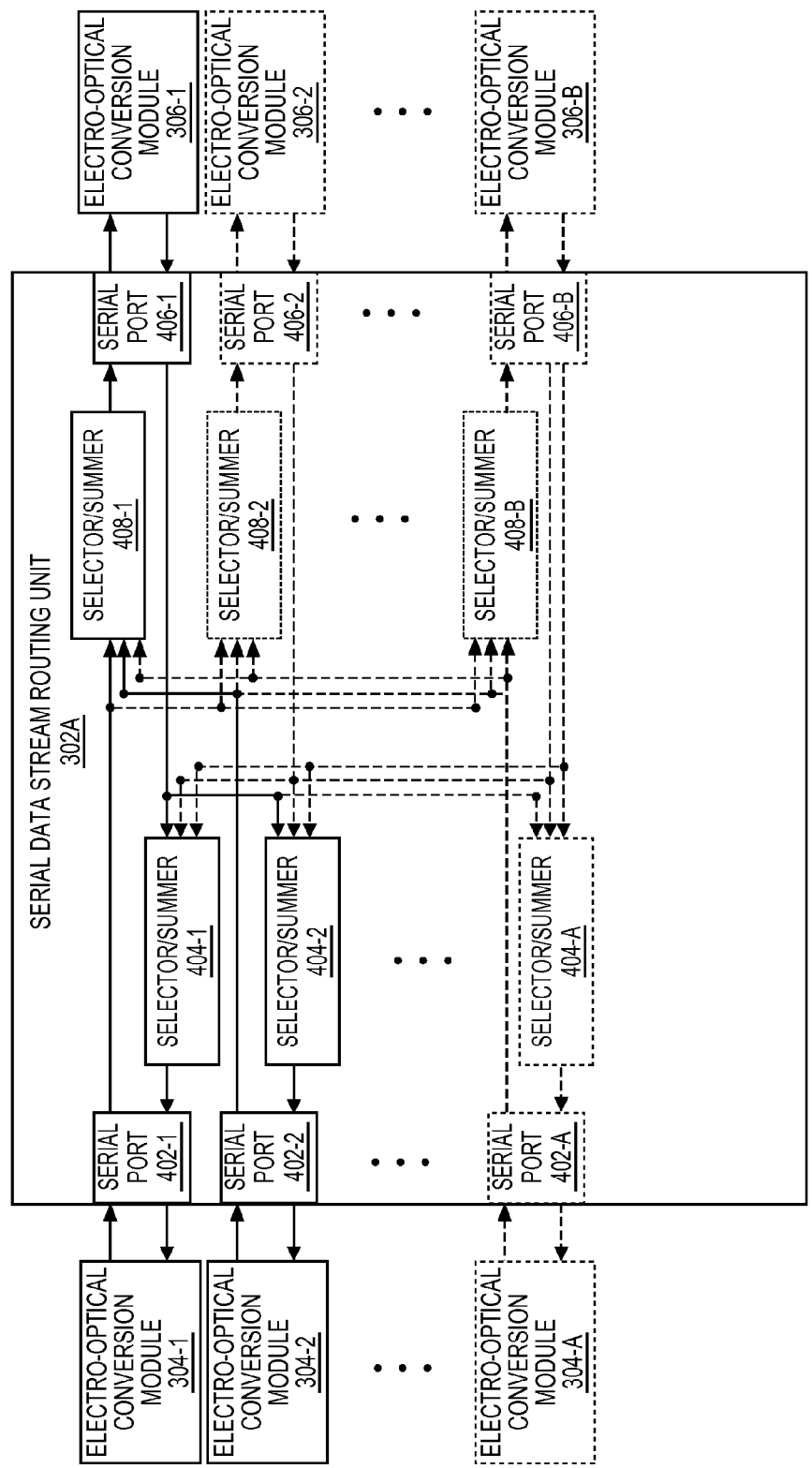
FIGS. 4A-4B are block diagrams of exemplary embodiments of serialized data stream routing units used in distributed antenna switches of distributed antenna systems, such as the exemplary distributed antenna system of FIG. 1.
Figure 4B:
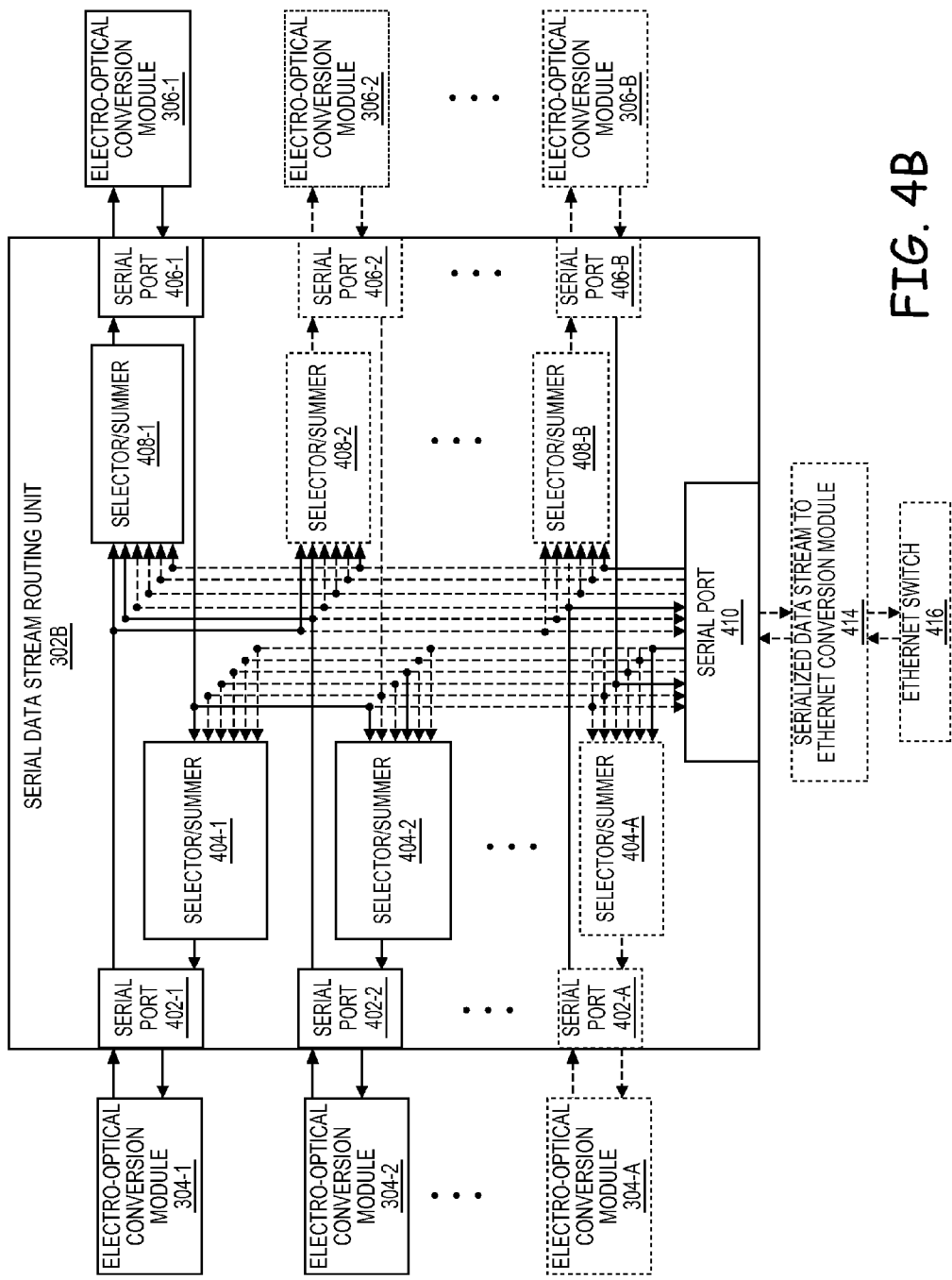

FIGS. 4A-4B are block diagrams of exemplary embodiments of serialized data stream routing units 302 used in distributed antenna switches 102 used in distributed antennas systems, such as the exemplary distributed antenna system 100 described above. Each of FIGS. 4A-4B illustrates a different embodiment of serialized data stream routing unit 302, labeled serialized data stream routing unit 302A-302B respectively.

FIG. 4A is a block diagram of an exemplary data stream routing unit 302A including serial ports 402 (including serial portion 402-1, serial port 402-2, and any amount of optional serial ports 402 through optional serial port 402-A), selector/summers 404 (including selector/summer 404-1, selector/summer 404-2, and any amount of optional selector/summer 404 through optional selector/summer 404-A), at least one serial port 406 (including serial port 406-1, optional serial port 406-2, and any amount of optional serial ports 406 through optional serial port 406-B), at least one selector/summer 408 (including selector/summer 408-1, optional selector/summer 408-2, and any amount of optional selector/summers 408 through optional selector-summer 408-B). In exemplary embodiments, selector summers 404 and at least one selector summer 408 are implemented by optional processor 308 of the distributed antenna switch 102A.

In the forward path, each serial port 402 receives a downlink serialized data stream from a corresponding electro-optical conversion module 304 and communicates the serialized data stream to at least one selector/summer 408. In the reverse path, each serial port 402 receives a serialized data stream from a corresponding selector/summer 404 and for output to at least one electro-optical conversion module 304.

In the reverse path, each selector/summer 404 receives at least one serialized data stream from at least one serial port 406 and selects and/or sums serialized data streams together for output to at least one serial port 402. In exemplary embodiments, a selector/summer 404 is configured to receive uplink aggregate serialized data streams from a plurality of serial ports 406 and to map timeslots from the plurality of aggregate upstream data streams into different timeslots on an upstream serialized data stream communicated to an associated serial port 402. In other exemplary embodiments, a selector/summer 404 is configured to receive uplink aggregate serialized data streams from a plurality of serial ports 406 and to digitally sum data from timeslots of a plurality of aggregate serialized data streams into a single uplink data stream communicated to an associated serial port 402. In exemplary embodiments, the data rate of one or more uplink aggregate serialized data stream received at any of serial ports 406 are different from the data rates of the uplink data streams communicated at serial ports 402. In exemplary embodiments, the data rate of an uplink aggregate serialized data stream received at a serial port 406 is greater than the data rate of a plurality of uplink serialized data streams communicated at serial ports 402, such that the uplink aggregate serialized data stream received at a serial port 406 includes data from the plurality of uplink serialized data streams communicated at serial ports 402.

In the forward path, each selector/summer 408 receives a plurality of downlink serialized data streams from a plurality of serial ports 402 and selects and/or sums the serialized data streams together for output to at least one serial port 406. In exemplary embodiments, a selector/summer 408 is configured to receive downlink serialized data streams from a plurality of serial ports 402 and to map timeslots from the plurality of aggregate downlink data streams into different timeslots on a downlink aggregate serialized data stream communicated to an associated serial port 406. In other exemplary embodiments, a selector/summer 408 is configured to receive downlink serialized data streams from a plurality of serial ports 402 and to digitally sum data from timeslots of a plurality of downlink serialized data streams into a single downlink aggregate serialized data stream communicated to an associated serial port 406. In exemplary embodiments, the data rate of the downlink data streams received at serial ports 402 are different from the data rates of one or more downlink aggregate serialized data streams received at any serial ports 406. In exemplary embodiments, the data rate of a plurality of downlink serialized data streams received at serial ports 402 is lower than the data rate of at least one downlink aggregate serialized data stream communicated at a serial port 406, such that the downlink aggregate serialized data stream communicated at a serial port 406 includes data from the plurality of downlink serialized data streams received at serial ports 402.

In the forward path, each serial port 406 receives a serialized data stream from a corresponding selector/summer 408 and outputs it to a corresponding electro-optical conversion module 306. In the reverse path, each serial port 406 receives a serialized data stream from a corresponding electro-optical conversion module 304 and communicates the serialized data stream to at least one selector/summer 404.

FIG. 4B is a block diagram of an exemplary data stream routing unit 302B including serial ports 402, selector/summers 404, at least one serial port 406, at least one selector/summer 408, and serial port 410. Serialized data stream routing unit 302B includes similar components to serialized data stream routing unit 302A and operates according to similar principles and methods as serialized data stream routing unit 302A described above. The difference between data stream routing unit 302B and data stream routing unit 302A is that data stream routing unit 302B includes serial port 410 communicatively coupled to the serial port 410. Serial port 410 is communicatively coupled to serial ports 402 and is configured to receive downlink serialized data streams from serial ports 402. Serial port 410 is further communicatively coupled to at least one selector/summer 408 and is configured to communicate downlink serialized data streams to at least one selector/summer 408. Serial port 410 is further communicatively coupled to at least one serial port 406 and receives at least one uplink aggregate serialized data stream from the at least one serial port 406. Serial port 410 is further communicatively coupled to at least one selector/summer 404 and is configured to communicate uplink serialized data streams to selector/summers 404. Serial port 410 is configured to communicate serialized data streams to and from the serialized baseband to Ethernet conversion module 414. Thus, serialized data streams containing Ethernet frames can be passed through to Ethernet switch for switching of the Ethernet frames and then returned to the serialized baseband routing unit for routing to various destinations.

Figure 5A:
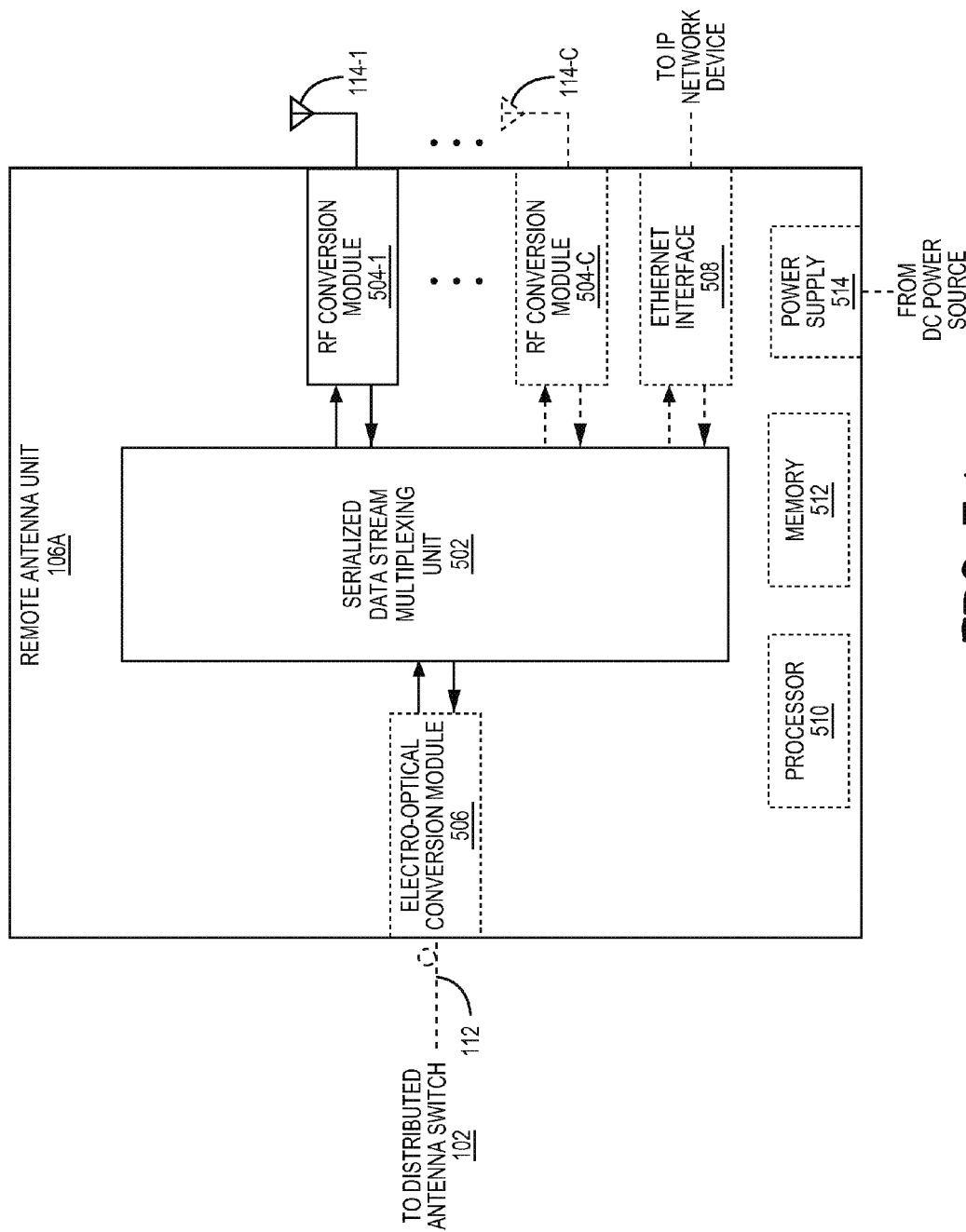
FIGS. 5A-5B are block diagrams of exemplary embodiments of remote antenna units used in distributed antenna systems, such as the exemplary distributed antenna system of FIG. 1.
Figure 5B:
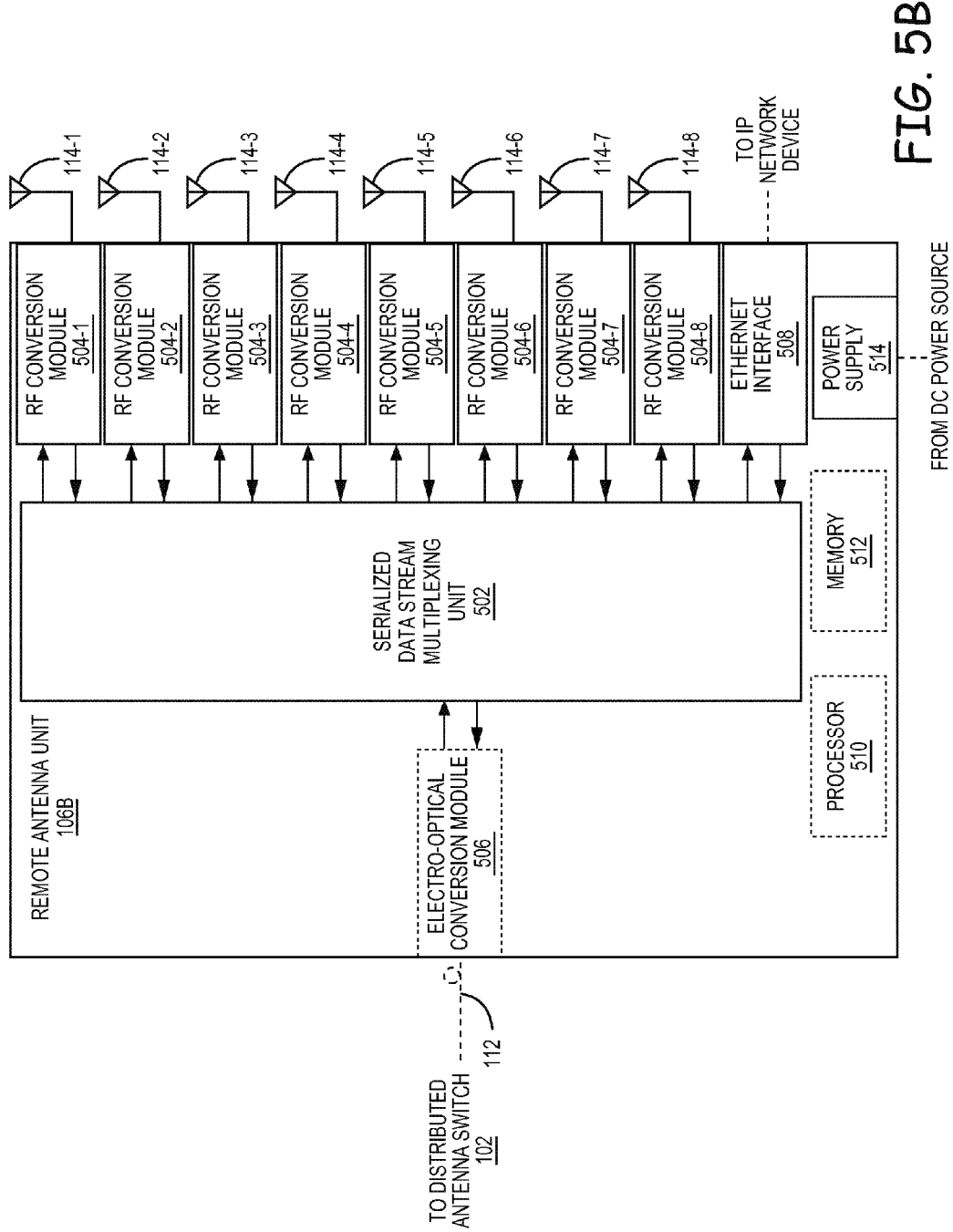

FIGS. 5A-5B are block diagrams of exemplary embodiments of remote antenna units 106 used in distributed antenna systems, such as the exemplary distributed antenna system 100 described above. Each of FIGS. 5A-5B illustrates a different embodiment of remote antenna unit 106, labeled remote antenna unit 106A-106B respectively.

FIG. 5A is a block diagram of an exemplary remote antenna unit 106 including serialized data stream multiplexing unit 502, at least one radio frequency (RF) conversion module 504 (including RF conversion module 504-1 and any amount of optional RF conversion modules 504 through optional conversion module 504-C), optional electro-optical conversion module 506, optional Ethernet interface 508, optional processor 510, optional memory 512, and optional power supply 514. In exemplary embodiments, serialized data stream multiplexing unit 502 and/or RF conversion modules 504 are implemented at least in part by optional processor 510 of the remote antenna unit 106A. In exemplary embodiments, the exemplary remote antenna unit 106A includes optional power supply 514 to power the serialized data stream multiplexing unit 502, the at least one RF conversion module 504, the optional electro-optical conversion module 506, the optional Ethernet interface 508 and the optional processor 510 and memory 512.

The electro-optical conversion module 506 is communicatively coupled to the distributed antenna switch 102 across a digital communication link 112. In the forward path, the electro-optical conversion module 506 is configured to receive a downlink aggregate digitized data stream from the distributed antenna switch 102 across a digital communication link 112. The electro-optical conversion module 506 is configured to convert the downlink aggregate digitized data stream from optical to electrical signals, which are then passed onto the serialized data stream multiplexing unit 502. Similarly in the reverse path, in exemplary embodiments the electro-optical conversion module 506 is configured to receive an uplink aggregate digitized data stream in an electrical format from the serialized data stream multiplexing unit 502 and to convert the uplink aggregate digitized data stream to an optical format for communication across the digital communication link 112 to the distributed antenna switch 102. In exemplary embodiments more than one electro-optical conversion module 506 is coupled across more than one digital communication link 112 to the same distributed antenna switch 102, an intermediary device, and/or another distributed antenna switch 102.

The serialized data stream multiplexing unit 502 is described in more detail below with reference to FIG. 6. Generally in the forward path, the serialized data stream multiplexing unit 502 is configured to receive a downlink aggregate serialized data stream from the electro-optical conversion module 506 and configured to split apart the individual downlink serialized data streams from the downlink aggregate data stream and is further configured to communicate the individual downlink serialized data streams to various RF conversion modules 504 and/or one or more Ethernet interface 504. In exemplary embodiments, one of the individual downlink serialized data streams contains data pertaining to a first mobile access band and/or technology while another individual downlink serialized data streams contains data pertaining to a second mobile access band and/or technology. In exemplary embodiments, one of the downlink serialized data streams contains Ethernet frames for the Ethernet interface 508. In other example embodiments, other types of data is carried in the downlink serialized data steams.

Similarly in the reverse path, the serialized data stream multiplexing unit 502 is configured to receive individual uplink serialized data streams from various RF conversion modules 504, further configured to aggregate the individual uplink serialized data streams into an uplink aggregate data stream, and further configured to communicate the uplink aggregate data stream to the electro-optical conversion module 506 for eventual communication to the distributed antenna switch 102 across the digital communication link 112.

Each RF conversion module 504 is communicatively coupled to the serialized data stream multiplexing unit 502 and is coupled to and/or includes at least one antenna 114. Each RF conversion module 504 is configured to convert between at least one downlink serialized data stream and radio frequency signals in at least one radio frequency band. Each RF conversion module is configured to communicate radio frequency signals in the at least one radio frequency band across an air medium with at least one subscriber using at least one antenna 114.

In the downstream, each RF conversion module 504 is configured to convert at least one downlink serialized data stream into a downlink radio frequency (RF) signal in a radio frequency band. In exemplary embodiments, this may include digital to analog converters and oscillators. Each RF conversion module 504 is further configured to transmit the downlink radio frequency signal in the radio frequency band to at least one subscriber unit using at least one radio frequency transceiver and antenna 114 pair. In a specific embodiment, radio frequency conversion module 504-1 is configured to convert at least one downlink serialized data stream into a downlink radio frequency signal in a radio frequency band. Each RF conversion module 504 is further configured to transmit the downlink radio frequency signal in a radio frequency band using a radio frequency and antenna 114-1 pair to at least one wireless subscriber unit. In exemplary embodiments, radio frequency conversion module 504-1 is configured to convert a first downlink serialized data stream into a first downlink radio frequency signal in a first radio frequency band and to transmit the first downlink radio frequency signal in the first radio frequency band to at least one wireless subscriber unit using the antenna 114-1. Similarly, radio frequency conversion module 504-2 is configured to convert a second downlink serialized data stream into a second downlink radio frequency signal in a second radio frequency band and to transmit the second downlink radio frequency signal in the second radio frequency band to at least one wireless subscriber unit using the antenna 114-2. In exemplary embodiments, one radio frequency conversion module 504-1 and antenna pair 114-1 transports to a first set of wireless subscriber units in a first band and another radio frequency conversion module 504-C and antenna pair 114-C transports to a second set of wireless subscriber units in a second band. Other combinations of radio frequency conversion module 504 and antenna 114 pairs are used to communication other combinations of radio frequency signals in other various radio frequency bands to various subscriber units Similarly in the reverse path, in exemplary embodiments each RF conversion module 504 is configured to receive uplink radio frequency signals from at least one subscriber unit using at least one radio frequency antenna 114. Each radio frequency conversion module 504 is further configured to convert the radio frequency signals to at least one uplink serialized data stream. Each radio frequency conversion module 504 is further configured to communicate the uplink serialized data stream to the serialized data stream multiplexing unit 502.

FIG. 5B is a block diagram of an exemplary remote antenna unit 106B including serialized data stream multiplexing unit 502, a plurality of radio frequency (RF) conversion modules 504 (including RF conversion modules 504-1 through 504-8), optional electro-optical conversion module 506, an Ethernet interface 508, optional processor 510, optional memory 512, and optional power supply 514. Remote antenna unit 106B includes similar components to remote antenna unit 106A and operates according to similar principles and methods as remote antenna unit 106A described above. The difference between remote antenna unit 106B and remote antenna unit 106A is that remote antenna unit 106B includes eight RF conversion modules 504-1 through 504-8 coupled to antennas 114-1 through 114-8 respectively and an Ethernet interface 508. In exemplary embodiments, serialized data stream multiplexing unit 502 and/or RF conversion modules 504 are implemented at least in part by optional processor 510 of the remote antenna unit 106B. In exemplary embodiments, the exemplary remote antenna unit 106A includes optional power supply 514 to power the serialized data stream multiplexing unit 502, the RF conversion modules 504, the optional electro-optical conversion module 506, the Ethernet interface 508 and the optional processor 510 and memory 512.

Figure 6A:
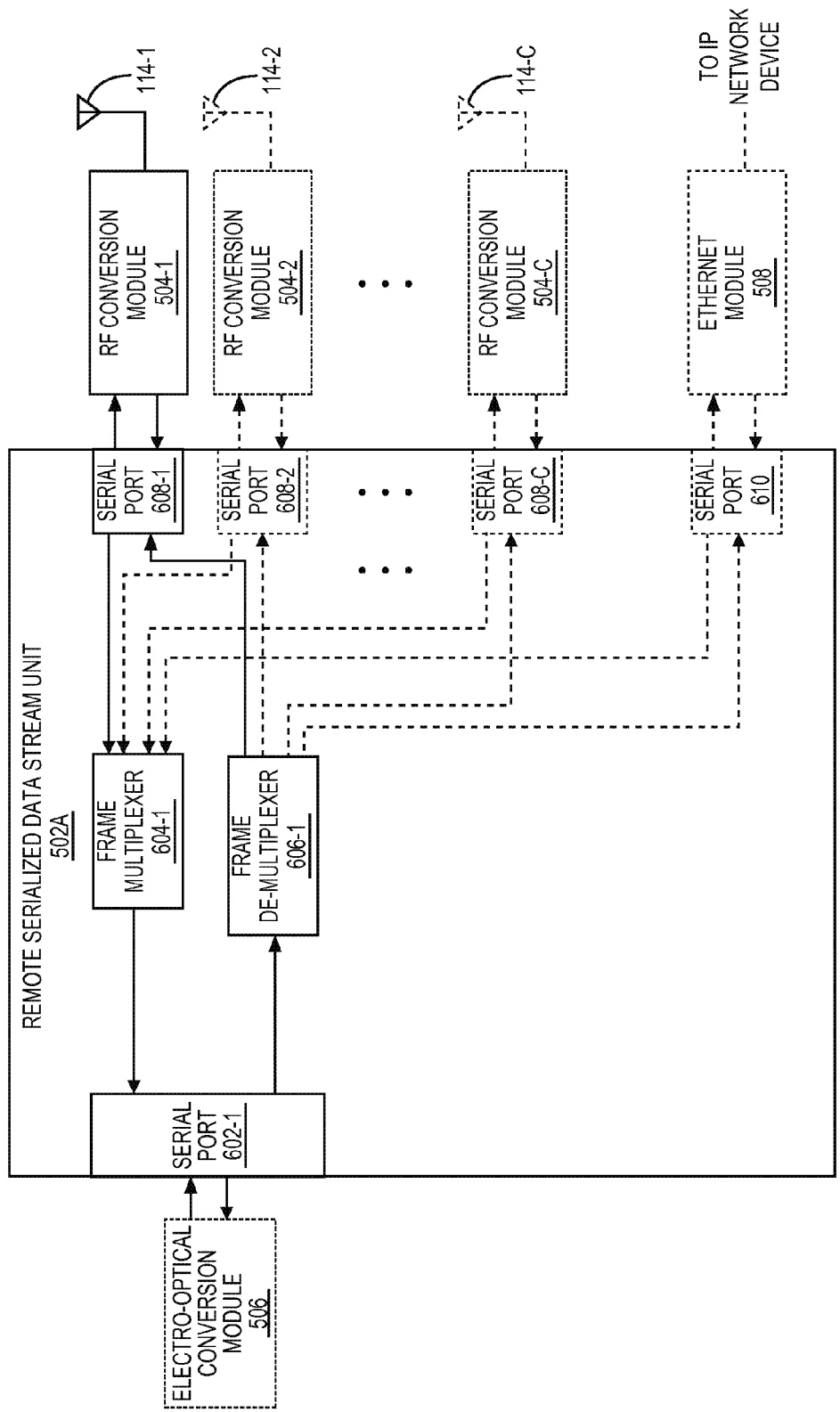
FIGS. 6A-6B are block diagrams of exemplary embodiments of a serialized data stream multiplexing unit used in remote antenna units of distributed antenna systems, such as the exemplary distributed antenna system of FIG. 1.
Figure 6B:
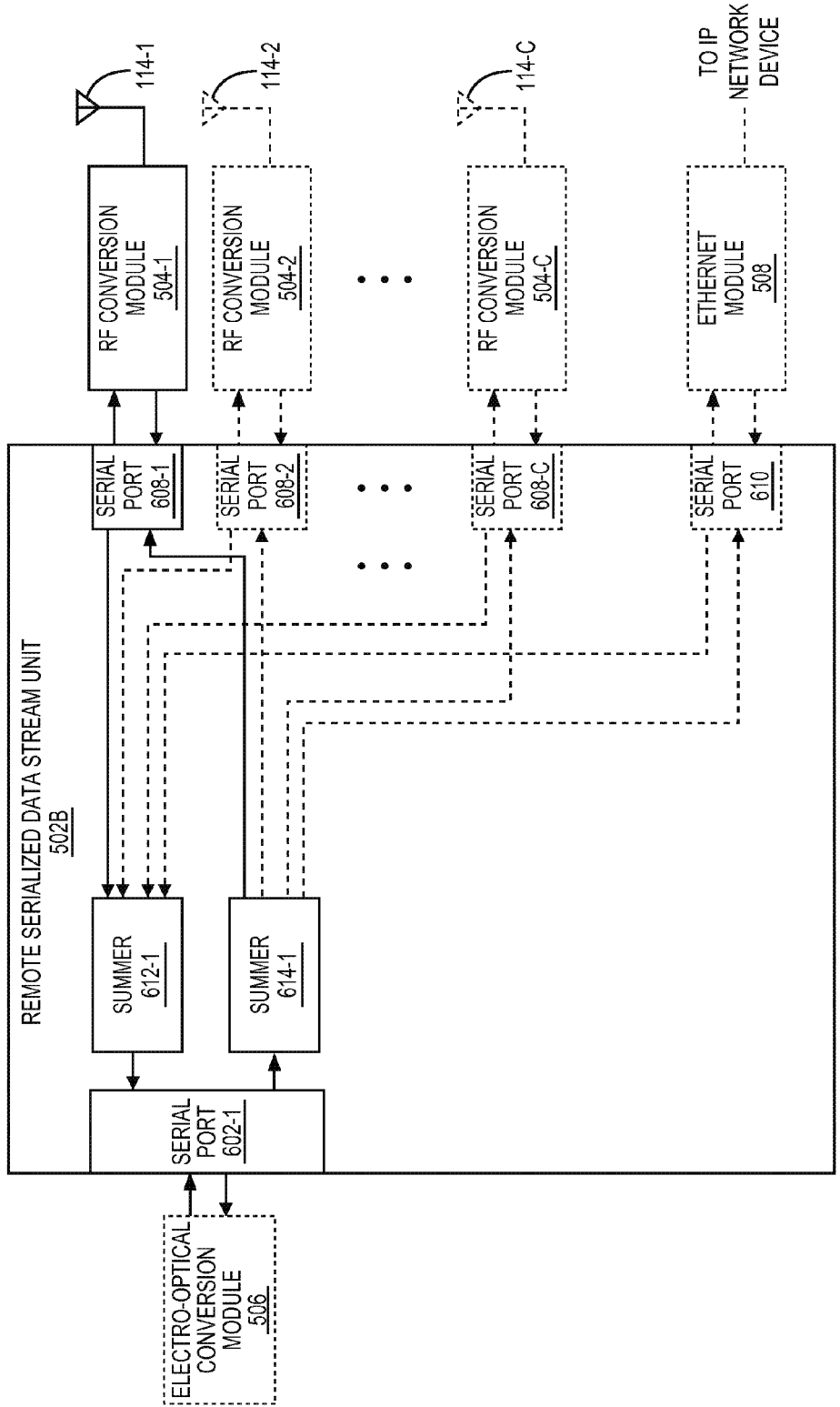

FIGS. 6A-6B are block diagrams of exemplary embodiments of serialized baseband multiplexing units 502 of remote antenna units 106 used in distributed antenna systems, such as the exemplary distributed antenna system 100 described above. Each of FIGS. 6A-6B illustrates a different embodiment of serialized baseband multiplexing units 502, labeled serialized baseband multiplexing unit 502A-502B respectively.

FIG. 6A is a block diagram of an exemplary serialized baseband multiplexing unit 502A including at least one serial port 602 (including serial port 602-1), at least one frame multiplexer 604 (including frame multiplexer 604-1), at least one frame de-multiplexer 606 (including frame de-multiplexer 606-1), at least one serial port 608 (including serial port 608-1 and any number of optional serial ports 608 through optional serial port 608-C), and optional serial port 610. In exemplary embodiments, the at least one frame multiplexer 604 and the at least one frame de-multiplexer 608 are implemented at least in part by optional processor 510 of remote antenna unit 106A.

The serial port 602-1 is communicatively coupled to an electro-optical conversion module 506. In the forward path, serial port 602-1 receives at least one downlink aggregate serialized data stream in electrical format from the electro-optical conversion module 506 and passes it to the frame de-multiplexer 606-1. In the reverse path, serial port 602-1 receives at least one uplink aggregate serialized data stream from the frame multiplexer 604-1 and passes it to the electro-optical conversion module 506.

The frame de-multiplexer 606-1 is communicatively coupled to both the serial port 602-1 and at least one serial port 608. In the forward path, the frame de-multiplexer 606-1 separates at least one downlink serialized data stream from the at least one downlink aggregate serialized data stream and passes it to the serial port 608-1 or optional serial port 610. In exemplary embodiments, the frame de-multiplexer 606-1 separates a plurality of downlink serialized data streams from the at least one downlink aggregate serialized data stream and passes them onto respective serial ports 608, such as serial port 608-1, optional serial port 608-2 through optional serial port 608-C, and optional serial port 610.

The frame multiplexer 604-1 is communicatively coupled to both the serial port 602-1 and at least one serial port 608. In the reverse path, the frame multiplexer 604-1 aggregates at least one uplink serialized data stream received from at least one serial port 608 or optional serial port 610 into an uplink aggregate serialized data stream and passes it to the serial port 602-1. In exemplary embodiments, the frame multiplexer 604-1 aggregates a plurality of uplink serialized data streams received from a plurality of serial ports 608 and/or optional serial port 610 and passes them onto serial port 602-1.

Each of at least one port 608 are communicatively coupled to at least one RF conversion module 504. Specifically, serial port 608-1 is communicatively coupled to RF conversion module 504-1, optional serial port 608-1 is communicatively coupled to RF conversion module 504-2, and optional serial port 608-C is communicatively coupled to RF conversion module 504-C. In the forward path, each of serial ports 608 receives a downlink serialized data stream from frame de-multiplexer 606-1 and communicates it to a respective RF conversion module 504. In the reverse path, each of serial ports 608 receives an uplink serialized data stream from a respective RF conversion module 504 and passes it onto frame multiplexer 604-1.

Optional serial port 610 is communicatively coupled to Ethernet interface 508. In the forward path, optional serial port 610 receives a downlink serialized data stream from frame de-multiplexer 606-1 and communicates it to the Ethernet interface 508. In the reverse path, optional serial port 610 receives an uplink serialized data stream from Ethernet interface 510 and communicates it to the frame multiplexer 604-1.

FIG. 6B is a block diagram of an exemplary serialized baseband multiplexing unit 502B including at least one serial port 602 (including serial port 602-1), at least one summer 612 (including summer 612-1), at least one simulcaster 614 (including simulcaster 614-1), at least one serial port 608 (including serial port 608-1 and any number of optional serial ports 608 through optional serial port 608-C), and optional serial port 610. In exemplary embodiments, the at least one summer 612 and the at least one simulcaster 614 are implemented at least in part by optional processor 510 of remote antenna unit 106B.

The serial port 602-1 is communicatively coupled to an electro-optical conversion module 506. In the forward path, serial port 602-1 receives at least one downlink aggregate serialized data stream in electrical format from the electro-optical conversion module 506 and passes it to the frame de-multiplexer 606-1. In the reverse path, serial port 602-1 receives at least one uplink aggregate serialized data stream from the frame multiplexer 604-1 and passes it to the electro-optical conversion module 506.

The simulcaster 614-1 is communicatively coupled to both the serial port 602-1 and at least one serial port 608. In the forward path, the simulcaster 614-1 simulcasts at least one downlink serialized data stream from the at least one downlink aggregate serialized data stream and passes it to the serial port 608-1 or optional serial port 610. In exemplary embodiments, the simulcaster 614-1 simulcasts a plurality of downlink serialized data streams from the at least one downlink aggregate serialized data stream to a plurality of serial ports 608 and/or optional serial port 610.

The summer 612-1 is communicatively coupled to both the serial port 602-1 and at least one serial port 608. In the reverse path, the summer 612-1 digitally sums at least one uplink serialized data stream received from at least one serial port 608 or optional serial port 610 into an uplink aggregate serialized data stream and passes it to the serial port 602-1. In exemplary embodiments, the summer 612-1 sums a plurality of uplink serialized data streams received from a plurality of serial ports 608 and/or optional serial port 610 and passes them onto serial port 602-1.

Each of at least one port 608 are communicatively coupled to at least one RF conversion module 504. Specifically, serial port 608-1 is communicatively coupled to RF conversion module 504-1, optional serial port 608-1 is communicatively coupled to RF conversion module 504-2, and optional serial port 608-C is communicatively coupled to RF conversion module 504-C. In the forward path, each of serial ports 608 receives a downlink serialized data stream from simulcaster 614-1 and communicates it to a respective RF conversion module 504. In the reverse path, each of serial ports 608 receives an uplink serialized data stream from a respective RF conversion module 504 and passes it onto summer 612-1

Optional serial port 610 is communicatively coupled to Ethernet interface 508. In the forward path, optional serial port 610 receives a downlink serialized data stream from simulcaster 614-1 and communicates it to the Ethernet interface 508. In the reverse path, optional serial port 610 receives an uplink serialized data stream from Ethernet interface 510 and communicates it to the summer 612-1.

Figure 7A:
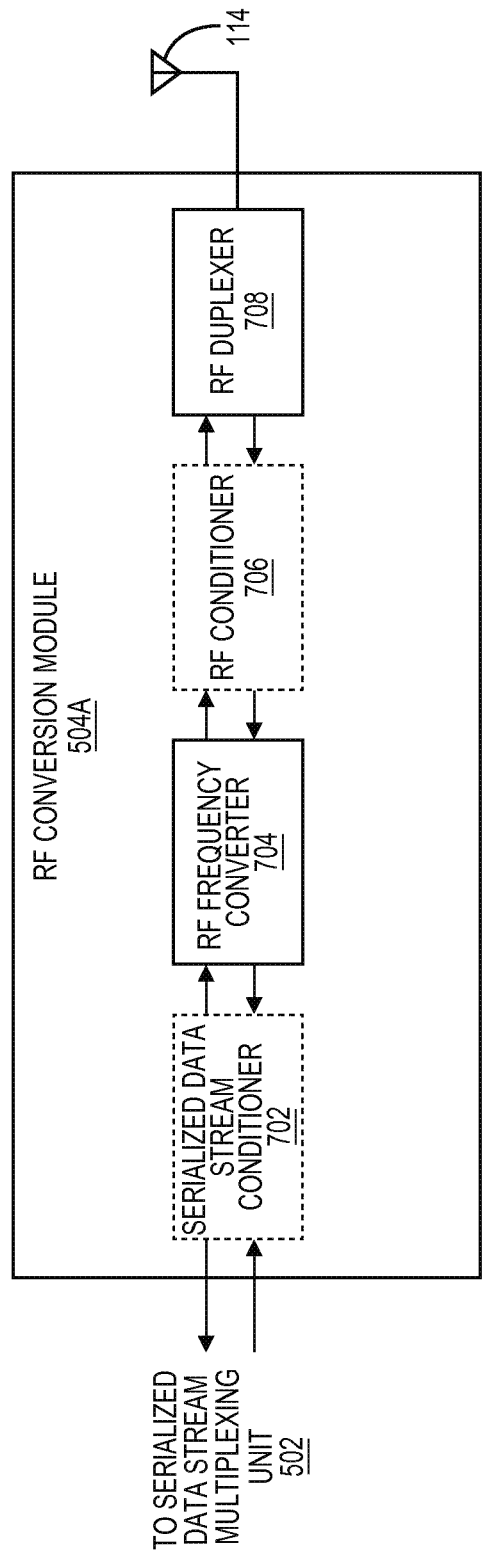
FIGS. 7A-7C are block diagrams of exemplary embodiments of radio frequency conversion modules used in remote antenna units of distributed antenna systems, such as the exemplary distributed antenna system of FIG. 1.
Figure 7B:
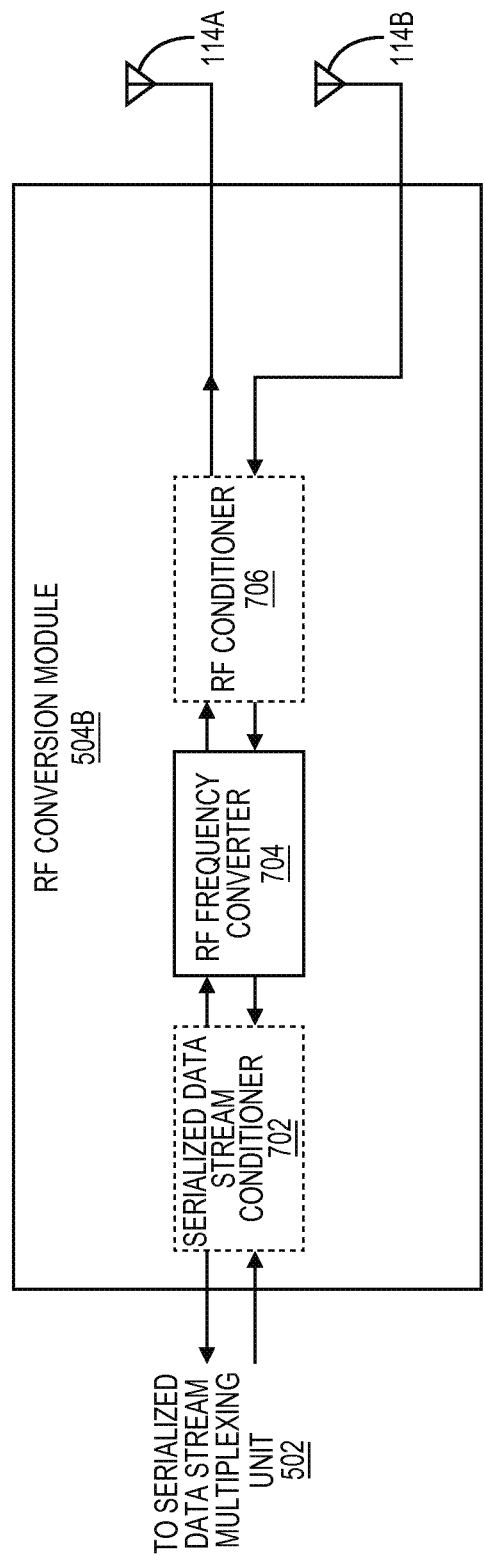
Figure 7C:
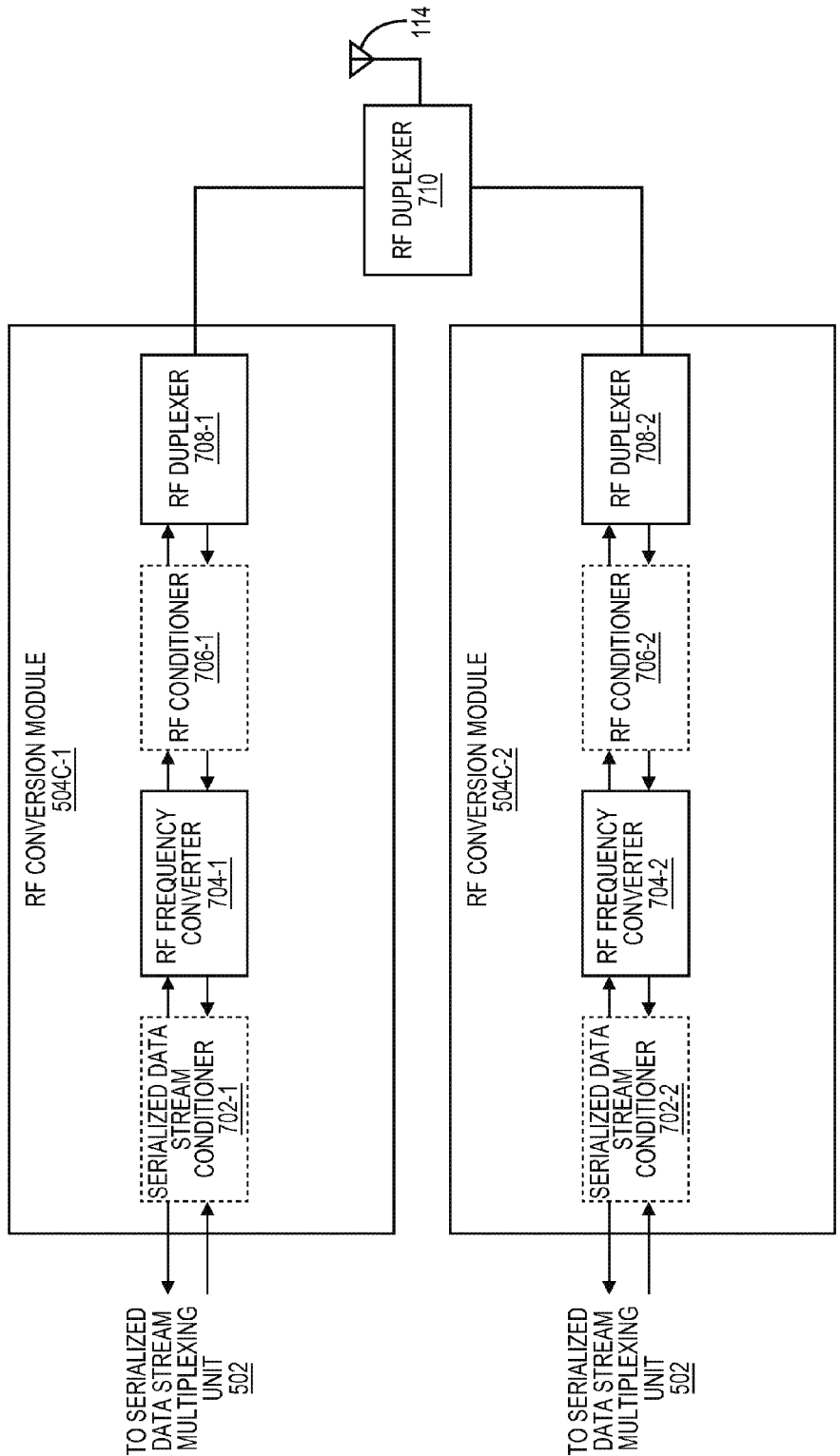

FIGS. 7A-7C are block diagrams of exemplary embodiments of RF conversion modules of remote antenna units 106 used in distributed antenna systems, such as the exemplary distributed antenna system 100 described above. Each of FIGS. 7A-7C illustrates a different embodiment of RF conversion module 504, labeled RF conversion module 504A-504C respectively.

FIG. 7A is a block diagram of an exemplary RF conversion module 504A including an optional serialized data stream conditioner 702, an RF frequency converter 704, an optional RF conditioner 706, and an RF duplexer 708 coupled to a single antenna 114.

The optional serialized data stream conditioner 702 is communicatively coupled to a remote serialized data stream unit 502 and the radio frequency (RF) converter 704. In the forward path, the optional serialized data stream conditioner 702 conditions the downlink serialized data stream (for example, through amplification, attenuation, and filtering) received from the remote serialized data stream unit 502 and passes the downlink serialized data stream to the RF converter 704. In the reverse path, the optional serialized data stream conditioner 702 conditions the uplink serialized data stream (for example, through amplification, attenuation, and filtering) received from the RF converter 704 and passes the uplink serialized data stream to the remote serialized data stream unit 502.

The RF converter 704 is communicatively coupled to either the remote serialized data stream unit 502 or the optional serialized data stream conditioner 702 on one side and to either RF duplexer 708 or the optional RF conditioner 706 on the other side. In the downstream, the RF converter 704 converts a downlink serialized data stream to downlink radio frequency (RF) signals and passes the downlink RF signals onto either the RF duplexer 708 or the optional RF conditioner 706. In the upstream, the RF converter 704 converts uplink radio frequency (RF) signals received from either the RF duplexer 708 or the optional RF conditioner 706 to an uplink serialized data stream and passes the uplink serialized data stream to either the remote serialized data stream unit 502 or the optional serialized data stream conditioner 702.

The RF duplexer 708 is communicatively coupled to either the RF frequency converter 704 or the optional RF conditioner 706 on one side and the antenna 114 on the other side. The RF duplexer 708 duplexes the downlink RF signals with the uplink RF signals for transmission/reception using the antenna 114.

FIG. 7B is a block diagram of an exemplary RF conversion module 504B including an optional serialized data stream conditioner 702, an RF frequency converter 704, and an optional RF conditioner 706 coupled to a downlink antenna 114A and an uplink antenna 114B. RF conversion module 504B includes similar components to RF conversion module 504A and operates according to similar principles and methods as RF conversion module 504A described above. The difference between RF conversion module 504B and RF conversion module 504A is that RF conversion module 504B does not include RF duplexer 708 and instead includes separate downlink antenna 114A used to transmit RF signals to at least one subscriber unit and uplink antenna 114B used to receive RF signals from at least one subscriber unit.

FIG. 7C is a block diagram of an exemplary RF conversion module 504C-1 and exemplary RF conversion module 504C-2 that share a single antenna 114 through an RF diplexer 710. The RF conversion module 504C-1 includes an optional serialized data stream conditioner 702-1, an RF frequency converter 704-1, an optional RF conditioner 706-1, and an RF duplexer 708-1 communicatively coupled to RF diplexer 710 that is communicatively coupled to antenna 114. Similarly, the RF conversion module 504C-2 includes an optional serialized data stream conditioner 702-2, an RF frequency converter 704-2, an optional RF conditioner 706-2, and an RF duplexer 708-2 communicatively coupled to RF diplexer 710 that is communicatively coupled to antenna 114. Each of RF conversion module 504C-1 and 504C-2 operate according to similar principles and methods as RF conversion module 504A described above. The difference between RF conversion modules 504C-1 and 504C-2 and RF conversion module 504A is that RF conversion modules 504C-1 and 504C-2 are both coupled to a single antenna 114 through RF diplexer 710. The RF diplexer 710 diplexes the duplexed downlink and uplink signals for both RF conversion module 504C-1 and 504C-2 for transmission/reception using the single antenna 114.

Figure 8A:
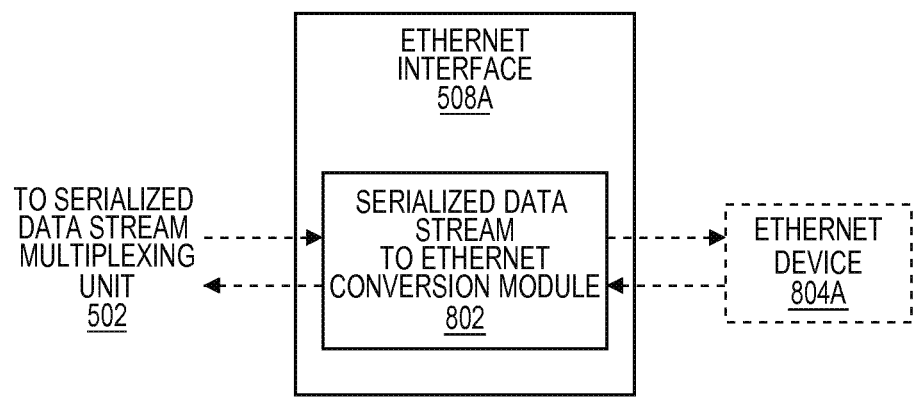
FIGS. 8A-8B are block diagrams of exemplary embodiments of Ethernet interfaces used in remote antenna units of distributed antenna systems, such as the exemplary distributed antenna system of FIG. 1.
Figure 8B:
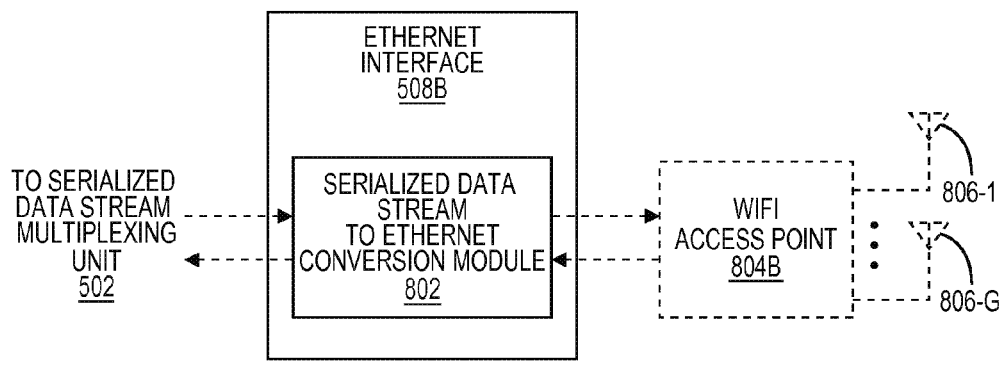

FIG. 8A-8B are block diagrams depicting exemplary embodiments of Ethernet interface 508 of remote antenna units 106 used in distributed antenna systems, such as exemplary distributed antenna system 100 described above. Each of FIGS. 8A-8B illustrates a different embodiment of an Ethernet interface 508A, labeled 508A-508B respectively.

FIG. 8A is a block diagram of an exemplary embodiment of an Ethernet interface 508, Ethernet interface 508A. Ethernet interface 508A includes a serialized data stream to Ethernet conversion module 802 communicatively coupled to a remote serialized data stream unit 502 and an Ethernet device 804A and acts as the interface between the remote serialized data stream unit 502 and the Ethernet device 804A. In the forward path, the serialized data stream to Ethernet conversion module 802 converts a downlink serialized data stream received from the remote serialized data stream unit 502 to downlink Ethernet frames and communicates the downlink Ethernet frames to the Ethernet device 804A. In the reverse path, the serialized data stream to Ethernet conversion module 802 converts uplink Ethernet frames received from the Ethernet device 804A to an uplink serialized data stream and communicates the uplink serialized data stream to the remote serialized data stream unit 502. In exemplary embodiments, the Ethernet device 804A interfaces with an internet protocol network.

FIG. 8B is a block diagram of an exemplary embodiment of an Ethernet interface, Ethernet interface 508B. Ethernet interface 508B includes a serialized data stream to Ethernet conversion module 802 communicatively coupled to a remote serialized data stream unit 502 and a wifi access point 804B and acts as the interface between the remote serialized data stream unit 502 and an wifi access point 804B. Ethernet interface 508B includes similar components to Ethernet interface 508A and operates according to similar principles and methods as Ethernet interface 508A described above. The difference between Ethernet interface 508B and Ethernet interface 508A is that Ethernet interface 508B interfaces with wifi access point 804B specifically instead of an Ethernet device 804A generally.

Figure 9A:
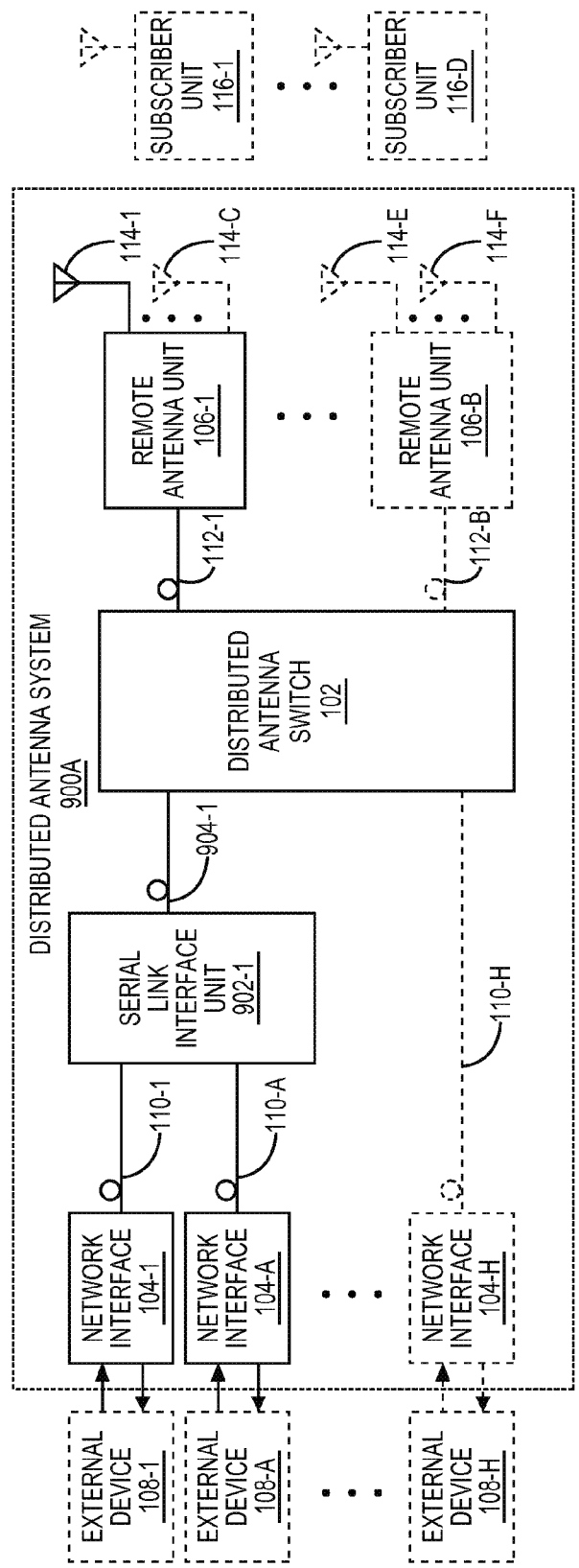
FIGS. 9A-9C are block diagrams of embodiments of additional exemplary distributed antenna systems using serial link interface units positioned between network interfaces and a distributed antenna switch.
Figure 9B:
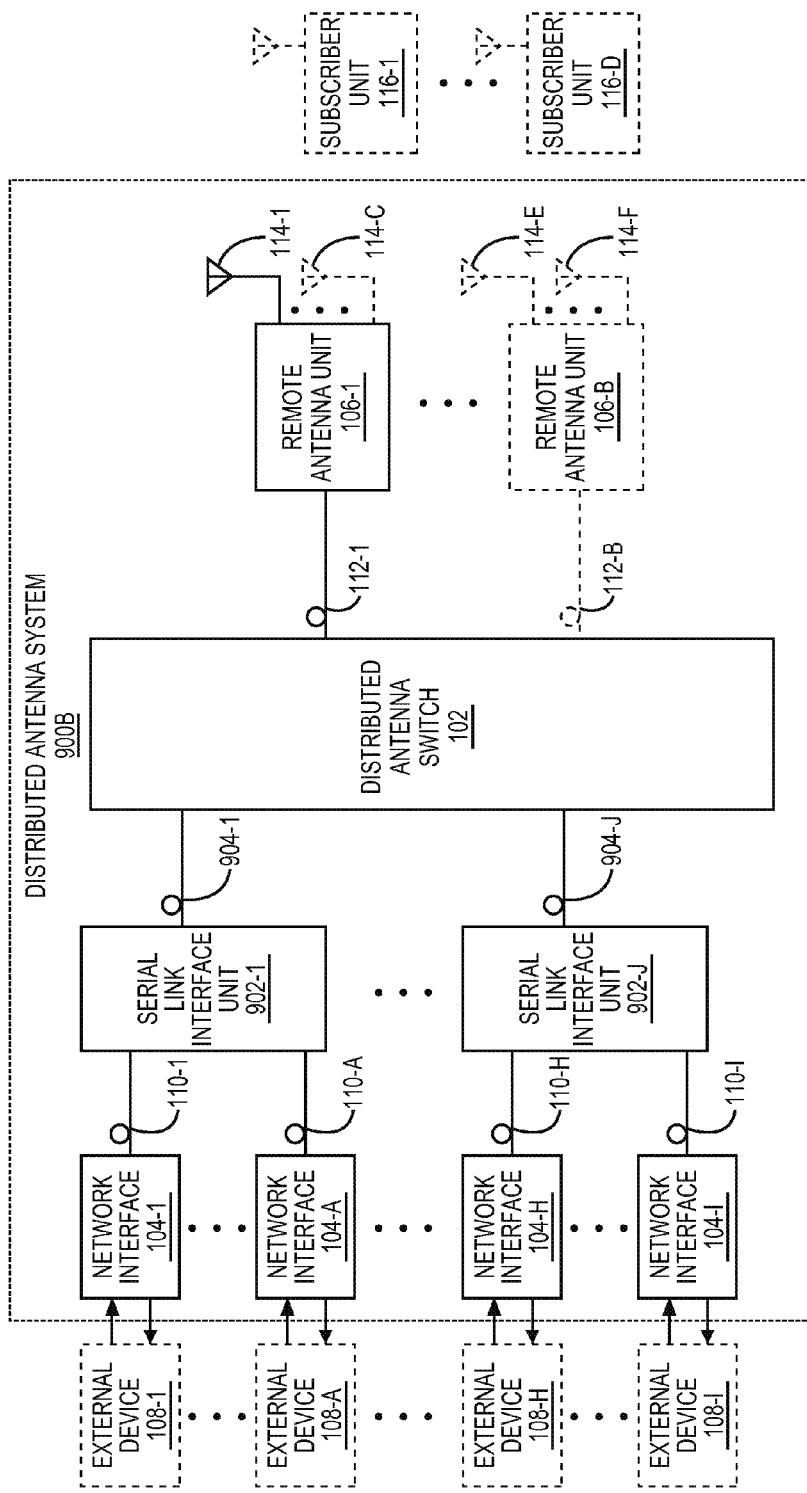
Figure 9C:
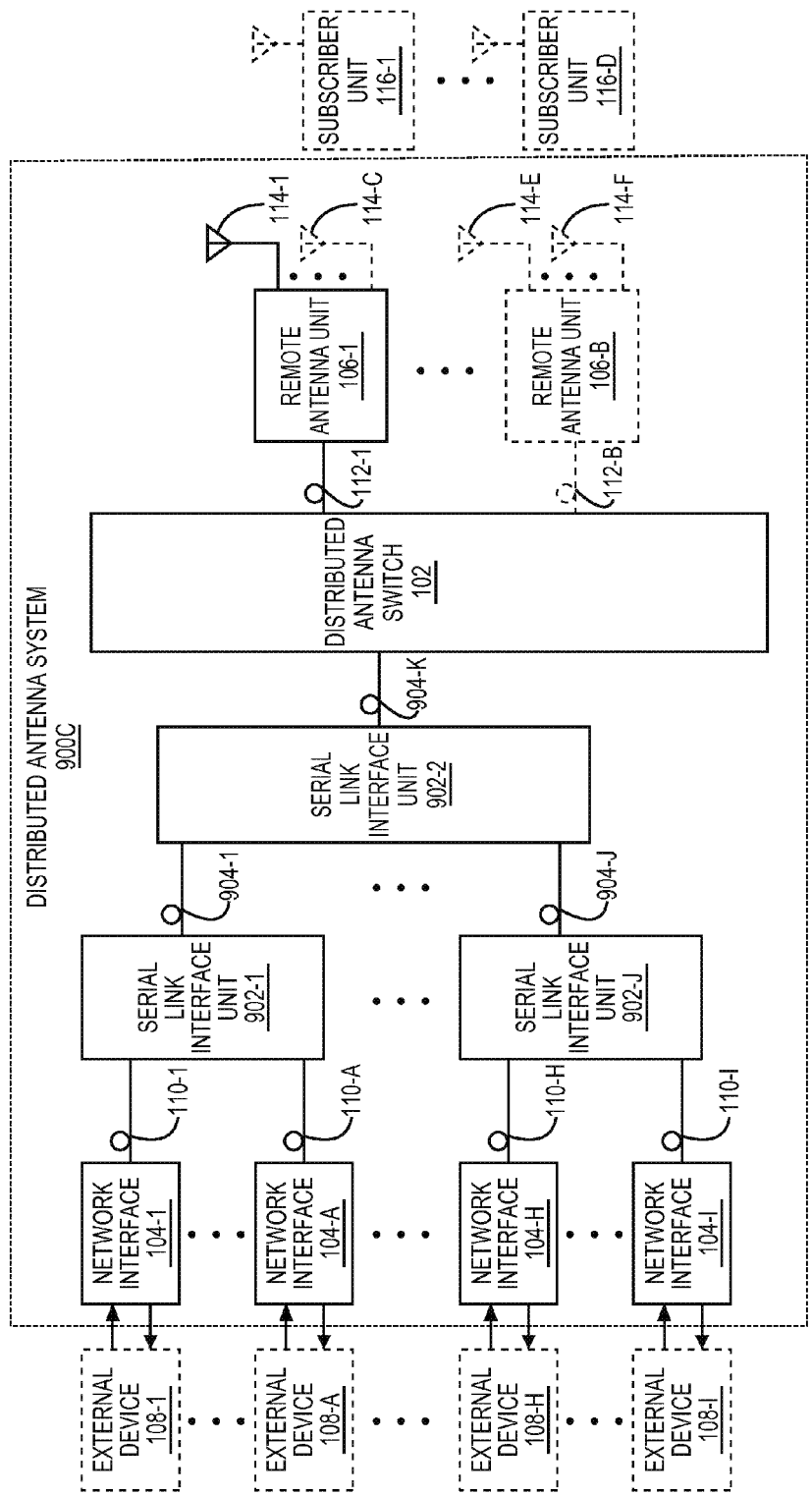

FIGS. 9A-9C are block diagrams of embodiments of additional exemplary distributed antenna systems 900 using serial link interface units 902 positioned between the network interfaces 104 and the distributed antenna switch 102. Each of FIGS. 9A-9C illustrates a different embodiment of a distributed antenna system 900, labeled 900A-900C respectively.

FIG. 9A is a block diagram of an exemplary embodiment of a distributed antenna system 900, labeled distributed antenna system 900A. Distributed antenna system 900A includes a plurality of network interfaces 104 communicatively coupled to external devices 108 and to a serial link interface unit 902-1 across digital communication links 110. Serial link interface unit 902-1 is communicatively coupled to distributed antenna switch 102 across digital communication link 904-1. Optional network interface 104-H is communicatively coupled an external device 108-H and to distributed antenna switch 102 across optional digital communication link 110-H. Distributed antenna switch 102 is communicatively coupled to at least one remote antenna unit 106 across at least one digital communication link 112. The at least one remote antenna unit 106 is communicatively coupled to at least one antenna 114. Distributed antenna system 900A includes similar components to distributed antenna system 100 and operates according to similar principles and methods as distributed antenna system 100. The difference between distributed antenna system 100 and distributed antenna system 900A is the inclusion of serial link interface unit 902-1.

In the forward path, serial link interface unit 902-1 aggregates downlink serialized data streams from a plurality of network interfaces 104 into a first aggregate downlink serialized data stream that it passes to distributed antenna switch 102 over digital communication link 102. Distributed antenna switch can then selectively aggregate downlink serialized data streams from the first aggregate downlink serialized data stream with any downlink serialized data streams from optional network interfaces 104 into at least a second aggregate downlink serialized data stream that it passes to remote antenna unit 106-1. In exemplary embodiments, distributed antenna switch can aggregate other sets of downlink serialized data streams into a third aggregate downlink serialized data stream that it passes to remote antenna unit 106-1. In the reverse path, distributed antenna switch 102 separates an aggregate uplink serialized data stream from remote antenna unit 106-1 into a plurality of uplink serialized data streams and passes at least some of the plurality of uplink serialized data streams to the serial link interface unit 902-1 that can separate at least one of the uplink serialized data streams into a plurality of uplink serialized data streams that are passed onto a plurality of network interfaces 104. The remainder of distributed antenna system 900A may operate similarly to distributed antenna system 100 described above.

FIG. 9B is a block diagram of an exemplary embodiment of a distributed antenna system 900, labeled distributed antenna system 900B. Distributed antenna system 900B includes a plurality of network interfaces 104 communicatively coupled to external devices 108 and to a plurality of serial link interface units 902. The plurality of serial link interface units 902 are communicatively coupled to the plurality of network interfaces and a distributed antenna switch 102. The distributed antenna switch 102 is coupled to at least one remote antenna unit 106. Distributed antenna system 900B includes similar components to distributed antenna system 900A and operates according to similar principles and methods as distributed antenna system 900A. The difference between distributed antenna system 900B and distributed antenna system 900A is that distributed antenna system 900B includes a plurality of serial link interface units 902. Each of the plurality of serial link interface units operate as described above with reference to serial link interface unit 902-1 and further described below.

FIG. 9C is a block diagram of an exemplary embodiment of a distributed antenna system 900, labeled distributed antenna system 900C. Distributed antenna system 900C includes a plurality of network interfaces 104 communicatively coupled to external devices 108 and to a plurality of serial link interface units 902. The plurality of serial link interface units 902 are communicatively coupled to the plurality of network interfaces and a serial link interface unit 902-2. The serial link interface unit 902-2 is communicatively coupled to the plurality of serial link interface units 902 and to the distributed antenna switch 102. Distributed antenna system 900C includes similar components to distributed antenna system 900B and operates according to similar principles and methods as distributed antenna system 900B. The difference between distributed antenna system 900C and distributed antenna system 900B is that distributed antenna system 900B includes cascaded serial link interface units 902 with serial link interface unit 902-2. In other embodiments, more serial link interface units 902 are cascaded. The cascading allows, among other enhancements, to include lower data rate network interfaces to be aggregated into higher data rate aggregate signals that are communicated to the distributed antenna switch. Each of the plurality of serial link interface units operate as described above with reference to serial link interface unit 902-1 and further described below.

FIGS. 10A-10D are block diagrams of serial link interface units 902 used in distributed antenna systems, such as the exemplary distributed antenna systems 900A-900C. Each of FIGS. 10A-10D illustrates a different embodiment of a serial link interface unit 902, labeled 902A-902D respectively.

Figure 10A:
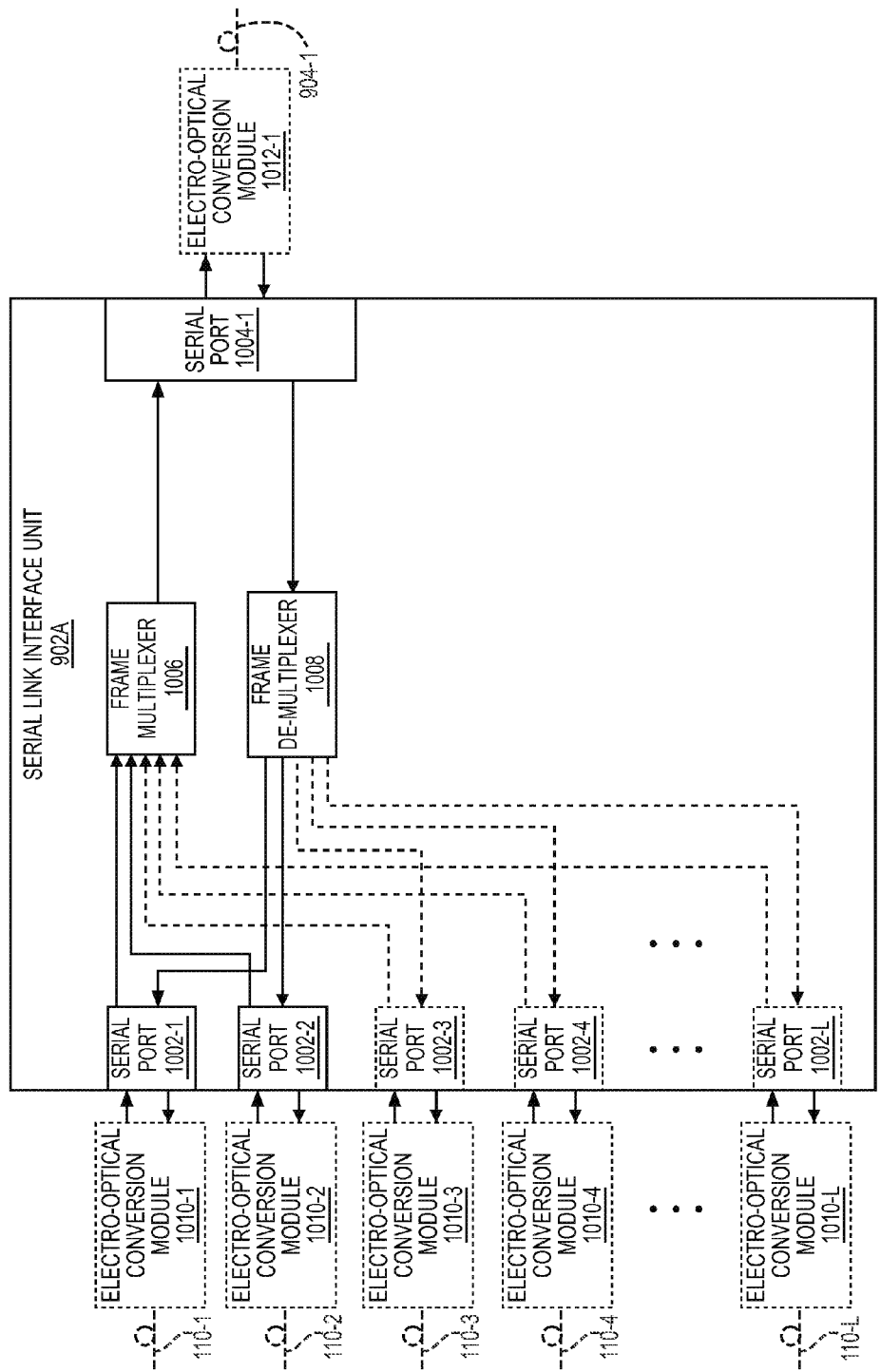
FIGS. 10A-10D are block diagrams of serial link interface units used in distributed antenna systems, such as the exemplary distributed antenna systems of FIGS. 9A-9C.

FIG. 10A is a block diagram of a serial link interface unit 902, labeled serial link interface unit 902A. Serial link interface unit 902A includes a plurality of serial ports 1002 (including serial port 1002-1, serial port 1002-2, and any optional serial port 1002 through serial port 1002-L), a serial port 1004-1, a frame multiplexer 1006, and a frame de-multiplexer 1008. In the forward path, each serial port 1002 receives a downlink serialized data stream from an electro-optical conversion module 1010 and passes it to the frame multiplexer 1006. Frame multiplexer multiplexes the downlink serialized data streams received from each serial port 1002 into an downlink aggregate serialized data stream and passes it to serial port 1004-1. Serial port 1004-1 receives the downlink aggregate serialized data stream and passes it to an electro-optical conversion module 1012-1. In the reverse path, the serial port 1004-1 receives an uplink aggregate serialized data stream from an electro-optical conversion module 1012-1 and passes it to the frame de-multiplexer 1008. The frame de-multiplexer 1008 separates the uplink aggregate serialized data stream into a plurality of uplink serialized data stream and passes them to respective serial ports 1002.

Figure 10B:
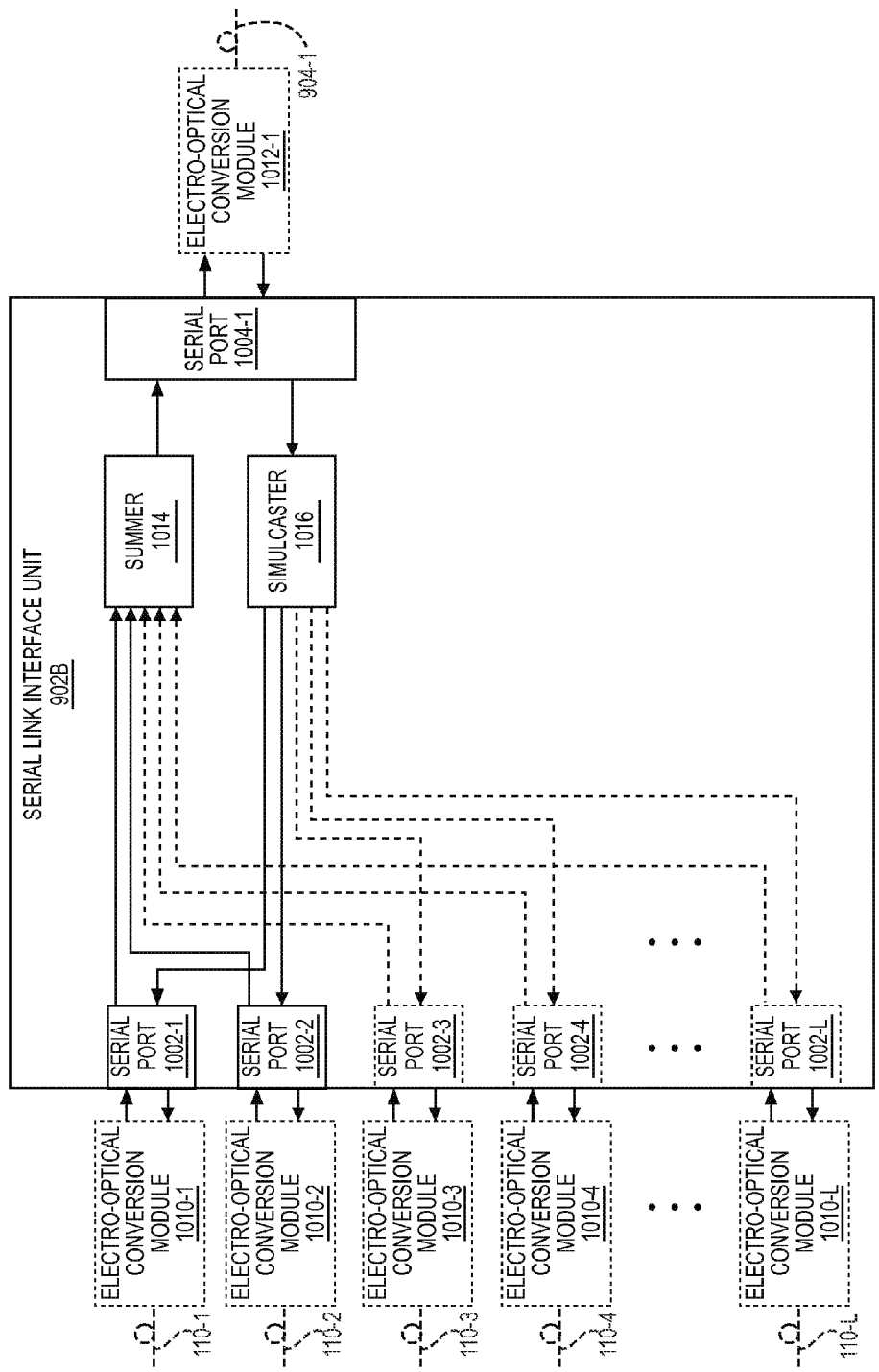

FIG. 10B is a block diagram of a serial link interface unit 902, labeled serial link interface unit 902B. Serial link interface unit 902B includes a plurality of serial ports 1002 (including serial port 1002-1, serial port 1002-2, and any optional serial port 1002 through serial port 1002-L), a serial port 1004-1, a summer 1014, and a simulcaster 1016. In the forward path, each serial port 1002 receives a downlink serialized data stream from an electro-optical conversion module 1010 and passes it to the summer 1014. Summer 1014 sums the downlink serialized data streams received from each serial port 1002 into a downlink aggregate serialized data stream and passes it to serial port 1004-1. Serial port 1004-1 receives the downlink aggregate serialized data stream and passes it to an electro-optical conversion module 1012-1. In the reverse path, the serial port 1004-1 receives an uplink aggregate serialized data stream from an electro-optical conversion module 1012-1 and passes it to the simulcaster 1016. The simulcaster 1016 simulcasts the uplink aggregate serialized data stream to the plurality of serial ports 1002.

Figure 10C:
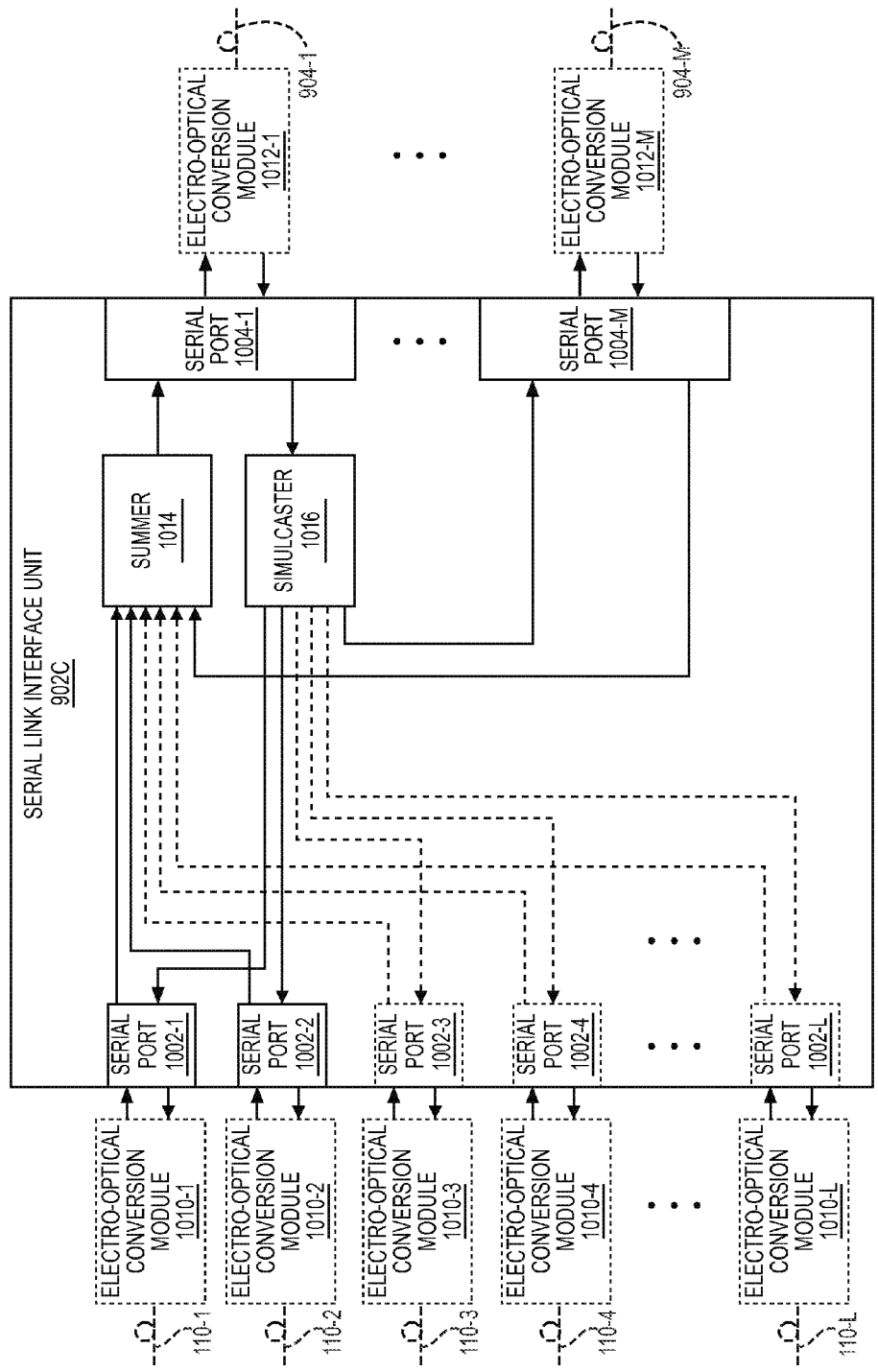

FIG. 10C is a block diagram of a serial link interface unit 902, labeled serial link interface unit 902C. Serial link interface unit 902C includes a plurality of serial ports 1002 (including serial port 1002-1, serial port 1002-2, and any optional serial port 1002 through serial port 1002-L), a plurality of serial ports 1004 (including serial port 1004-1 through serial port 1004-M), a summer 1014, and a simulcaster 1016. In the forward path, each serial port 1002 receives a downlink serialized data stream from an electro-optical conversion module 1010 and passes it to the summer 1014. Similarly, the serial port 1004-M receives a downlink serialized data stream from an electro-optical conversion module 1012-M and passes it to the summer 1014. Summer 1014 sums the downlink serialized data streams received from each serial port 1002 and the serial port 1004-M into a downlink aggregate serialized data stream and passes it to serial port 1004-1. Serial port 1004-1 receives the downlink aggregate serialized data stream and passes it to an electro-optical conversion module 1012-1. In the reverse path, the serial port 1004-1 receives an uplink aggregate serialized data stream from an electro-optical conversion module 1012-1 and passes it to the simulcaster 1016. The simulcaster 1016 simulcasts the uplink aggregate serialized data stream to the plurality of serial ports 1002 and the serial port 1004-M.

Figure 10D:
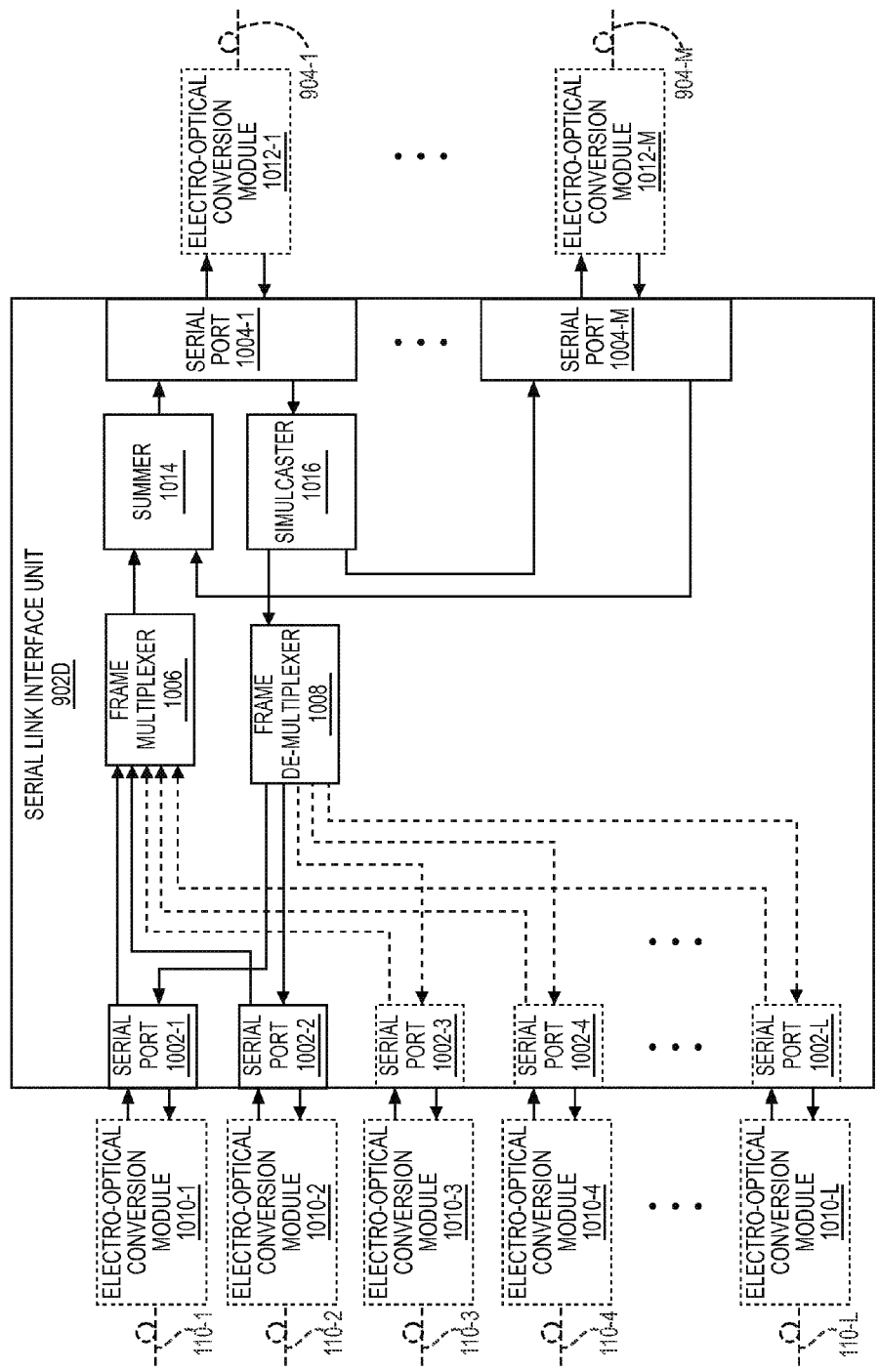

FIG. 10D is a block diagram of a serial link interface unit 902, labeled serial link interface unit 902D. Serial link interface unit 902D includes a plurality of serial ports 1002 (including serial port 1002-1, serial port 1002-2, and any optional serial port 1002 through serial port 1002-L), a plurality of serial ports 1004 (including serial port 1004-1 through serial port 1004-M), a frame multiplexer 1006, a frame de-multiplexer 1008, a summer 1014, and a simulcaster 1016. In the forward path, each serial port 1002 receives a downlink serialized data stream from an electro-optical conversion module 1010 and passes it to the frame multiplexer 1006. Frame multiplexer multiplexes the downlink serialized data streams received from each serial port 1002 into an downlink aggregate serialized data stream and passes it to summer 1014. The serial port 1004-M receives a downlink serialized data stream from an electro-optical conversion module 1012-M and passes it to the summer 1014. Summer 1014 sums the aggregate downlink serialized data stream received from the frame multiplexer 1006 with the downlink serialized data stream received from the serial port 1004-M into a second downlink aggregate serialized data stream and passes it to serial port 1004-1. Serial port 1004-1 receives the second downlink aggregate serialized data stream and passes it to an electro-optical conversion module 1012-1. In the reverse path, the serial port 1004-1 receives an uplink aggregate serialized data stream from an electro-optical conversion module 1012-1 and passes it to the simulcaster 1016. The simulcaster 1016 simulcasts the uplink aggregate serialized data stream to the frame de-multiplexer 1008 and the serial port 1004-M. The frame de-multiplexer 1008 separates the uplink aggregate serialized data stream into a plurality of uplink serialized data stream and passes them to respective serial ports 1002.

FIG. 11A-11D are block diagrams showing timeslot mapping in the serial link interfaces of FIGS. 10A-10D. Each of FIGS. 11A-11D illustrates a different embodiments of the timeslot mapping in the serial link interface of the corresponding FIGS. 10A-10D.

Figure 11A:
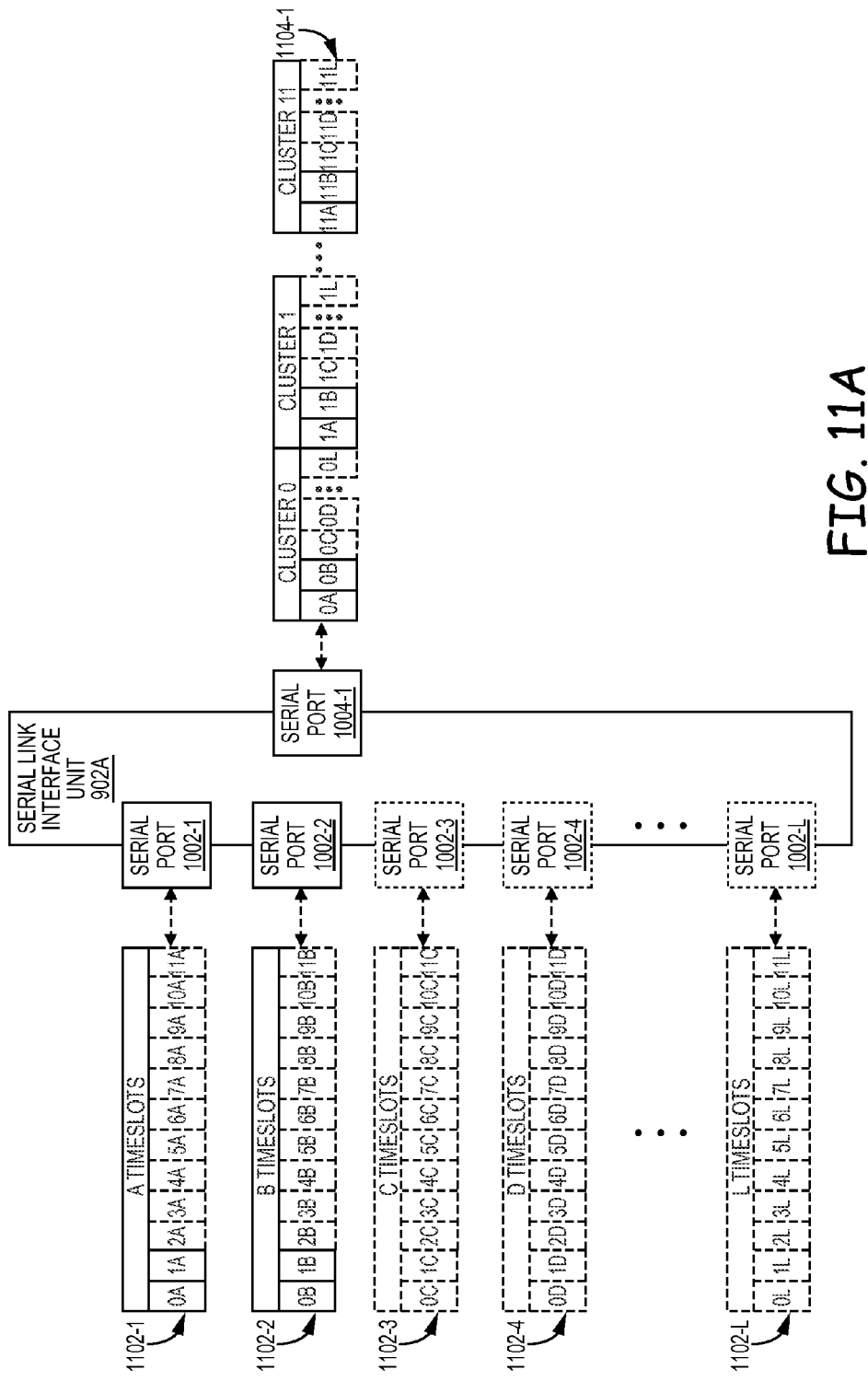
FIGS. 11A-11D are block diagrams showing timeslot mapping in the serial link interfaces of FIGS. 10A-10D.

FIG. 11A is a block diagram showing timeslot mapping in the serial link interface 902A. Data streams 1102 (including data stream 1102-1, data stream 1102-2, and any amount of optional data streams 1102 through optional data stream 1102-L) each include a plurality of timeslots. For example, data stream 1102-1 includes timeslots 0A, 1A, 2A, 3A, 4A, 5A, 6A, 7A, 8A, 9A, 10A, and 11A. Similarly, data stream 1102-2 includes timeslots 0B, 1B, 2B, 3B, 4B, 5B, 6B, 7B, 8B, 9B, 10B, and 11B. Other data streams include similar timeslots. In other embodiments, different amounts of timeslots are included in each data stream 1102. Data stream 1104-1 is an aggregate data stream includes a plurality of clusters organized such that the timeslots from all the data streams 1102 are mapped into timeslot clusters so that all of the first timeslots come first, then the second timeslots, etc. Specifically, cluster 0 includes timeslot 0 from each of the data streams 1102, such that cluster 0 includes timeslots 0A, 0B, etc. Cluster 1 includes timeslot 1 from each of the data streams 1102, such that cluster 1 includes timeslot 1A, 1B, etc. The clusters continue accordingly. This mapping generally applies in both the forward path to downlink serialized data streams and in the reverse path to uplink serialized data streams.

Figure 11B:
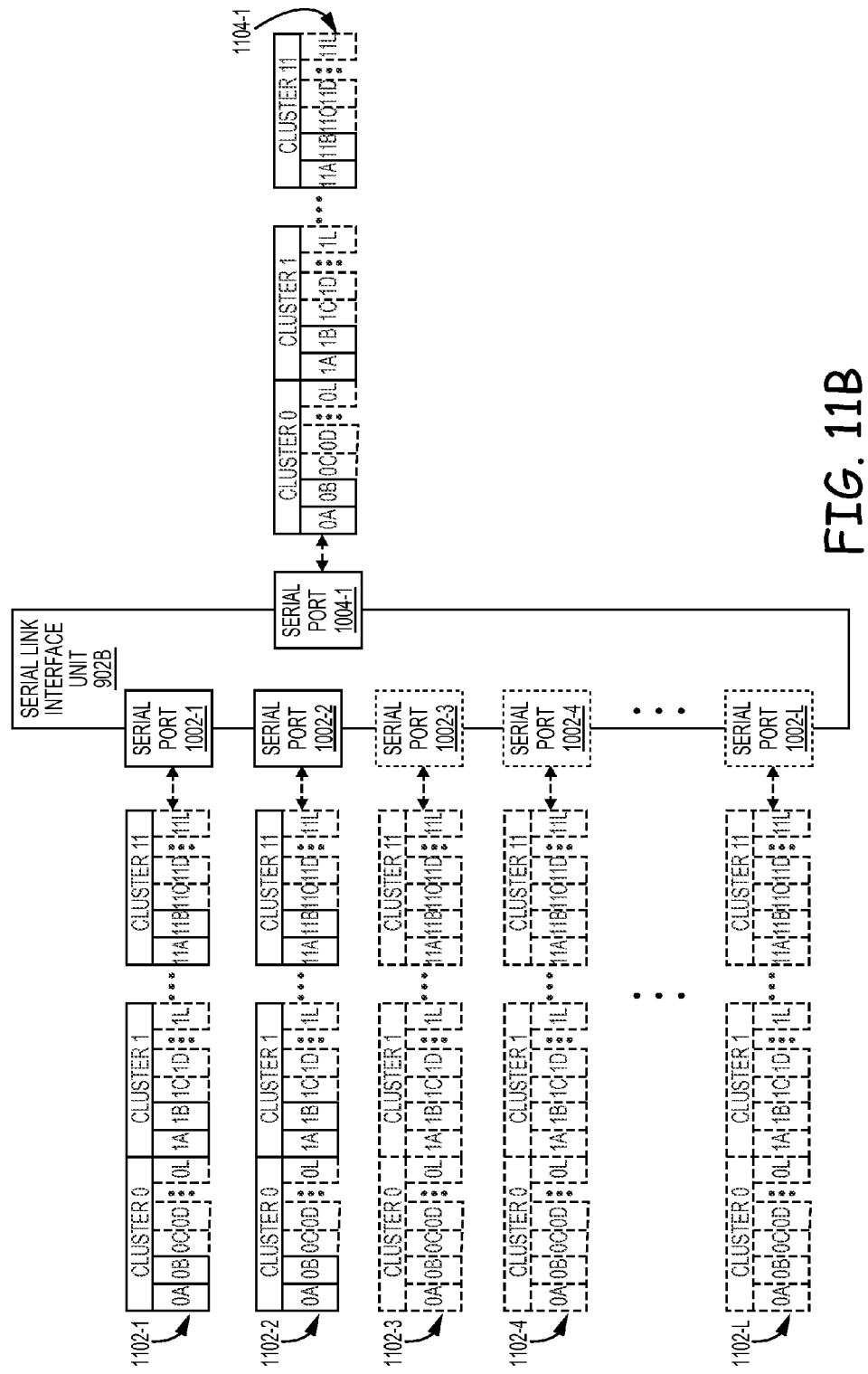

FIG. 11B is a block diagram showing timeslot mapping in the serial link interface 902B. Data streams 1102 (including data stream 1102-1, data stream 1102-2, and any amount of optional data streams 1102 through optional data stream 1102-L) and data stream 1104 are aggregate data streams and each include a plurality of clusters organized such that the timeslots from a plurality of data streams are mapped into the timeslot clusters so that all of the first timeslots come first, then the second timeslots, etc. Specifically, cluster 0 includes timeslot 0 from each of the data streams 1102, such that cluster 0 includes timeslots 0A, 0B, etc. Cluster 1 includes timeslot 1 from each of the data streams 1102, such that cluster 1 includes timeslot 1A, 1B, etc. The clusters continue accordingly. This mapping generally applies in both the forward path to downlink serialized data streams and in the reverse path to uplink serialized data streams.

Figure 11C:
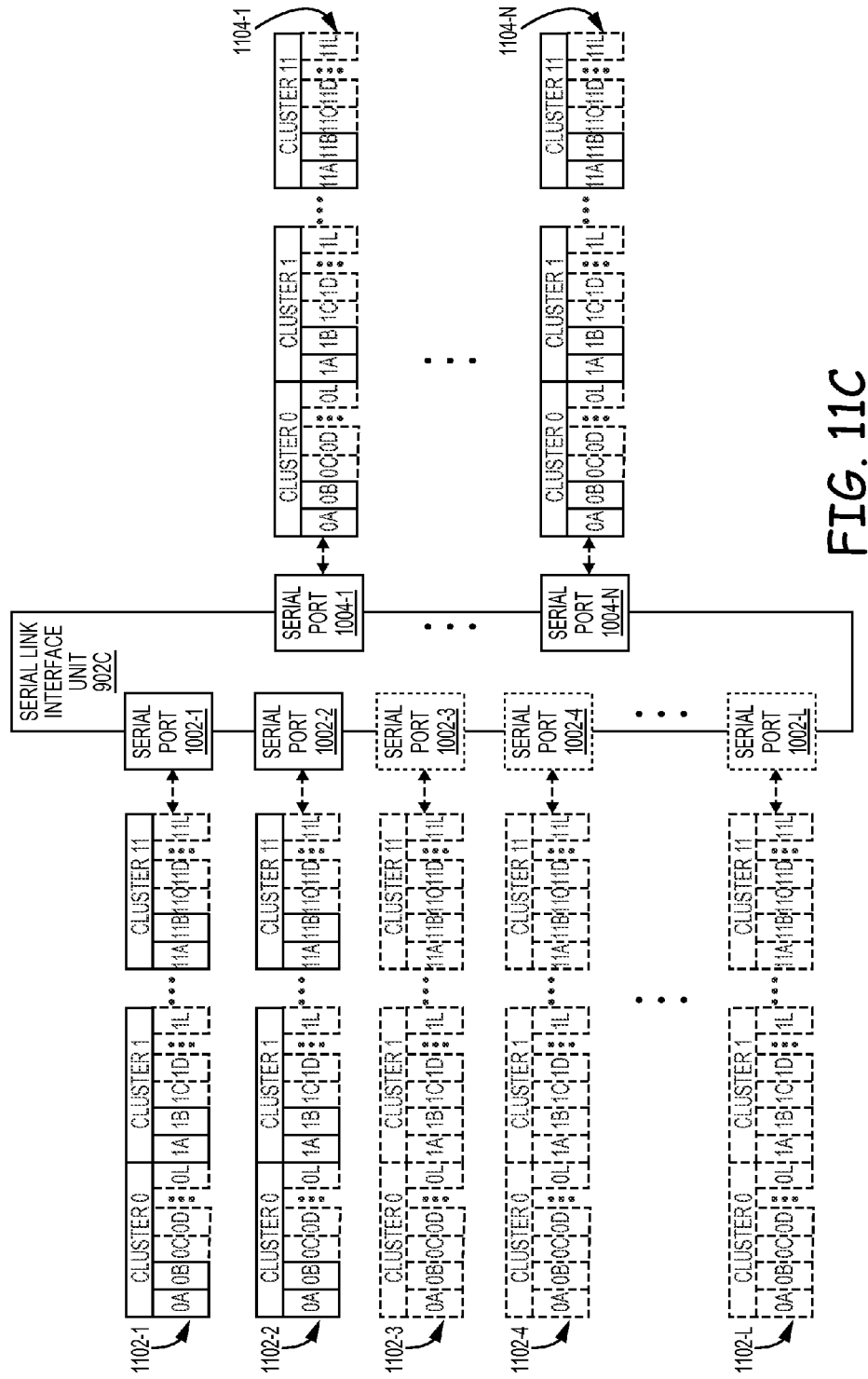

FIG. 11C is a block diagram showing timeslot mapping in the serial link interface 902C. The timeslot mapping in FIG. 11C is similar to the timeslot mapping in FIG. 11B with the difference that additional data stream 1104-N is an aggregate data stream that includes a plurality of clusters organized so that all of the first timeslots come first, then the second timeslots, etc. as with aggregate data stream 1104-1.

Figure 11D:
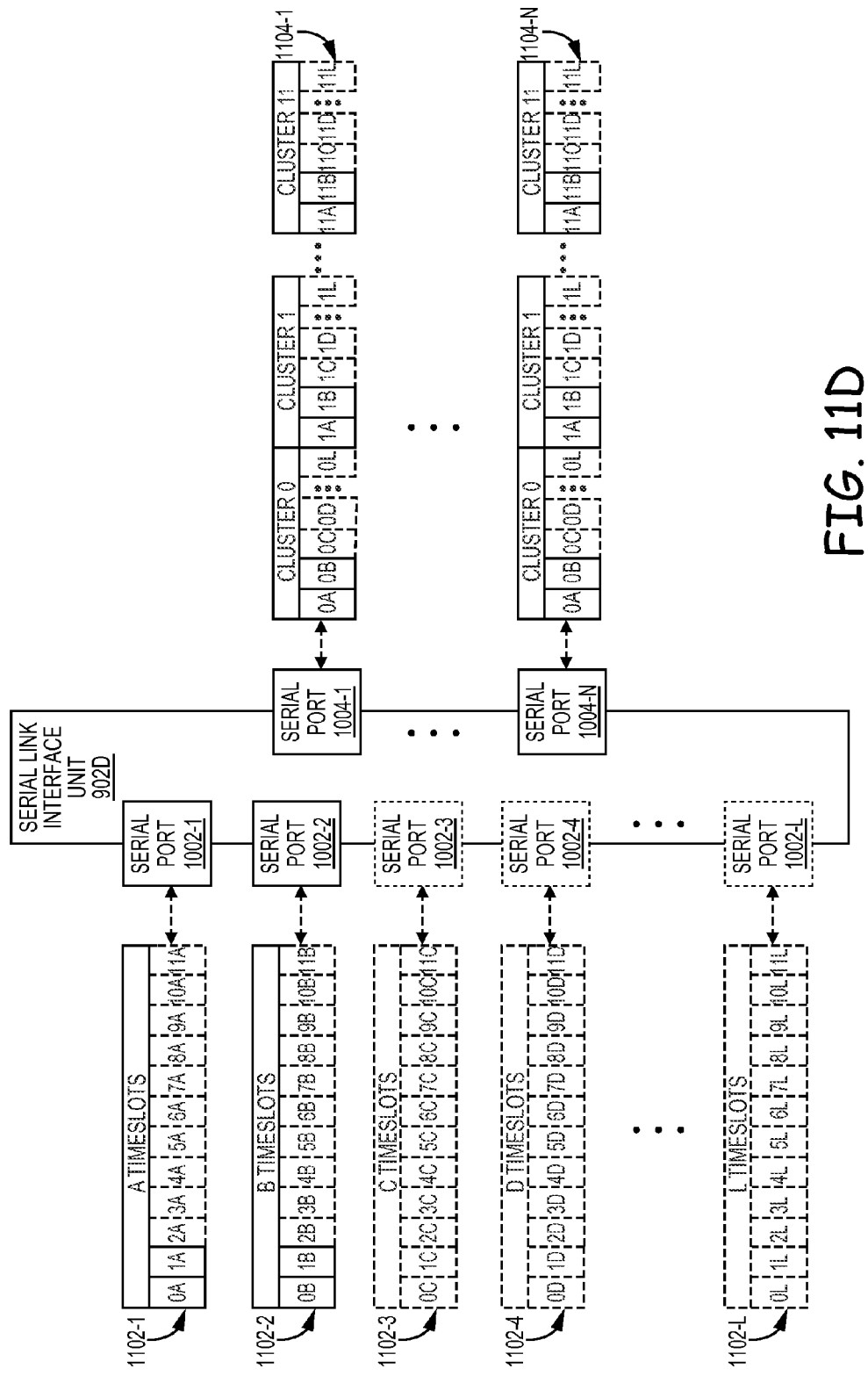

FIG. 11D is a block diagram showing timeslot mapping the serial link interface 902D. The timeslot mapping in FIG. 11D is similar to the timeslot mapping in FIG. 11A with the difference that additional data stream 1104-N is an aggregate data stream that includes a plurality of clusters organized so that all of the first timeslots come first, then the second timeslots, etc. as with aggregate data stream 1104-1.

Figure 12A:
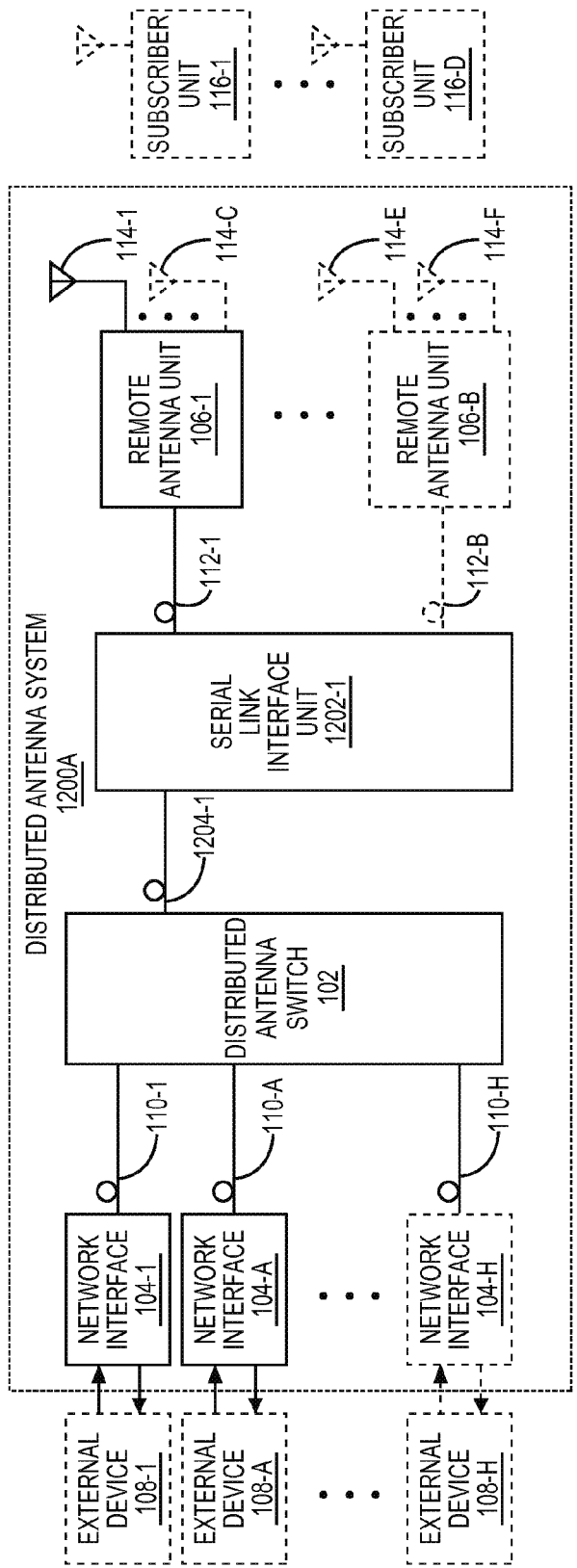
FIGS. 12A-12C are block diagrams of embodiments of additional exemplary distributed antenna systems using serial link interface units positioned between a distributed antenna switch and remote units.
Figure 12B:
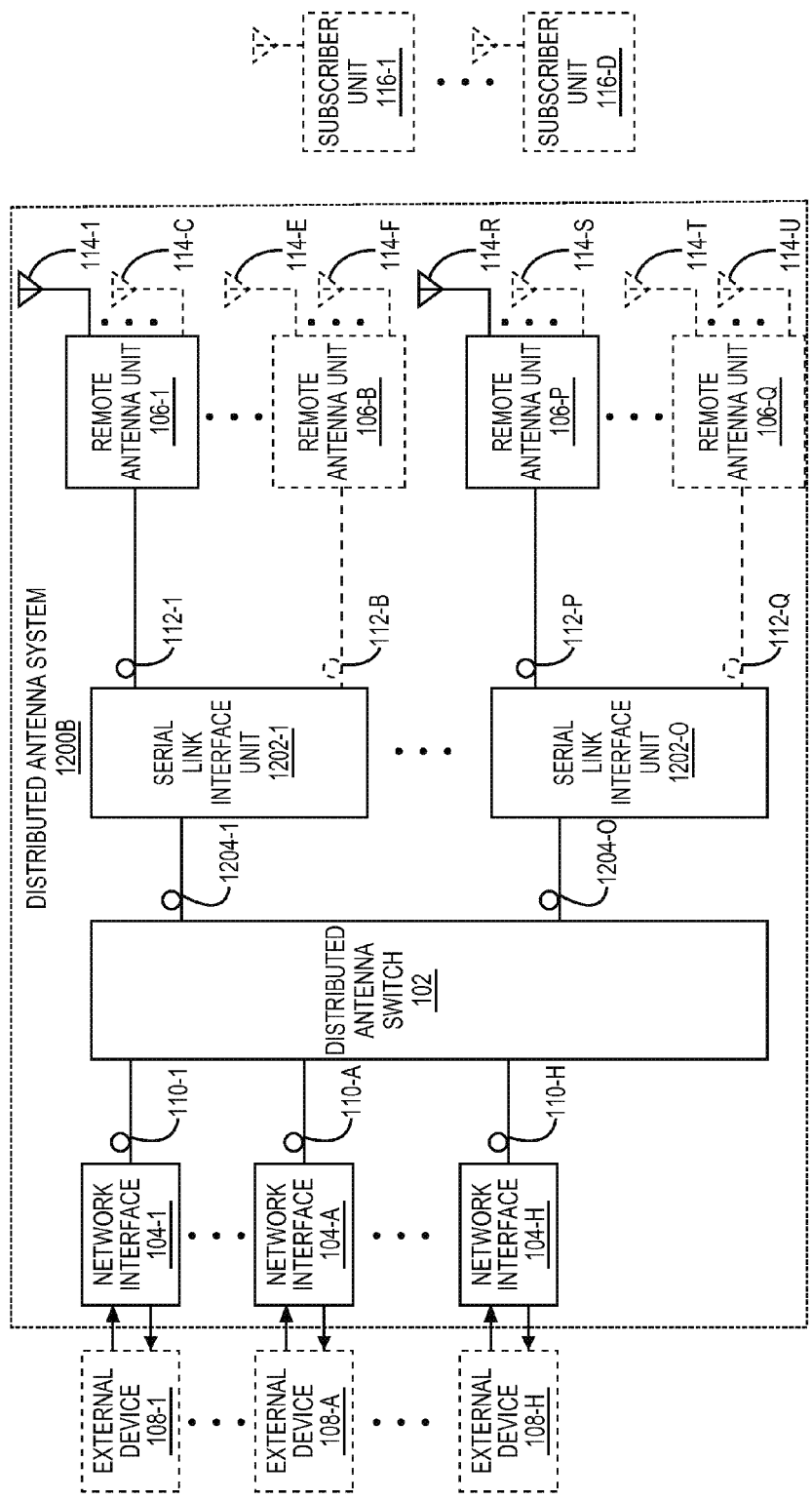
Figure 12C:
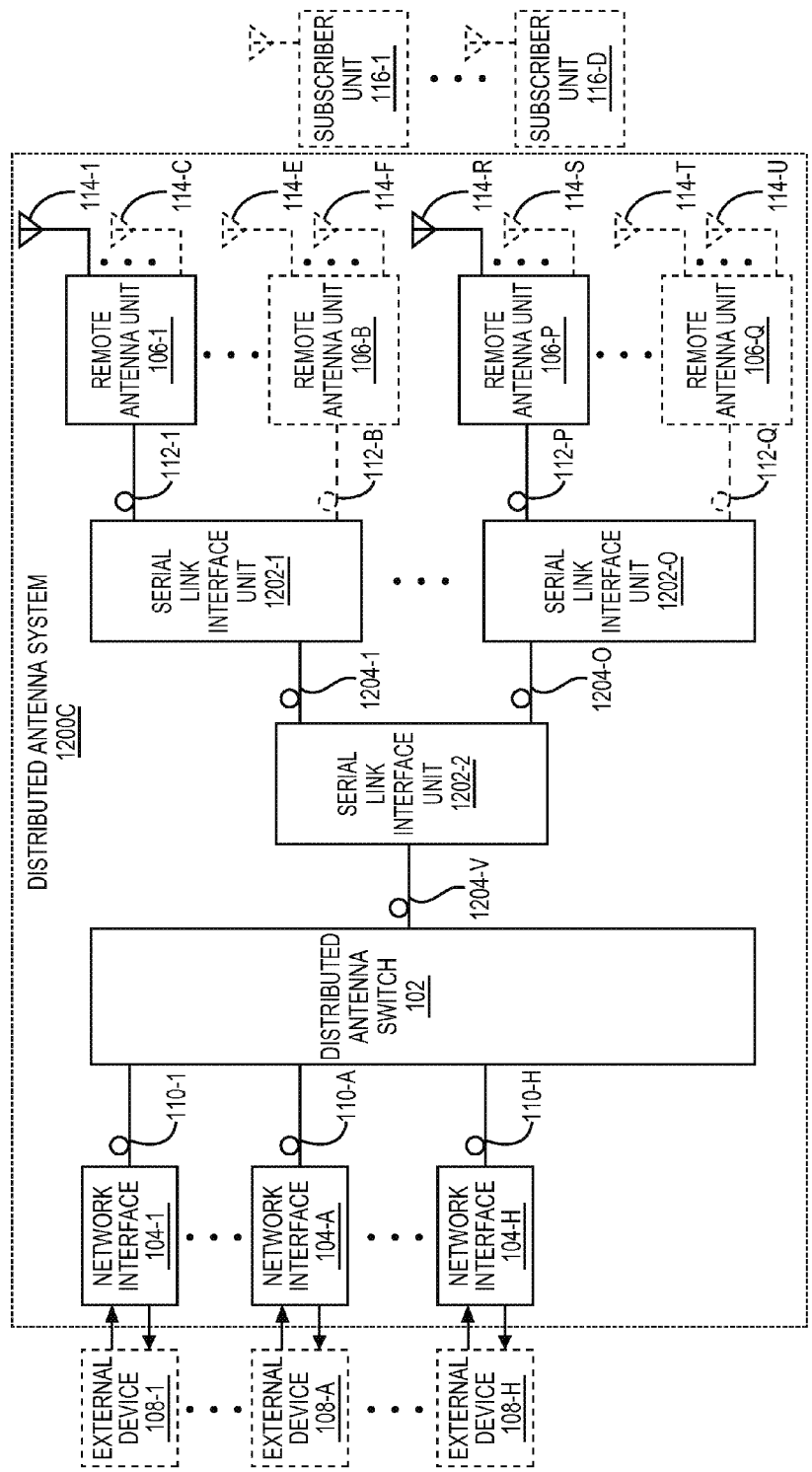

FIGS. 12A-12C are block diagrams of embodiments of additional exemplary distributed antenna systems 900 using serial link interface units 1202 positioned between the distributed antenna switch 102 and the at least one remote antenna unit 106. Each of FIGS. 12A-12C illustrates a different embodiment of a distributed antenna system 1200, labeled 1200A-1200C respectively.

FIG. 12A is a block diagram of an exemplary embodiment of a distributed antenna system 1200, labeled distributed antenna system 1200A. Distributed antenna system 1200A includes a plurality of network interfaces 104 communicatively coupled to external devices 108 and to distributed antenna switch 102 across digital communication links 110. Distributed antenna switch 102 is communicatively coupled to serial link interface unit 1202-1 through digital communication link 1204-1. Serial link interface unit is communicatively coupled to at least one remote antenna unit 106 across at least one digital communication link 112. The at least one remote antenna unit 106 is communicatively coupled to at least one antenna 114. Distributed antenna system 1200A includes similar components to distributed antenna system 100 and operates according to similar principles and methods as distributed antenna system 100. The difference between distributed antenna system 100 and distributed antenna system 1200A is the inclusion of serial link interface unit 1202-1.

In the forward path, serial link interface unit 902-1 receives an aggregate downlink serialized data stream and either simulcasts the aggregate downlink serialized data stream to the at least one remote antenna unit 106-1 or separates the aggregate downlink serialized data stream into a plurality of downlink serialized data streams and communicates one of the plurality of downlink serialized data streams to the at least one remote antenna unit 106-1. In exemplary embodiments, the serial link interface unit 1202-1 simulcasts the aggregate downlink serialized data stream to a plurality of remote antenna units 106. In other exemplary embodiments, the serial link interface unit 1202-1 separates the aggregate downlink serialized data stream into a plurality of downlink serialized data streams and communicates each of the plurality of downlink serialized data stream to a different remote antenna unit 106. In the reverse path, serial link interface unit 1202-1 receives uplink serialized data streams from at least one remote antenna unit 106. In exemplary embodiments, the serial link interface unit 1202-1 aggregates a plurality of uplink serialized data streams at a lower data rate into a single aggregate data stream at a higher data rate and passes that to the distributed antenna switch 102. In other exemplary embodiments, the serial link interface unit 1202-1 sums a plurality of uplink serialized data streams into a single aggregate data stream and passes that to the distributed antenna switch 102. The remainder of distributed antenna system 900A may operate similarly to distributed antenna system 100 described above.

FIG. 12B is a block diagram of an exemplary embodiment of a distributed antenna system 1200, labeled distributed antenna system 1200B. Distributed antenna system 1200B includes a plurality of network interfaces 104 communicatively coupled to external devices 108 and to a distributed antenna switch 102. The distributed antenna switch 102 is coupled to a plurality of serial link interface units 1202. The plurality of serial link interface units 1202 are communicatively coupled to the distributed antenna switch 102 and at least one remote antenna unit 106 each. Distributed antenna system 1200B includes similar components to distributed antenna system 1200A and operates according to similar principles and methods as distributed antenna system 1200A. The difference between distributed antenna system 1200B and distributed antenna system 1200A is that distributed antenna system 1200B includes a plurality of serial link interface units 1202. Each of the plurality of serial link interface units operate as described above with reference to serial link interface unit 1202-1 and further described below.

FIG. 12C is a block diagram of an exemplary embodiment of a distributed antenna system 1200, labeled distributed antenna system 1200C. Distributed antenna system 1200C includes a plurality of network interfaces 104 communicatively coupled to external devices 108 and to a distributed antenna switch 102. The distributed antenna switch 102 is communicatively coupled to a serial link interface unit 1202-2. The serial link interface unit 1202-2 is communicatively coupled to a plurality of serial link interface units 1202. The plurality of serial link interface units 1202 are communicatively coupled to at least one remote antenna unit 106 each.

Distributed antenna system 1200C includes similar components to distributed antenna system 1200B and operates according to similar principles and methods as distributed antenna system 1200B. The difference between distributed antenna system 1200C and distributed antenna system 1200B is that distributed antenna system 1200B includes cascaded serial link interface units 1202 with serial link interface unit 1202-2. In other embodiments, more serial link interface units 1202 are cascaded. The cascading allows, among other enhancements, to include lower data rate remote antenna units to be aggregated into higher data rate aggregate signals that are communicated to the distributed antenna switch. Each of the plurality of serial link interface units operate as described above with reference to serial link interface unit 1202-1 and further described below.

FIGS. 13A-13D are block diagrams of serial link interface units 1202 used in distributed antenna systems, such as the exemplary distributed antenna systems 1200A-1200C. Each of FIGS. 13A-13D illustrates a different embodiment of a serial link interface unit 1202, labeled 1302A-1302D respectively.

Figure 13A:
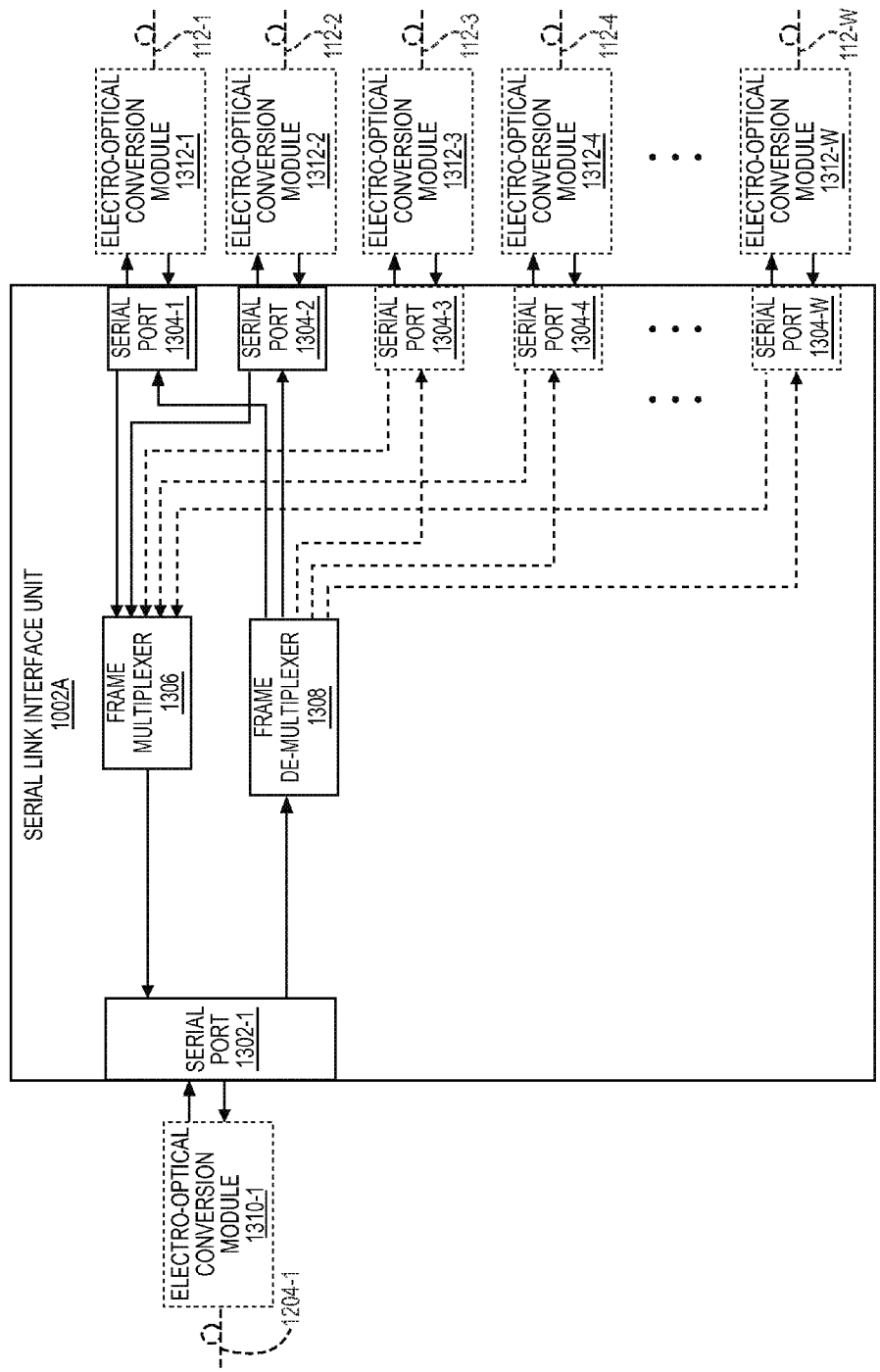
FIGS. 13A-13D are block diagrams of serial link interface units used in distributed antenna systems, such as the exemplary distributed antenna systems of FIGS. 12A-12C.

FIG. 13A is a block diagram of a serial link interface unit 1202, labeled serial link interface unit 1202A. Serial link interface unit 1202A includes a serial port 1302-1, a plurality of serial ports 1304 (including serial port 1304-1, serial port 1304-2, and any optional serial port 1304 through serial port 1304-W), a frame multiplexer 1306, and a frame de-multiplexer 1308. In the forward path, the serial port 1302-1 receives a downlink aggregate serialized data stream from an electro-optical conversion module 1310-1 and passes it to the frame de-multiplexer 1308. The frame de-multiplexer 1308 separates the downlink aggregate serialized data stream into a plurality of downlink serialized data stream and passes them to respective serial ports 1304. In the reverse path, each serial port 1304 receives an uplink serialized data stream from an electro-optical conversion module 1312 and passes it to the frame multiplexer 1306. Frame multiplexer 1306 multiplexes the uplink serialized data streams received from each serial port 1302 into an uplink aggregate serialized data stream and passes it to serial port 1302-1. Serial port 1302-1 receives the uplink aggregate serialized data stream and passes it to an electro-optical conversion module 1310-1.

Figure 13B:
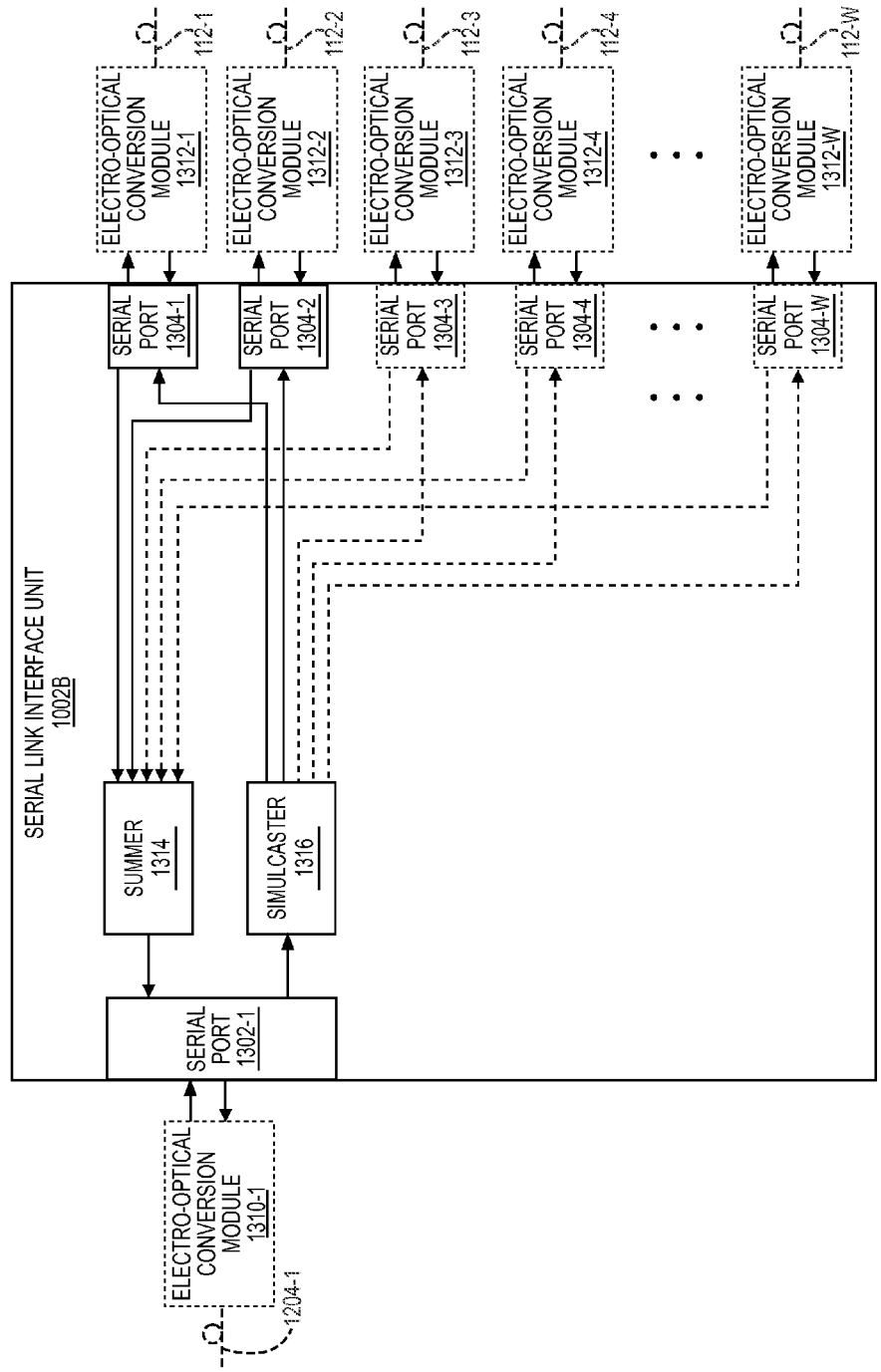

FIG. 13B is a block diagram of a serial link interface unit 1002, labeled serial link interface unit 1002B. Serial link interface unit 1002B includes a serial port 1302-1, a plurality of serial ports 1304 (including serial port 1404-1, serial port 1304-2, and any optional serial port 1304 through serial port 1304-W), a summer 1314, and a simulcaster 1316. In the forward path, the serial port 1302-1 receives a downlink aggregate serialized data stream from an electro-optical conversion module 1310-1 and passes it to the simulcaster 1016. The simulcaster 1016 simulcasts the downlink aggregate serialized data stream to the plurality of serial ports 1304. In the reverse path, each serial port 1304 receives an uplink serialized data stream from an electro-optical conversion module 1312 and passes it to the summer 1314. Summer 1014 sums the uplink serialized data streams received from each serial port 1002 into an uplink aggregate serialized data stream and passes it to serial port 1302-1. Serial port 1302-1 receives the uplink aggregate serialized data stream and passes it to an electro-optical conversion module 1310-1.

Figure 13C:
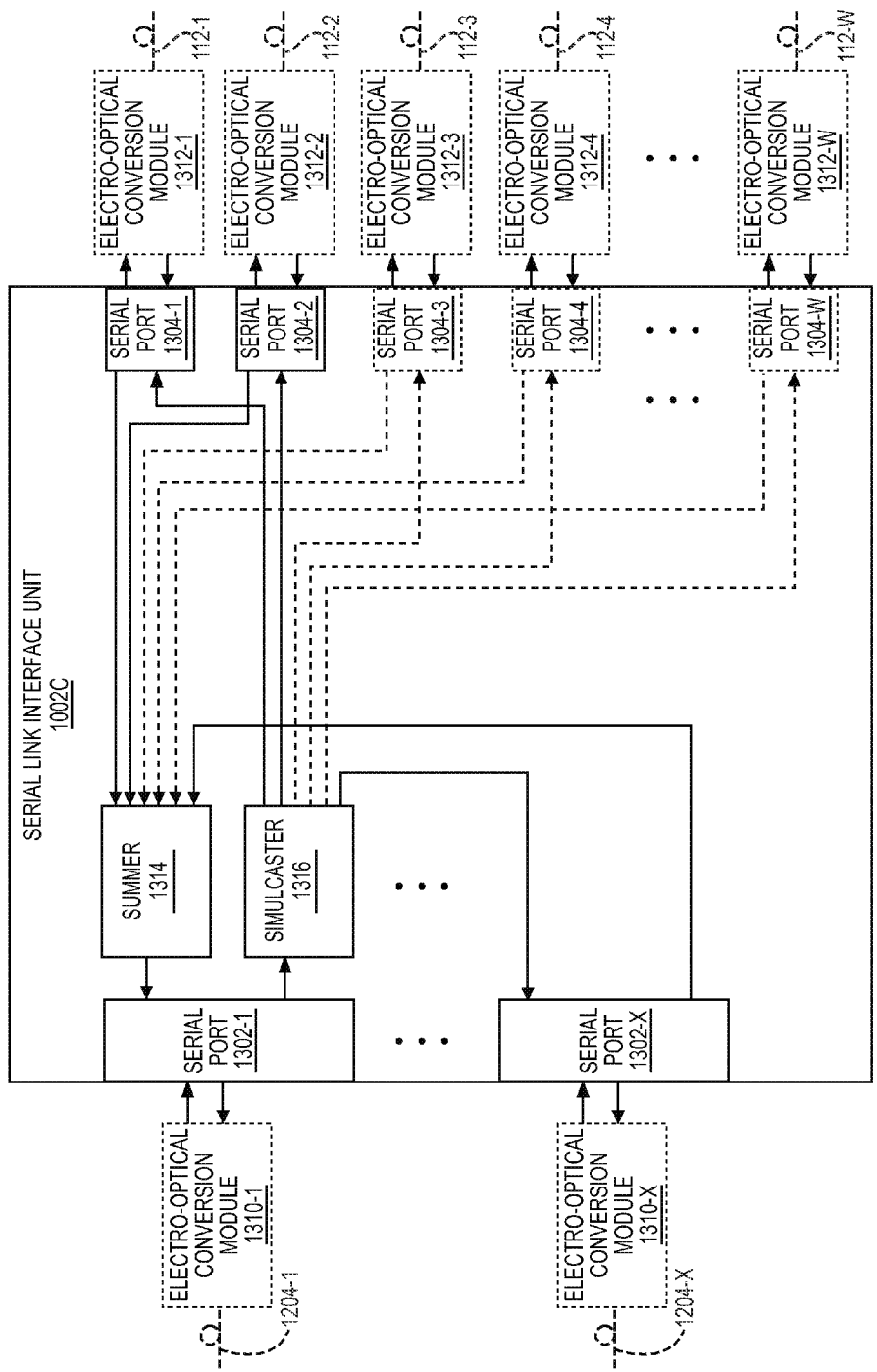

FIG. 13C is a block diagram of a serial link interface unit 1002, labeled serial link interface unit 1002C. Serial link interface unit 1002C includes a plurality of serial ports 1302 (including serial port 1302-1 through serial port 1302-X), a plurality of serial ports 1304 (including serial port 1304-1, serial port 1304-2, and any optional serial port 1304 through serial port 1304-W), a summer 1314, and a simulcaster 1316. In the forward path, the serial port 1302-1 receives a downlink aggregate serialized data stream from an electro-optical conversion module 1310-1 and passes it to the simulcaster 1316. The simulcaster 1316 simulcasts the downlink aggregate serialized data stream to the plurality of serial ports 1304 and the serial port 1302-X. In the reverse path, each serial port 1304 receives an uplink serialized data stream from an electro-optical conversion module 1312 and passes it to the summer 1314. Similarly, the serial port 1302-X receives an uplink serialized data stream from an electro-optical conversion module 1310-X and passes it to the summer 1314. Summer 1314 sums the uplink serialized data streams received from each serial port 1304 and the serial port 1302-X into a uplink aggregate serialized data stream and passes it to serial port 1302-1. Serial port 1302-1 receives the uplink aggregate serialized data stream and passes it to an electro-optical conversion module 1310-1.

Figure 13D:
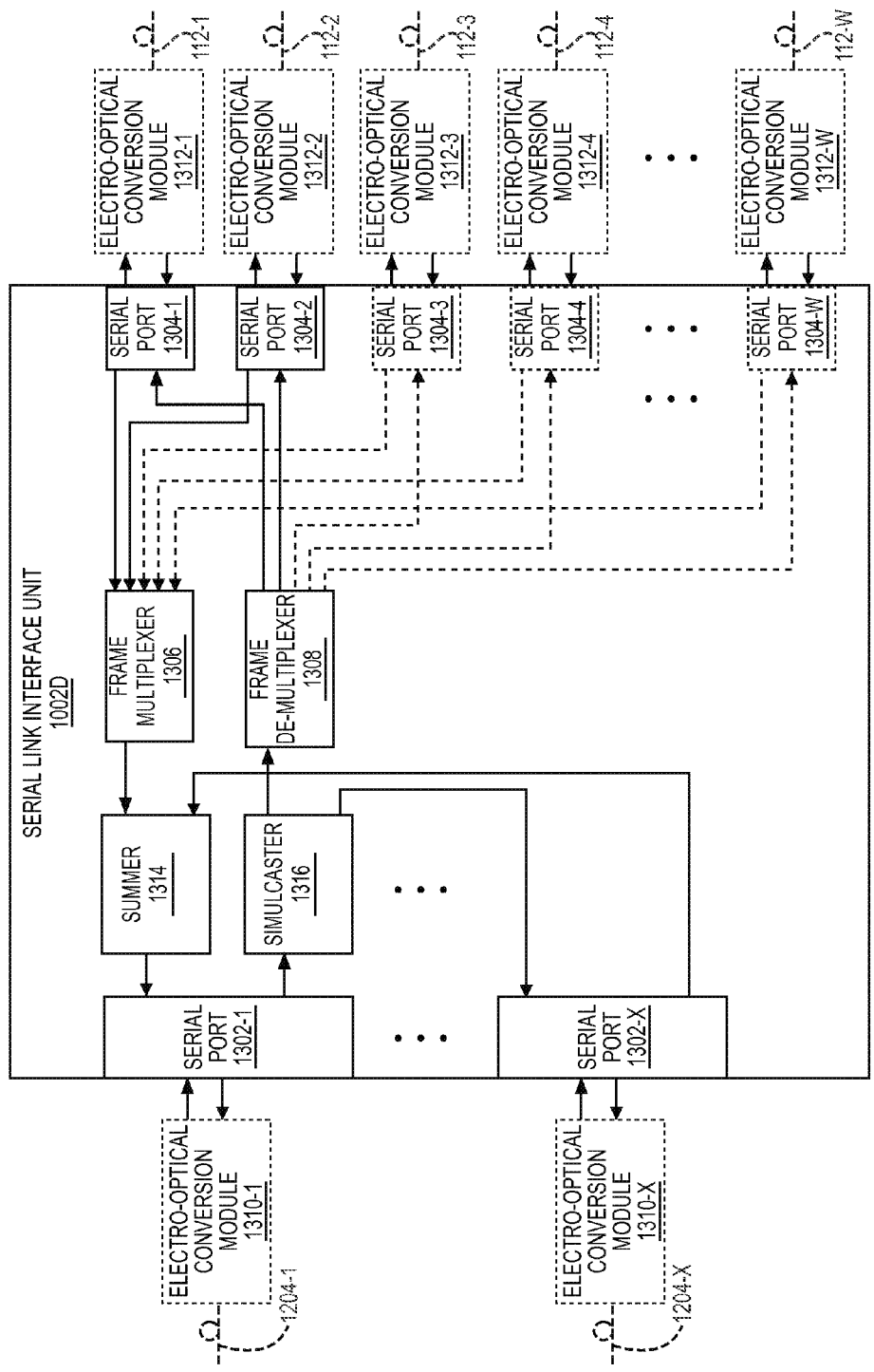

FIG. 13D is a block diagram of a serial link interface unit 1002, labeled serial link interface unit 1002D. Serial link interface unit 1002D includes a plurality of serial ports 1302 (including serial port 1302-1 through serial port 1302-X), a plurality of serial ports 1304 (including serial port 1304-1, serial port 1304-2, and any optional serial port 1304 through serial port 1304-W), a frame multiplexer 1306, a frame de-multiplexer 1308, a summer 1314, and a simulcaster 1316. In the forward path, the serial port 1302-1 receives a downlink aggregate serialized data stream from an electro-optical conversion module 1310-1 and passes it to the simulcaster 1316. The simulcaster 1316 simulcasts the downlink aggregate serialized data stream to the frame de-multiplexer 1308 and the serial port 1302-X. The frame de-multiplexer 1308 separates the downlink aggregate serialized data stream into a plurality of downlink serialized data stream and passes them to respective serial ports 1304. In the reverse path, each serial port 1304 receives an uplink serialized data stream from an electro-optical conversion module 1312 and passes it to the frame multiplexer 1306. Frame multiplexer 1306 multiplexes the uplink serialized data streams received from each serial port 1304 into an uplink aggregate serialized data stream and passes it to summer 1314. The serial port 1302-X receives an uplink serialized data stream from an electro-optical conversion module 1310-X and passes it to the summer 1314. Summer 1314 sums the aggregate uplink serialized data stream received from the frame multiplexer 1306 with the uplink serialized data stream received from the serial port 1302-X into a second uplink aggregate serialized data stream and passes it to serial port 1302-1. Serial port 1302-1 receives the second downlink aggregate serialized data stream and passes it to an electro-optical conversion module 1310-1.

FIG. 14A-14D are block diagrams showing timeslot mapping in the serial link interfaces of FIGS. 14A-14D. Each of FIGS. 14A-14D illustrates a different embodiments of the timeslot mapping in the serial link interface of the corresponding FIGS. 13A-13D.

Figure 14A:
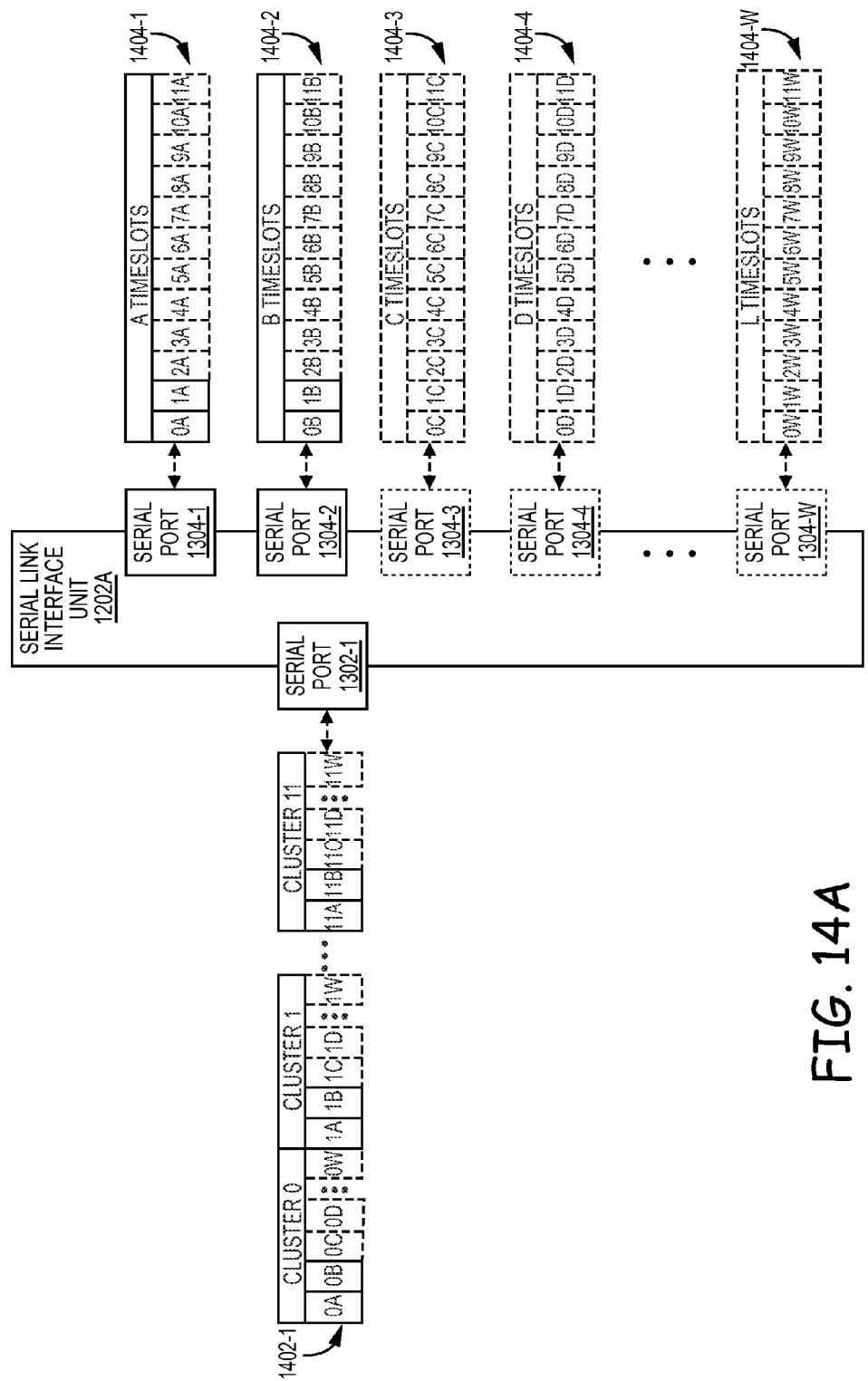
FIGS. 14A-14D are block diagrams showing timeslot mapping in the serial link interfaces of FIGS. 13A-13D.

FIG. 14A is a block diagram showing timeslot mapping in the serial link interface 1202A. Data streams 1404 (including data stream 1404-1, data stream 1404-2, and any amount of optional data streams 1404 through optional data stream 1404-W) each include a plurality of timeslots. For example, data stream 1404-1 includes timeslots 0A, 1A, 2A, 3A, 4A, 5A, 6A, 7A, 8A, 9A, 10A, and 11A. Similarly, data stream 1404-2 includes timeslots 0B, 1B, 2B, 3B, 4B, 5B, 6B, 7B, 8B, 9B, 10B, and 11B. Other data streams include similar timeslots. In other embodiments, different amounts of timeslots are included in each data stream 1404. Data stream 1402-1 is an aggregate data stream includes a plurality of clusters organized such that the timeslots from all the data streams 1404 are mapped into timeslot clusters so that all of the first timeslots come first, then the second timeslots, etc. Specifically, cluster 0 includes timeslot 0 from each of the data streams 1404, such that cluster 0 includes timeslots 0A, 0B, etc. Cluster 1 includes timeslot 1 from each of the data streams 1404, such that cluster 1 includes timeslot 1A, 1B, etc. The clusters continue accordingly. This mapping generally applies in both the forward path to downlink serialized data streams and in the reverse path to uplink serialized data streams.

Figure 14B:
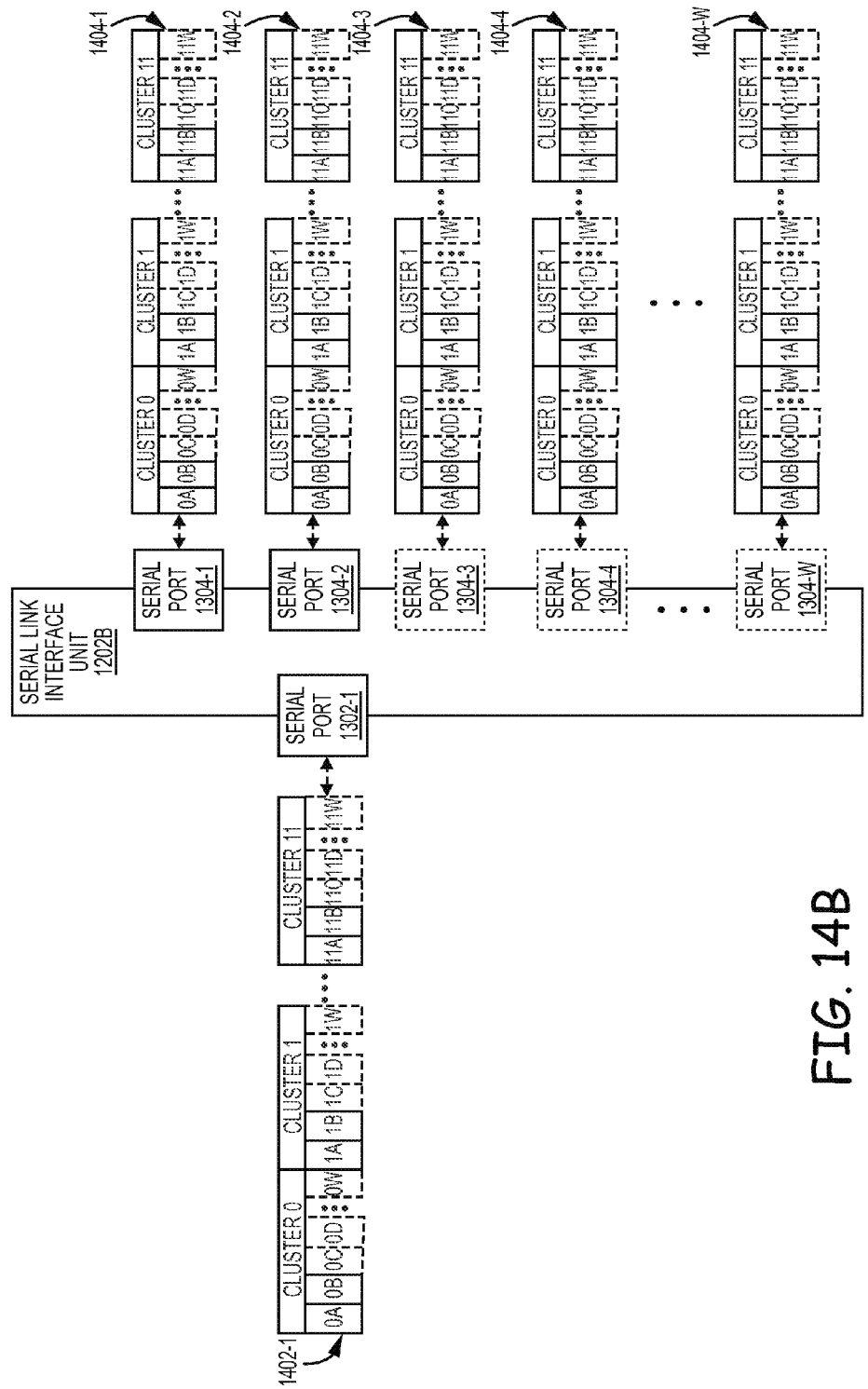

FIG. 14B is a block diagram showing timeslot mapping in the serial link interface 1202B. Data streams 1404 (including data stream 1404-1, data stream 1404-2, and any amount of optional data streams 1404 through optional data stream 1404-W) and data stream 1402 are aggregate data streams and each include a plurality of clusters organized such that the timeslots from a plurality of data streams are mapped into the timeslot clusters so that all of the first timeslots come first, then the second timeslots, etc. Specifically, cluster 0 includes timeslot 0 from each of the data streams 1404, such that cluster 0 includes timeslots 0A, 0B, etc. Cluster 1 includes timeslot 1 from each of the data streams 1404, such that cluster 1 includes timeslot 1A, 1B, etc. The clusters continue accordingly. This mapping generally applies in both the forward path to downlink serialized data streams and in the reverse path to uplink serialized data streams.

Figure 14C:
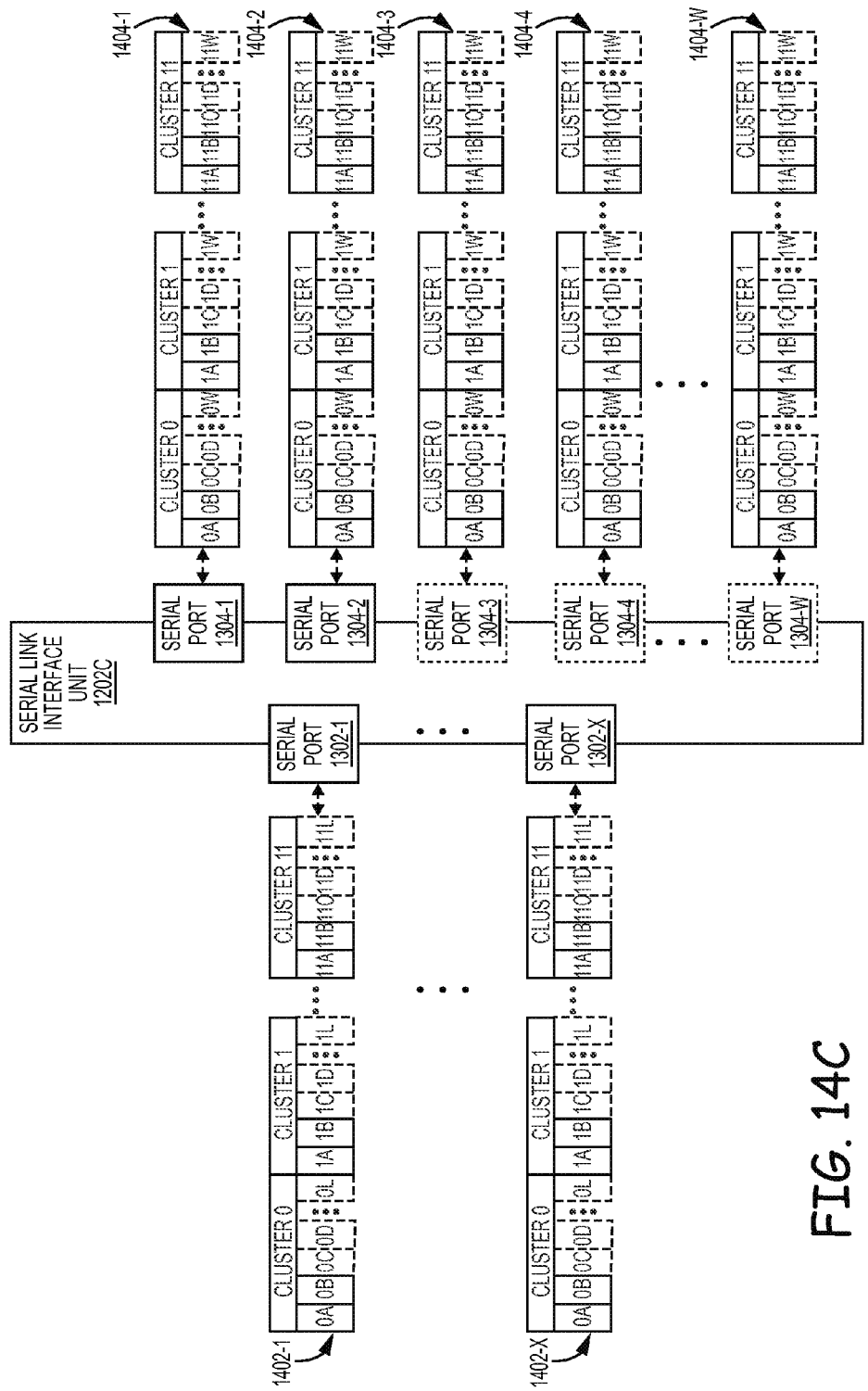

FIG. 14C is a block diagram showing timeslot mapping in the serial link interface 1202C. The timeslot mapping in FIG. 14C is similar to the timeslot mapping in FIG. 14B with the difference that additional data stream 1402-X is an aggregate data stream that includes a plurality of clusters organized so that all of the first timeslots come first, then the second timeslots, etc. as with aggregate data stream 1402-1.

Figure 14D:
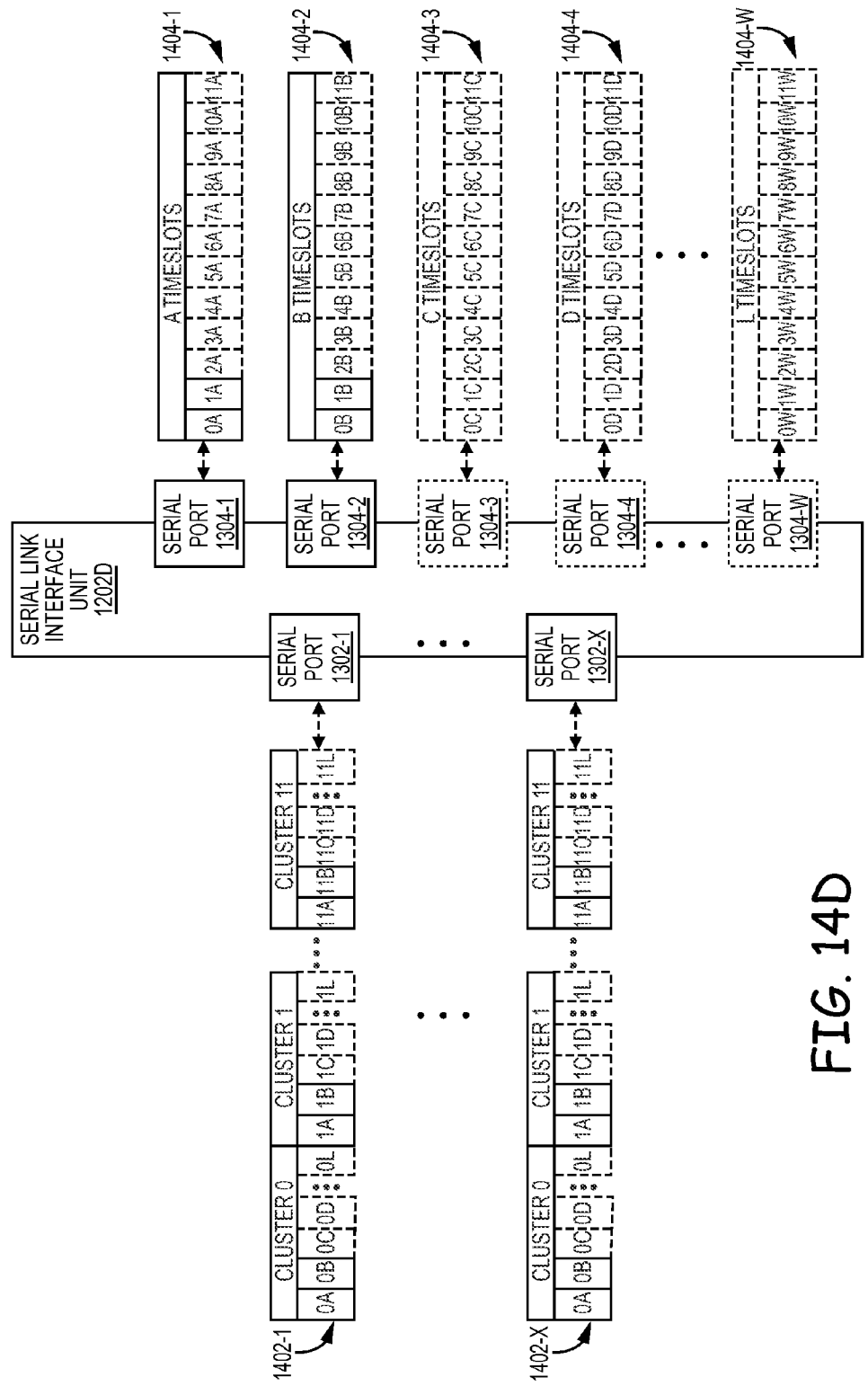

FIG. 14D is a block diagram showing timeslot mapping the serial link interface 1202D. The timeslot mapping in FIG. 14D is similar to the timeslot mapping in FIG. 14A with the difference that additional data stream 1402-X is an aggregate data stream that includes a plurality of clusters organized so that all of the first timeslots come first, then the second timeslots, etc. as with aggregate data stream 1402-1.

Figure 15:
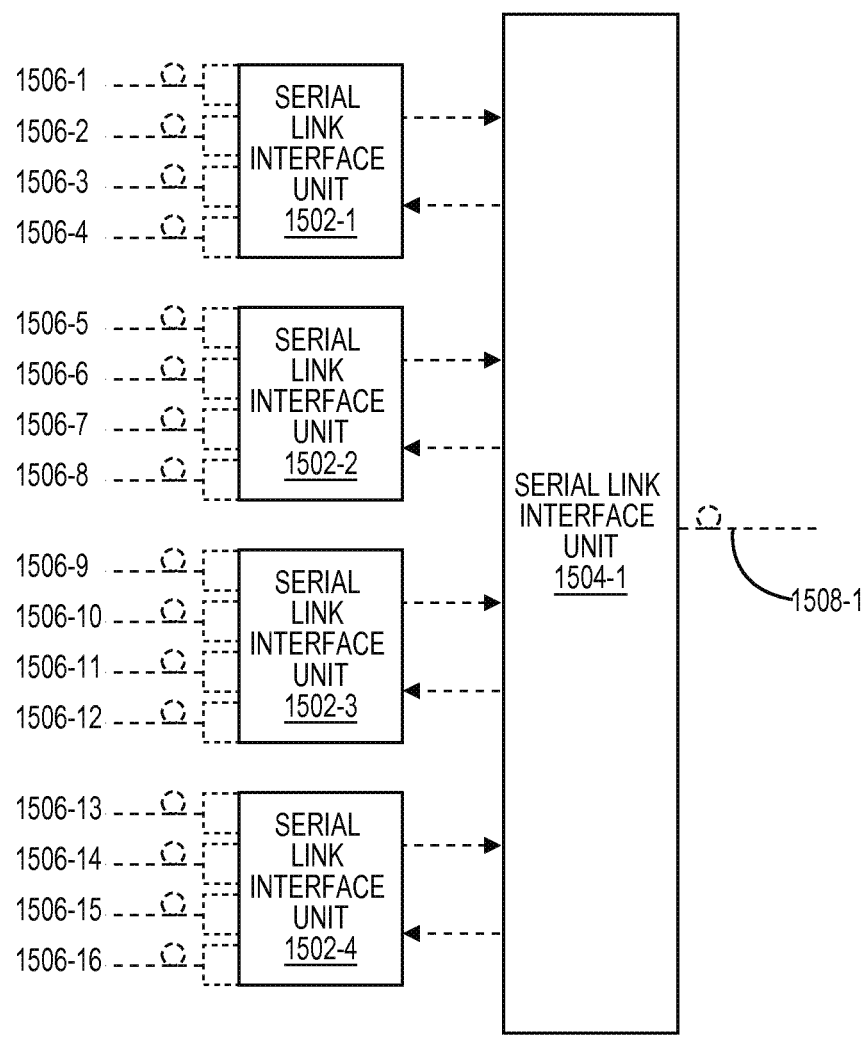
FIG. 15 is a block diagram showing a number of serial link interface units operating together to aggregate a plurality of serialized data streams into a single aggregate serialized data stream.

FIG. 15 is a block diagram showing a number of serial link interface units 1502 and 1504 operating together to aggregate a plurality of serialized data streams into a single aggregate serialized data stream. In one exemplary embodiment, serial link interface unit 1502-1 receives a plurality of serialized data streams on input communication links 1506-1, 1506-2, 1506-3, and 1506-4. In one implementation, the serial link interface unit 1502-1 aggregates a plurality of lower data rate serialized data streams (such as 3.072 Gigabit per second serialized data streams) into one higher data rate aggregate serialized data stream (such as a 9.8304 Gigabit per second aggregate serialized data stream) and passes the higher data rate aggregate serialized data stream to the serial link interface unit 1504-1. In another implementation, the serial link interface unit 1502-1 digitally sums a plurality of serialized data streams into an aggregate serialized data stream and passes the aggregate serialized data stream to the serial link interface unit 1504-1. In exemplary embodiments, the other serial link interface units 1502 also either aggregate lower rate signals into a higher rate aggregate signal or digitally sum signals together into aggregate signals. In exemplary embodiments, the serial link interface unit 1504-1 digitally sums the input serialized data streams into a single aggregate serialized data stream that is output on communication link 1508-1. In other exemplary embodiments, the serial link interface unit 1504-1 aggregates a plurality of lower data rate serialized data streams into a higher data rate aggregate serialized data stream that is output on communication link 1508-1. In other embodiments, combinations of digitally summing and data rate conversion/aggregation are facilitated in the cascaded combination of serial link interface units 1502 and serial link interface unit 1504.

Figure 16:
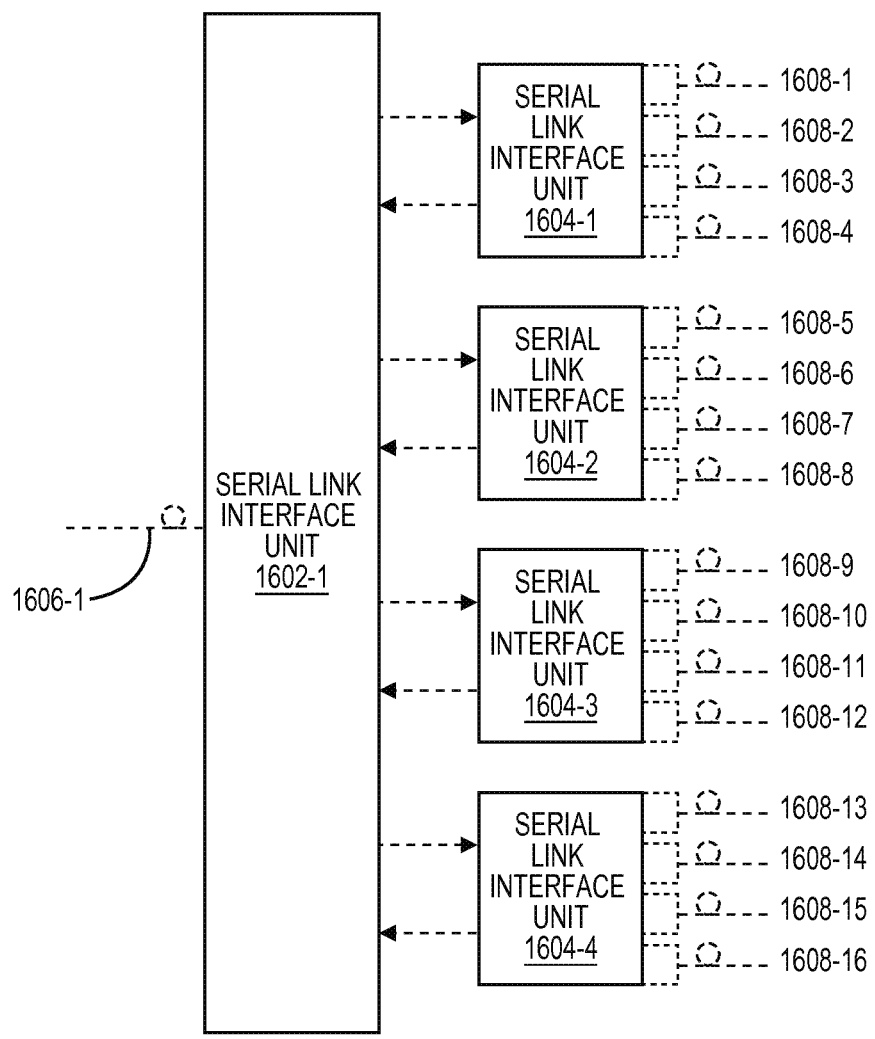
FIG. 16 is a block diagram showing a number of serial link interface units operating together to split apart a single aggregate serialized data stream into a plurality of serialized data streams.

FIG. 16 is a block diagram showing a number of serial link interface units 1602 and 1604 operating together to simulcast and/or split apart an aggregate serialized data stream into a plurality of serialized data streams. In one exemplary embodiment, serial link interface unit 1602-1 receives an aggregate serialized data stream on input communication link 1606-1. In one implementation, the aggregate serialized data stream is simulcast to the serial link interface units 1604 by serial link interface unit 1602-1. In another implementation, the aggregate serialized data stream is at a higher rate (such as a 9.8304 Gigabit per second aggregate serialized data stream) and is split apart into a plurality of lower data rate serialized data streams (such as 3.072 Gigabit per second serialized data streams) that are communicated to the plurality of serial link interface units 1604. In exemplary embodiments, the serial link interface units 1604 further simulcast or split apart the signals received from the serial link interface unit 1602-1. In exemplary embodiments, some or all of the serial link interface units 1604 simulcast the corresponding serialized data streams on digital communication links 1608. In other exemplary embodiments, some or all of the serial link interface units 1604 separate the corresponding serialized data streams into lower data rate serialized data streams on digital communication links 1608. In other embodiments, combinations of digitally summing and data rate conversion/aggregation are facilitated in the cascaded combination of serial link interface units 1502 and serial link interface unit 1504.

Figure 17:
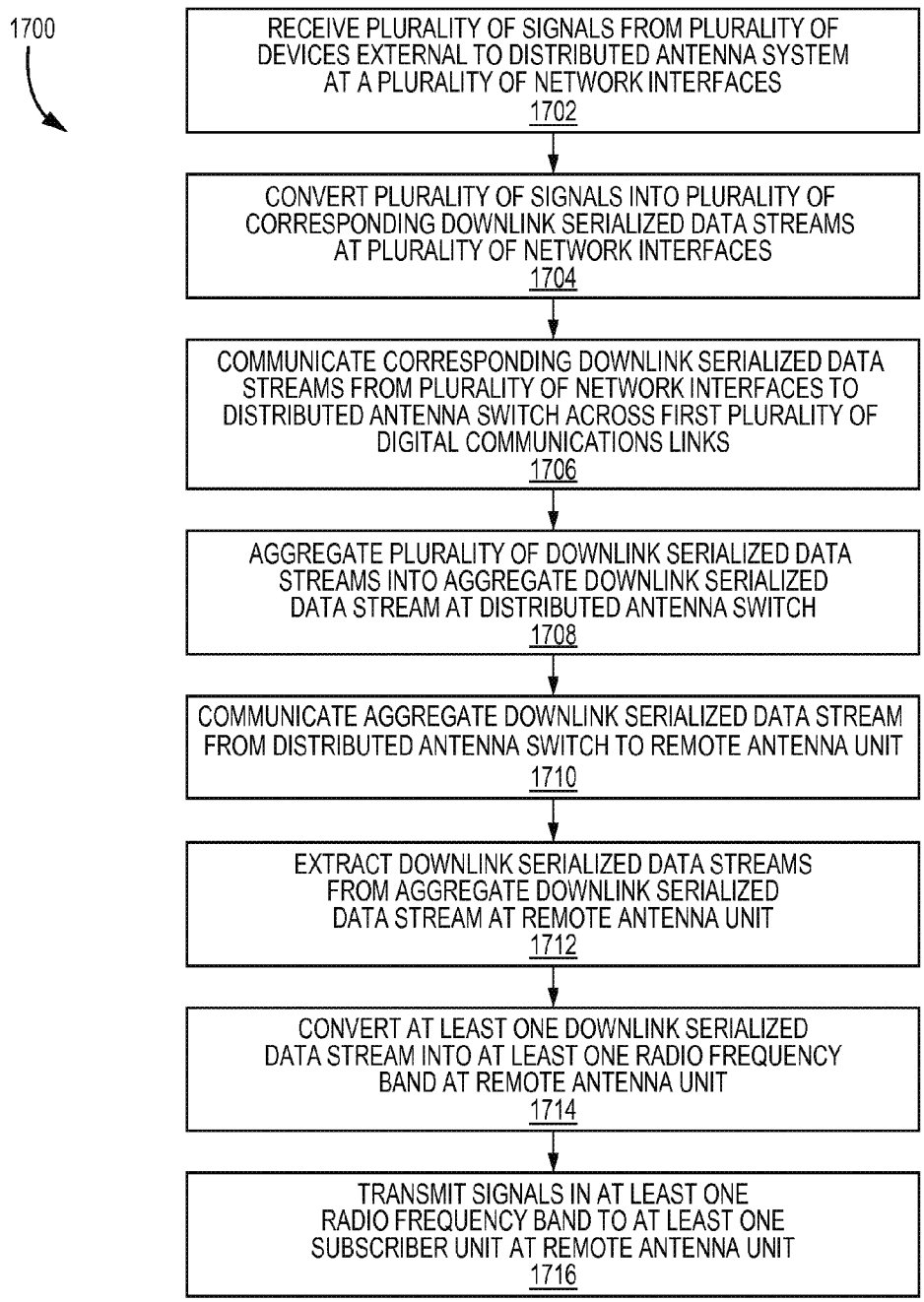
FIG. 17 is a flow diagram illustrating one exemplary embodiment of a method of aggregating and distributing serialized data streams in a distributed antenna system.

FIG. 17 is a flow diagram illustrating one exemplary embodiment of a method 1700 of aggregating and distributing serialized data streams in a distributed antenna system. Exemplary method 1700 begins at block 1702 with receiving a plurality of signals from a plurality of devices external to a distributed antenna system. In exemplary embodiments, receiving a plurality of signals from a plurality of devices external to the distributed antenna system at a plurality of network interfaces includes receiving the at least one radio frequency band from a base station. In exemplary embodiments, receiving a plurality of signals from a plurality of devices external to the distributed antenna system at a plurality of network interfaces includes receiving different radio frequency bands from at least two of the plurality of network interfaces coupled to two different base stations. In exemplary embodiments, receiving a plurality of signals from a plurality of devices external to the distributed antenna system at a plurality of network interfaces includes receiving Ethernet frames from an internet protocol network through an Ethernet interface. In exemplary embodiments, receiving a plurality of signals from a plurality of devices external to the distributed antenna system at a plurality of network interfaces includes receiving Common Public Radio Interface (CPRI) data from a CPRI base station through a CPRI converter interface. In exemplary embodiments, receiving a plurality of signals from a plurality of devices external to the distributed antenna system at a plurality of network interfaces includes receiving a serialized baseband data stream from a base station at an embedded base station. In exemplary embodiments, receiving a plurality of signals from a plurality of devices external to the distributed antenna system at a plurality of network interfaces includes receiving a serialized baseband data stream from a base station at an embedded base station. In these exemplary embodiments, the method 1700 further includes passing the first serialized baseband data stream on as a first downlink serialized data stream of the plurality of downlink serialized data streams.

Exemplary method 1700 proceeds to block 1704 with converting the plurality of signals into a plurality of corresponding downlink serialized data streams at the plurality of network interfaces. In exemplary embodiments, at least one of the plurality of downlink serialized data streams is a serialized baseband data stream. In exemplary embodiments, the serialized baseband data stream includes quadrature samples of I/Q data. In exemplary embodiments, converting the plurality of signals into a plurality of corresponding downlink serialized data streams at the plurality of network interfaces includes converting the at least one radio frequency band to a first downlink serialized data stream of the plurality of downlink serialized data streams. In exemplary embodiments, converting the plurality of signals into a plurality of network interfaces includes converting the different radio frequency bands from at least two of the plurality of network interfaces to the at least two of the corresponding downlink serialized data streams. In exemplary embodiments, converting the plurality of signals into a plurality of corresponding downlink serialized data streams at the plurality of network interfaces includes converting Ethernet frames to a first downlink serialized data stream of the plurality of downlink serialized data streams at an Ethernet interface. In exemplary implementations having Ethernet frames, the Ethernet frames are used for wireless local area network (WLAN) backhaul. In exemplary implementations having Ethernet frames, the method 1700 further includes: converting the first downlink serialized data stream extracted from the aggregate downlink serialized data stream into the Ethernet frames to an internet protocol network through a second Ethernet interface at the remote antenna unit; and communicating the Ethernet frames to an internet protocol network through a second Ethernet interface at the remote antenna unit. In some implementations, communicating the Ethernet frames to an internet protocol network through a second Ethernet interface at the remote antenna unit includes communicating the Ethernet frames to a wireless local access network (WLAN) access point. In exemplary embodiments, converting the plurality of signals into a plurality of corresponding downlink serialized data streams at the plurality of network interfaces includes converting the CPRI data into a first downlink serialized data stream of the plurality of downlink serialized data streams at the CPRI converter interface. In exemplary embodiments, converting the plurality of signals into a plurality of corresponding downlink serialized data streams at the plurality of network interfaces includes converting the serialized baseband data stream into a first downlink serialized data stream of the plurality of downlink serialized data streams at the embedded base station.

Exemplary method 1700 proceeds to block 1706 with communicating the corresponding downlink serialized data streams from the plurality of network interfaces to distributed antenna switch across a first plurality of digital communication links. In exemplary embodiments, communicating the corresponding downlink serialized data streams from the plurality of network interfaces to a distributed antenna switch across a first plurality of digital communication links includes communicating at least two of the corresponding downlink serialized data streams from at least two of the plurality of network interfaces to a serial link combiner interposed between the at least two of the plurality of network interfaces and the distributed antenna switch; aggregating the downlink serialized data streams from the at least two of the plurality of network interfaces at the serial link combiner into a second aggregate downlink serialized data stream; and communicating the second aggregate downlink serialized data stream from the serial link combiner to the distributed antenna switch. In exemplary embodiments, communicating the corresponding downlink serialized data streams from the plurality of network interfaces to a distributed antenna switch across a first plurality of digitized communication links includes communicating at least one of the downlink serialized data streams from the plurality of network interfaces to a distributed antenna switch across a fiber optic cable.

Exemplary method 1700 proceeds to block 1708 with aggregating the plurality of downlink serialized data streams into an aggregate downlink serialized data stream at the distributed antenna switch. In exemplary embodiments, aggregating the plurality of downlink data streams into the aggregate downlink serialized data stream at the distributed antenna switch includes mapping timeslots from each of the plurality of downlink serialized data streams to timeslots within the aggregate downlink serialized data stream. In exemplary embodiments, the timeslots from each of the plurality of downlink serialized data streams are interleaved within the aggregate downlink serialized data stream. In exemplary embodiments, at least one of the downlink serialized data streams is at a first data rate, the aggregate downlink serialized data stream is at a second data rate, and the second data rate is faster than the first data rate.

Exemplary method 1700 proceeds to block 1710 with communicating the aggregate downlink serialized data stream from the distributed antenna switch to a remote antenna unit. In exemplary embodiments, communicating the aggregate downlink serialized data stream from the distributed antenna switch to a remote antenna unit includes communicating the aggregate downlink serialized data stream to a serial link simulcaster and then simulcasting the aggregate downlink serialized data stream from the serial link simulcaster to the remote antenna unit and a second remote antenna unit. In these exemplary embodiments, the method further includes: extracting the plurality of downlink serialized data streams from the aggregate downlink serialized data stream at the remote antenna unit; converting at least one of the downlink serialized data streams into at least one radio frequency band at the second remote antenna unit; and transmitting signals in the at least one radio frequency band to at least one subscriber unit at the second remote antenna unit. In exemplary embodiments, communicating the aggregate downlink serialized data stream from the distributed antenna switch to a remote antenna unit includes communicating the aggregate downlink serialized data stream to a serial link separator, separating the aggregate downlink serialized data stream into a second plurality of downlink serialized data streams at the serial link separator, and communicating each of the second plurality of downlink data streams to a different remote antenna unit of a plurality of different remote antenna units. In these exemplary embodiments, the method further comprises: extracting at least one downlink serialized data stream corresponding to a network interface from the second plurality of downlink data streams at each of the plurality of different remote antenna units; converting the at least one of the downlink serialized data streams into at least one radio frequency band at each of the plurality of different remote antenna units; and transmitting signals in the at least one subscriber unit at each of the plurality of different remote antenna units. In exemplary embodiments, communicating the aggregate downlink serialized data stream from the distributed antenna switch to a remote antenna unit includes communicating the aggregate downlink serialized data stream from the distributed antenna switch to a remote antenna unit across a fiber optic cable.

Exemplary method 1700 proceeds to block 1712 with extracting the downlink serialized data streams from the aggregate downlink serialized data stream a the remote antenna unit. Exemplary method 1700 proceeds to block 1714 with converting at least one of the downlink serialized data streams into at least one radio frequency band at the remote antenna unit. In exemplary embodiments, converting at least one of the downlink serialized data streams into at least one radio frequency band includes converting a plurality of downlink serialized data streams into a plurality of different radio frequency bands. Exemplary method 1700 proceeds to block 1716 with transmitting signals in the at least one radio frequency band to at least one subscriber unit at the remote antenna unit. In exemplary embodiments, transmitting signals in the at least one radio frequency band to at least one subscriber unit includes transmitting each of the plurality of different radio frequency bands using a different radio frequency transceiver and antenna pair. In other exemplary embodiments, transmitting signals in the at least one radio frequency band to at least one subscriber unit includes transmitting each of the plurality of different radio frequency bands using a single radio frequency transceiver and antenna pair.

In exemplary embodiments, method 1700 further includes: communicating the aggregate downlink serialized data stream from the distributed antenna switch to a second remote antenna unit; extracting the downlink serialized data streams from the aggregate downlink serialized data stream at the second remote antenna unit; converting at least one of the downlink serialized data streams into at least a second radio frequency band at the second remote antenna unit; and transmitting signals in the at least one radio frequency band to at least a second subscriber unit. In other exemplary embodiments, method 1700 further includes: aggregating a second plurality of downlink serialized data streams into a second aggregate downlink serialized data stream; communicating the second aggregate downlink serialized data stream from the distributed antenna switch to a second remote antenna unit; extracting the second plurality of downlink serialized data streams from the aggregate downlink serialized data stream at the second remote antenna unit; converting at least one of the second plurality of downlink serialized data streams into at least a second radio frequency band at the second remote antenna unit; and transmitting signals in at least the second radio frequency band to at least a second subscriber unit.

In exemplary embodiments, method 1700 further includes: receiving second signals in a second radio frequency band from the at last one subscriber unit at the remote antenna unit; converting the second signals in the at least one radio frequency band to a first uplink serialized data stream at the remote antenna unit; aggregating the first uplink serialized data stream with other uplink serialized data streams into an aggregate uplink serialized data stream at the remote antenna unit; communicating the aggregate uplink serialized data stream from the remote antenna unit to the distributed antenna switch; extracting the first uplink serialized data stream from the aggregate uplink serialized data stream at the distributed antenna switch; communicating the first uplink serialized data stream from the distributed antenna switch to a first network interface of the plurality of network interfaces; converting the first uplink serialized data stream to third signals at the first network interface; and communicating the third signals from the first network interface to a first device external to the distributed antenna system.

In exemplary embodiments, method 1700 further includes: receiving second signals in a second radio frequency band from the at least one subscriber unit at the remote antenna unit; converting the second signals in the at least one radio frequency band to a first uplink serialized data stream at the remote antenna unit; aggregating the first uplink serialized data stream with other uplink serialized data streams into an aggregate uplink serialized data stream with other uplink serialized data streams into an aggregate uplink serialized data stream at the remote antenna unit; communicating the aggregate uplink serialized data stream from the remote antenna unit to the distributed antenna switch; communicating the first uplink serialized data stream in a second aggregate uplink serialized data stream to a serial link separator interposed between the distributed antenna switch and at least two of the plurality of network interfaces; extracting the first uplink serialized data stream from the second aggregate uplink serialized data stream at the serial link separator; communicating the first uplink serialized data stream from the serial link separator to a first network interface of the plurality of network interfaces; converting the first uplink serialized data stream to third signals at the first network interface; and communicating the third signals from the first network interface to a first device external to the distributed antenna system.

In exemplary embodiments, method 1700 further includes: receiving second signals in a second radio frequency band from the at least one subscriber unit at the remote antenna unit; converting the second signals in the at least one radio frequency band to a first uplink serialized data stream at the remote antenna unit; communicating the first uplink serialized data stream to a serial link combiner interposed between the remote antenna unit and the distributed antenna switch; aggregating the first uplink serialized data stream with other uplink serialized data streams into an aggregate uplink serialized data stream with other uplink serialized data streams into an aggregate uplink serialized data stream at the serial link combiner; communicating the aggregate uplink serialized data stream from the serial link combiner to the distributed antenna switch; extracting the first uplink serialized data stream from the aggregate uplink serialized data stream at the distributed antenna switch; communicating the first uplink serialized data stream from the distributed antenna switch to a first network interface of the plurality of network interfaces; converting the first uplink serialized data stream to third signals at the first network interface; and communicating the third signals from the first network interface to first device external to the distributed antenna system.

Figure 18A:
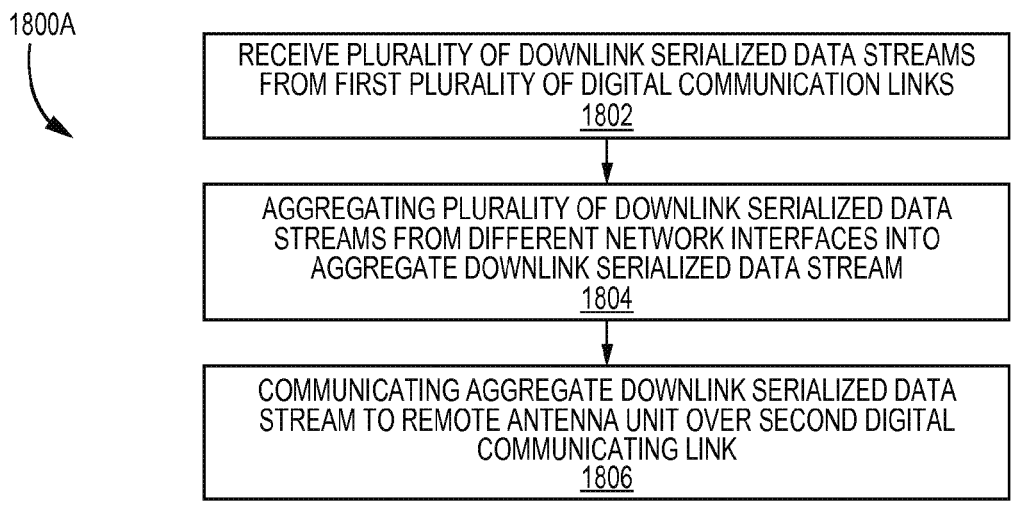
FIGS. 18A-18C are flow diagrams illustrating exemplary embodiments of methods of aggregating serialized data streams in a distributed antenna switch.
Figure 18B:
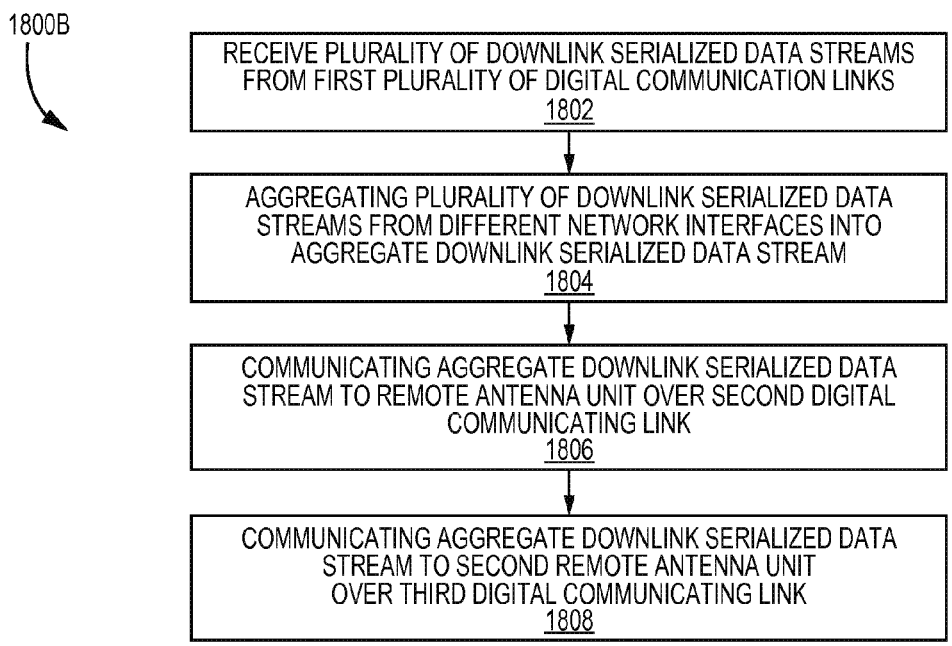
Figure 18C:
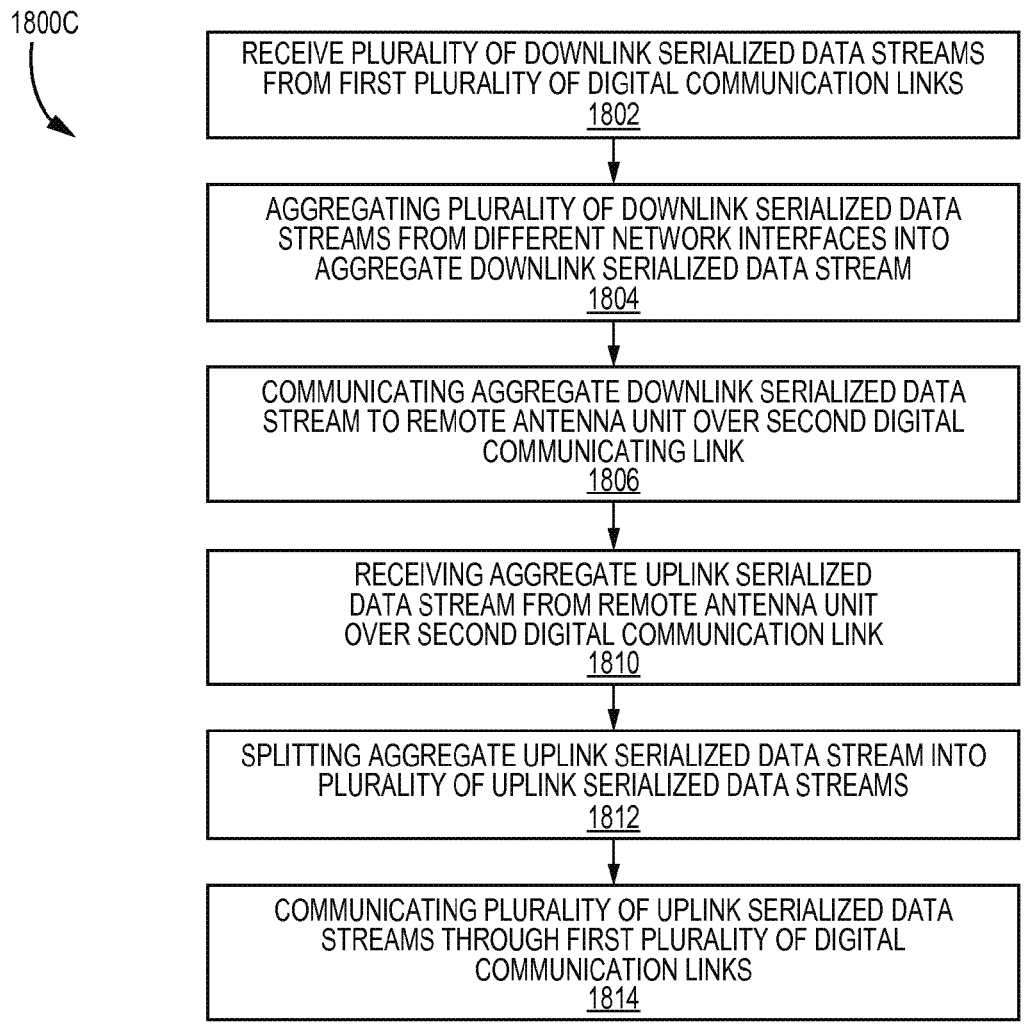

FIGS. 18A-18C are flow diagrams illustrating exemplary embodiments of methods 1800 of aggregating serialized data streams in a distributed antenna switch. Each of FIGS. 18A-18C illustrates a different embodiment of methods 1800, labeled method 1800A-1800C respectively.

FIG. 18A is a flow diagram illustrating exemplary method 1800A of aggregating serialized data streams in a distributed antenna switch. Exemplary method 1800A begins at block 1802 with receiving a plurality of downlink serialized data streams from a first plurality of digital communication links. Exemplary method 1800A proceeds to block 1804 with aggregating the plurality of downlink serialized data streams from the different network interfaces into an aggregate downlink serialized data stream. Exemplary method 1800A proceeds to block 1806 with communicating the aggregate downlink serialized data stream to a remote antenna unit over a second digital communication link.

FIG. 18B is a flow diagram illustrating exemplary method 1800B of aggregating serialized data streams in a distributed antenna switch. Exemplary method 1800B includes blocks 1802, 1804, and 1806 of method 1800A described above. After block 1806, exemplary method 1800B proceeds to block 1808 with communicating the aggregate downlink serialized data stream to a second remote antenna unit over a third digital communication link.

FIG. 18C is a flow diagram illustrating exemplary method 1800C of aggregating serialized data streams in a distributed antenna switch. Exemplary method 1800C includes blocks 1802, 1804, and 1806 of method 1800A described above. After block 1806, exemplary method 1800C proceeds to block 1810 with receiving an aggregate uplink serialized data stream from the remote antenna unit over the second digital communication link. Exemplary method 1800C proceeds to block 1812 with splitting the aggregate uplink serialized data stream into a plurality of uplink serialized data streams 1812. Exemplary method 1800C proceeds to block 1814 with communicating the plurality of uplink serialized data streams through the first plurality of digital communication links.

Figure 19:
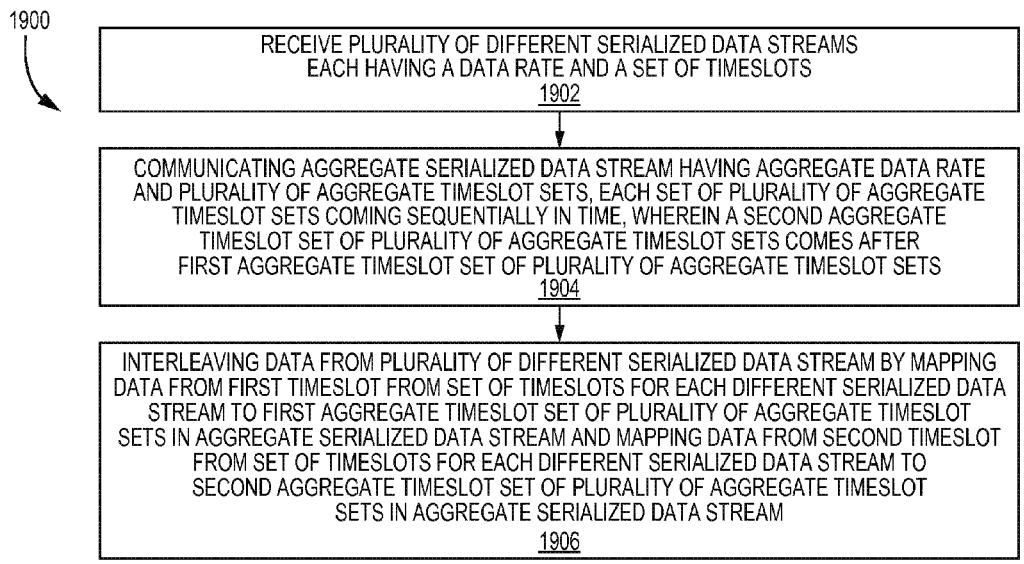
FIG. 19 is a flow diagram illustrating one exemplary embodiment of a method of aggregating a plurality of serialized data streams into an aggregate serialized data stream.

FIG. 19 is a flow diagram illustrating one exemplary embodiment of a method 1900 of aggregating a plurality of serialized data streams into an aggregate serialized data stream. Exemplary method 1900 begins at block 1902 with receiving plurality of different serialized data streams each having a data rate and a set of timeslots. In exemplary embodiments, the plurality of different serialized data streams include at least a first serialized data stream having a first data rate and a first set of timeslots and a second serialized data stream having a second data rate and a second set of timeslots. In exemplary embodiments, the plurality of different serialized data streams further include a third serialized data stream having a third data rate and a third set of timeslots, and a fourth serialized data stream having a fourth data rate and a fourth set of timeslots. In exemplary embodiments, receiving the plurality of different serialized data streams includes receiving downlink serialized data streams from the plurality of different network interfaces across different first digital communication links.

Exemplary method 1900 proceeds to block 1904 with communicating an aggregate serialized data stream having an aggregate data rate and a plurality of aggregate timeslot sets, each set of the plurality of aggregate timeslot sets coming sequentially in time, wherein a second aggregate timeslot set of the plurality of aggregate timeslot sets comes after a first aggregate timeslot set of the plurality of aggregate timeslot sets. In exemplary embodiments, communicating the aggregate serialized data stream includes communicating the aggregate serialized data stream to a distributed antenna switch over a second digital communication link.

Exemplary method 1900 proceeds to block 1906 with interleaving data from the plurality of different serialized data streams by mapping data from a first timeslot from the set of timeslots for each different serialized data stream to the first aggregate timeslot set of the plurality of aggregate timeslot sets in the aggregate serialized data stream and mapping data from a second timeslot from the set of timeslots for each different serialized data stream to the second aggregate timeslot set of the plurality of aggregate timeslot sets in the aggregate serialized data stream. In exemplary embodiments, mapping data from a first timeslot from the set of timeslots for each different serialized data stream to the first aggregate timeslot set of the plurality of aggregate timeslot sets in the aggregate serialized data stream includes mapping data from a first timeslot from the first set of timeslots to a first timeslot in the first aggregate timeslot set of the plurality of aggregate timeslot sets and data from a first timeslot from the second set of timeslots to a second timeslot in the first aggregate timeslot set of the plurality of aggregate timeslot sets. In exemplary embodiments, mapping data from a first timeslot from the set of timeslots for each different serialized data stream to the first aggregate timeslot set of the plurality of aggregate timeslot sets in the aggregate serialized data stream further includes mapping data from data from a first timeslot from the third set of timeslots to a third timeslot in the first aggregate timeslot set of the plurality of aggregate timeslot sets, and data from a first timeslot from the fourth set of timeslots to a fourth timeslot in the first aggregate timeslot set of the plurality of aggregate timeslot set.

In exemplary embodiment, the method 1900 further includes communicating the aggregate serialized data stream at both a first aggregate serialized data stream interface and a second serialized data stream interface. In exemplary embodiments, at least one of the different serialized data streams includes at least one of a serialized baseband data stream, a serialized intermediate frequency data stream, and a serialized radio frequency data stream corresponding to a radio frequency band communicated by a base station. In exemplary embodiments, the aggregate data rate is faster than the data rate.

In exemplary embodiments, mapping data from a second timeslot from the set of timeslots for each different serialized data stream to the second aggregate timeslot set of the plurality of aggregate timeslot sets in the aggregate serialized data stream includes mapping data from a second timeslot from the first set of timeslots to a first timeslot in the second aggregate timeslot set of the plurality of aggregate timeslot sets and data from a second timeslot from the second set of timeslots to a second timeslot in the second aggregate timeslot set of the plurality of aggregate timeslot sets. In exemplary embodiments, mapping data from a second timeslot from the set of timeslots for each different serialized data stream to the second aggregate timeslot set of the plurality of aggregate timeslot sets in the aggregate serialized data stream includes mapping data from a second timeslot from the third set of timeslots to a third timeslot in the second aggregate timeslot set of the plurality of aggregate timeslot sets, and data from a second timeslot from the fourth set of timeslots to a fourth timeslot in the second aggregate timeslot set of the plurality of aggregate timeslot sets.

In exemplary embodiments, a third aggregate timeslot set of the plurality of aggregate timeslot sets comes after the second aggregate timeslot set of the plurality of aggregate timeslot sets. In these embodiments, the method 1900 further includes further interleaving data from the plurality of different serialized data streams by mapping data from a third timeslot from the set of timeslots for each different serialized data stream to the third aggregate timeslot set of the plurality of aggregate timeslot sets in the aggregate serialized data stream. In exemplary embodiments, mapping data from a third timeslot from the set of timeslots for each different serialized data stream to the third aggregate timeslot set of the plurality of aggregate timeslot sets in the aggregate serialized data stream includes mapping data from a third timeslot from the first set of timeslots to a first timeslot in the third aggregate timeslot set of the plurality of aggregate timeslot sets and data from a third timeslot from the second set of timeslots to a second timeslot in the third aggregate timeslot set of the plurality of aggregate timeslot sets. In exemplary embodiments, mapping data from a third timeslot from the set of timeslots for each different serialized data stream to the third aggregate timeslot set of the plurality of aggregate timeslot sets in the aggregate serialized data stream further includes mapping data from a third timeslot from the third set of timeslots to a third timeslot in the third aggregate timeslot set of the plurality of aggregate timeslot sets and data from a third timeslot from the fourth set of timeslots to a fourth timeslot in the third aggregate timeslot set of the plurality of aggregate timeslot sets.

In exemplary embodiments, the method 1900 further includes: receiving a second aggregate serialized data stream having a second aggregate data rate and a second plurality of aggregate timeslot sets, each set of the second plurality of aggregate timeslot sets coming sequentially in time, wherein a first aggregate timeslot set of the second plurality of aggregate timeslot sets comes before a second aggregate timeslot set of the second plurality of aggregate timeslot sets; communicating a different second serialized data stream having a second data rate and a second set of timeslots; and de-interleaving data from the second aggregate serialized data stream by mapping data from the first aggregate timeslot set of the second plurality of aggregate timeslot sets to a first timeslot from the second set of timeslots for each different serialized data stream and mapping data from the second aggregate timeslot set of the second plurality of aggregate timeslot sets to a second timeslot from the second set of timeslots for each different serialized data stream.

In exemplary embodiments, the method 1900 further includes: receiving a second aggregate serialized data stream having a second aggregate data rate and a second plurality of aggregate timeslot sets, each set of the second plurality of aggregate timeslot sets coming sequentially in time, wherein a second aggregate timeslot set of the second plurality of aggregate timeslot sets comes after a first aggregate timeslot set of the second plurality of aggregate timeslot sets; communicating a different second serialized data stream having a second data rate and a second set of timeslots; and de-interleaving data from the second aggregate serialized data stream by mapping data from the first aggregate timeslot set of the second plurality of aggregate timeslot sets to a first timeslot from the second set of timeslots for each different serialized data stream and mapping data from the second aggregate timeslot set of the second plurality of aggregate timeslot sets to a second timeslot from the second set of timeslots for each different serialized data stream.

In exemplary embodiments, the method 1900 further includes: receiving a second aggregate serialized data stream having a second aggregate data rate and a second plurality of aggregate timeslot sets, each set of the second plurality of aggregate timeslot sets coming sequentially in time, wherein a second aggregate timeslot set of the second plurality of aggregate timeslot sets comes after a first aggregate timeslot set of the second plurality of aggregate timeslot sets; and digitally summing the second aggregate serialized data stream into the aggregate serialized data stream before communicating the aggregate serialized data stream. In exemplary embodiments, digitally summing the second aggregate serialized data stream into the aggregate serialized data stream before communicating the aggregate serialized data stream includes summing data in each timeslot of the second aggregate serialized data stream into data in a corresponding timeslot of the aggregate serialized data stream, such that data in each timeslot in the first aggregate timeslot set of the second aggregate serialized data stream is summed into data in a corresponding timeslot in the first aggregate timeslot set of the aggregate serialized data stream and data in each timeslot in the second aggregate timeslot set of the second aggregate serialized data stream is summed into data in a corresponding timeslot in the second aggregate timeslot set of the aggregate serialized data stream.

Figure 20:
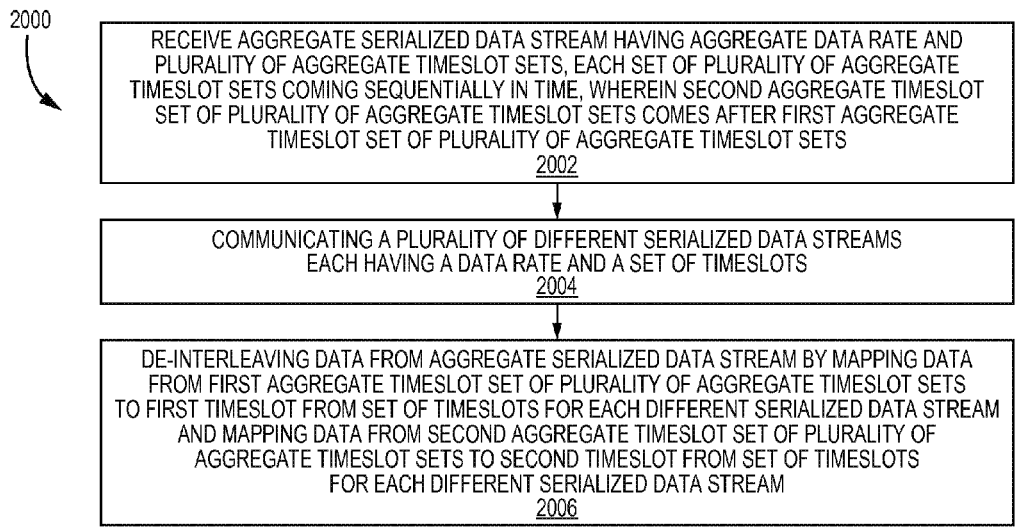
FIG. 20 is a flow diagram illustrating one exemplary embodiment of a method of splitting apart an aggregate serialized data stream into a plurality of serialized data stream.

FIG. 20 is a flow diagram illustrating one exemplary embodiment of a method 2000 of splitting apart an aggregate serialized data stream into a plurality of serialized data streams. Exemplary method 2000 begins at block 2002 with receiving an aggregate serialized data stream having an aggregate data rate and a plurality of aggregate timeslot sets, each set of the plurality of aggregate timeslot sets coming sequentially in time, wherein a second aggregate timeslot set of the plurality of aggregate timeslot sets comes after a first aggregate timeslot set of the plurality of aggregate timeslot sets.

Exemplary method 2000 proceeds to block 2004 with communicating a plurality of different serialized data streams each having a data rate and a set of timeslots.

Exemplary method 2000 proceeds to block 2006 with de-interleaving data from the aggregate serialized data stream by mapping data from the first aggregate timeslot set of the plurality of aggregate timeslot sets to a first timeslot from the set of timeslots for each different serialized data stream and being configured to map data from the second aggregate timeslot set of the plurality of aggregate timeslot sets to a second timeslot from the set of timeslots for each different serialized data stream.

In exemplary embodiments, the plurality of different serialized data streams include at least a first serialized data stream having a first data rate and a first set of timeslots and a second serialized data stream having a second data rate and a second set of timeslots. In exemplary embodiments, mapping data from the first aggregate timeslot set of the plurality of aggregate timeslot sets to a first timeslot from the set of timeslots for each different serialized data stream includes mapping data from a first timeslot in the first aggregate timeslot set of the plurality of aggregate timeslot sets to a first timeslot from the first set of timeslots and data from a second timeslot in the first aggregate timeslot set of the plurality of aggregate timeslot sets to a first timeslot from the second set of timeslots. In exemplary embodiments, mapping data from the second aggregate timeslot set of the plurality of aggregate timeslot sets to a second timeslot from the set of timeslots for each different serialized data stream includes mapping data from a first timeslot in the second aggregate timeslot set of the plurality of aggregate timeslot sets to a second timeslot from the first set of timeslots and data from a second timeslot in the second aggregate timeslot set of the plurality of aggregate timeslot sets to a second timeslot from the second set of timeslots.

In exemplary embodiments, the plurality of different serialized data streams include at least a first serialized data stream having a first data rate and a first set of timeslots, a second serialized data stream having a second data rate and a second set of timeslots, a third serialized data stream having a third data rate and a third set of timeslots, and a fourth serialized data stream having a fourth data rate and a fourth set of timeslots. In exemplary embodiments, mapping data from the first aggregate timeslot set of the plurality of aggregate timeslot sets to a first timeslot from the set of timeslots for each different serialized data stream includes mapping data from a first timeslot in the first aggregate timeslot set of the plurality of aggregate timeslot sets to a first timeslot from the first set of timeslots, data from a second timeslot in the first aggregate timeslot set of the plurality of aggregate timeslot sets to a first timeslot from the second set of timeslots, data from a third timeslot in the first aggregate timeslot set of the plurality of aggregate timeslot sets to a first timeslot from the third set of timeslots, and data from a fourth timeslot in the first aggregate timeslot set of the plurality of aggregate timeslot sets to a first timeslot from the fourth set of timeslots. In exemplary embodiments, mapping data from the second aggregate timeslot set of the plurality of aggregate timeslot sets to a second timeslot from the set of timeslots for each different serialized data stream includes mapping data from a first timeslot in the second aggregate timeslot set of the plurality of aggregate timeslot sets to a second timeslot from the first set of timeslots, data from a second timeslot in the second aggregate timeslot set of the plurality of aggregate timeslot sets to a second timeslot from the second set of timeslots, data from a third timeslot in the second aggregate timeslot set of the plurality of aggregate timeslot sets to a second timeslot from the third set of timeslots, and data from a fourth timeslot in the second aggregate timeslot set of the plurality of aggregate timeslot sets to a second timeslot from the fourth set of timeslots.

In exemplary embodiments, a third aggregate timeslot set of the plurality of aggregate timeslot sets comes after the second aggregate timeslot set of the plurality of aggregate timeslot sets. In these embodiments, the method 2000 further includes further de-interleaving data from the aggregate serialized data stream received at the aggregate serialized data stream interface by mapping data from the third aggregate timeslot set of the plurality of aggregate timeslot sets to a third timeslot from the set of timeslots for each different serialized data stream and being configured to map data from the second aggregate timeslot set of the plurality of aggregate timeslot sets to a second timeslot from the set of timeslots for each different serialized data stream.

In exemplary embodiments having a third aggregate timeslot, the different serialized data streams include at least a first serialized data stream having a first data rate and a first set of timeslots and a second serialized data stream having a second data rate and a second set of timeslots. In exemplary embodiments, mapping data from the first aggregate timeslot set of the plurality of aggregate timeslot sets to a first timeslot from the set of timeslots for each different serialized data stream includes mapping data from a first timeslot in the first aggregate timeslot set of the plurality of aggregate timeslot sets to a first timeslot from the first set of timeslots and data from a second timeslot in the first aggregate timeslot set of the plurality of aggregate timeslot sets to a first timeslot from the second set of timeslots; mapping data from the second aggregate timeslot set of the plurality of aggregate timeslot sets to a second timeslot from the set of timeslots for each different serialized data stream includes mapping data from a first timeslot in the second aggregate timeslot set of the plurality of aggregate timeslot sets to a second timeslot from the first set of timeslots and data from a second timeslot in the second aggregate timeslot set of the plurality of aggregate timeslot sets to a second timeslot from the second set of timeslots; and mapping data from the third aggregate timeslot set of the plurality of aggregate timeslot sets to a third timeslot from the set of timeslots for each different serialized data stream includes mapping data from a first timeslot in the third aggregate timeslot set of the plurality of aggregate timeslot sets to a third timeslot from the first set of timeslots and data from a second timeslot in the third aggregate timeslot set of the plurality of aggregate timeslot sets to a third timeslot from the second set of timeslots.

In exemplary embodiments having a third aggregate timeslot, the different serialized data streams include at least a first serialized data stream having a first data rate and a first set of timeslots, a second serialized data stream having a second data rate and a second set of timeslots, a third serialized data stream having a third data rate and a third set of timeslots, and a fourth serialized data stream having a fourth data rate and a fourth set of timeslots. In exemplary embodiments, mapping data from the first aggregate timeslot set of the plurality of aggregate timeslot sets to a first timeslot from the set of timeslots for each different serialized data stream includes mapping data from a first timeslot in the first aggregate timeslot set of the plurality of aggregate timeslot sets to a first timeslot from the first set of timeslots, data from a second timeslot in the first aggregate timeslot set of the plurality of aggregate timeslot sets to a first timeslot from the second set of timeslots, data from a third timeslot in the first aggregate timeslot set of the plurality of aggregate timeslot sets to a first timeslot from the third set of timeslots, and data from a fourth timeslot in the first aggregate timeslot set of the plurality of aggregate timeslot sets to a first timeslot from the fourth set of timeslots; mapping data from the second aggregate timeslot set of the plurality of aggregate timeslot sets to a second timeslot from the set of timeslots for each different serialized data stream includes mapping data from a first timeslot in the second aggregate timeslot set of the plurality of aggregate timeslot sets to a second timeslot from the first set of timeslots, data from a second timeslot in the second aggregate timeslot set of the plurality of aggregate timeslot sets to a second timeslot from the second set of timeslots, data from a third timeslot in the second aggregate timeslot set of the plurality of aggregate timeslot sets to a second timeslot from the third set of timeslots, and data from a fourth timeslot in the second aggregate timeslot set of the plurality of aggregate timeslot sets to a second timeslot from the fourth set of timeslots; and mapping data from the third aggregate timeslot set of the plurality of aggregate timeslot sets to a third timeslot from the set of timeslots for each different serialized data stream includes mapping data from a first timeslot in the third aggregate timeslot set of the plurality of aggregate timeslot sets to a third timeslot from the first set of timeslots, data from a second timeslot in the third aggregate timeslot set of the plurality of aggregate timeslot sets to a third timeslot from the second set of timeslots, data from a third timeslot in the third aggregate timeslot set of the plurality of aggregate timeslot sets to a third timeslot from the third set of timeslots, and data from a fourth timeslot in the third aggregate timeslot set of the plurality of aggregate timeslot sets to a third timeslot from the fourth set of timeslots.

In exemplary embodiments, the at leas tone of the different serialized data streams includes at least one of a serialized baseband data stream, a serialized intermediate frequency data stream, and a serialized radio frequency data stream corresponding to a radio frequency band communication by a base station. In exemplary embodiments, the aggregate data rate is faster than the data rate.

Figure 21:
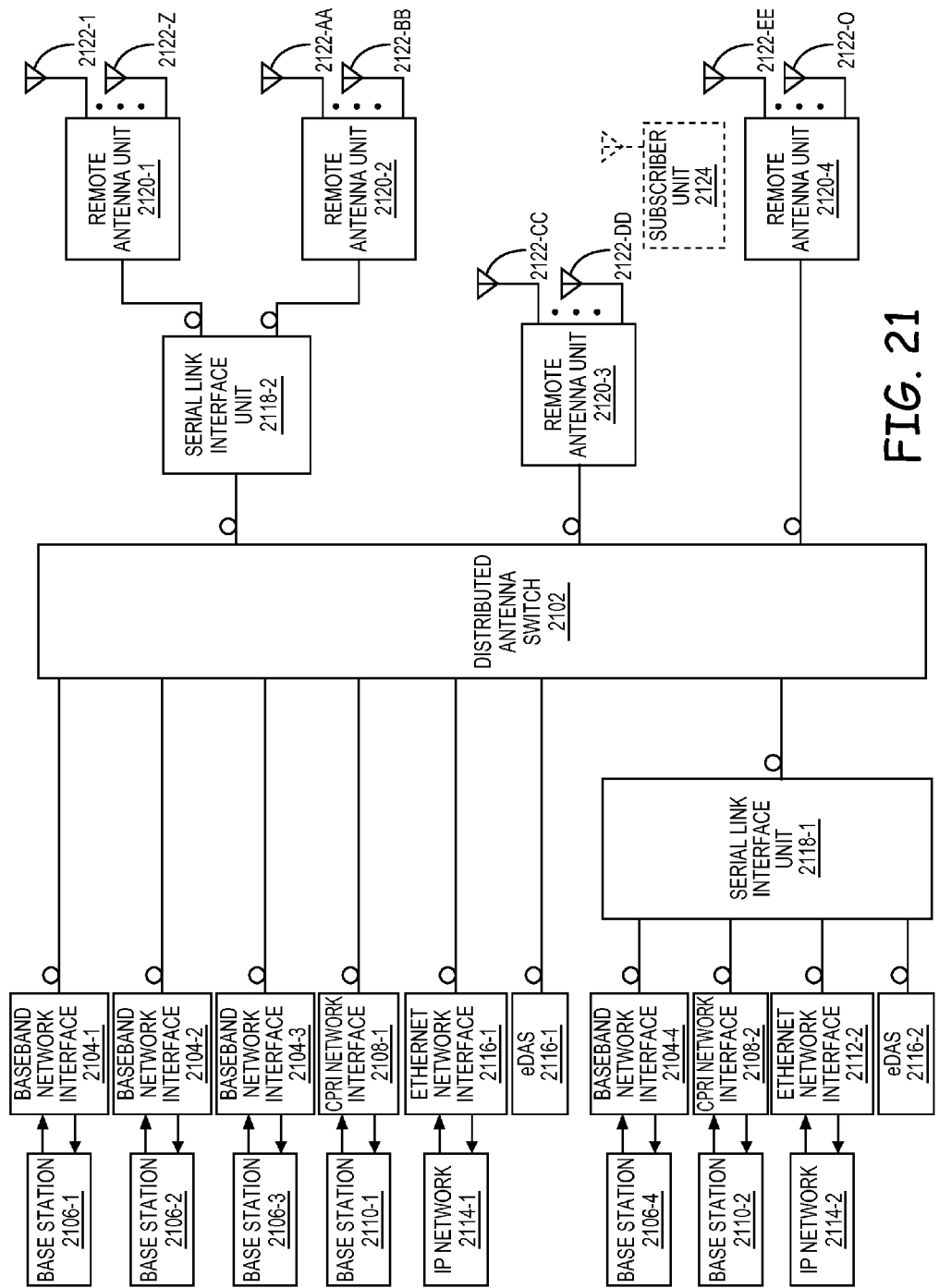
FIG. 21 is a block diagram of an embodiment of an additional exemplary distributed antenna system having a distributed antenna switch and a variety of different network interfaces, serial link interface units, and remote antenna units.

FIG. 21 is a block diagram of an embodiment of an additional exemplary distributed antenna system 2100 having a distributed antenna switch 2102 and a variety of different network interfaces including baseband network interfaces 2104 communicatively coupled to baseband ports on base stations 2106, CPRI network interfaces 2108 communicatively coupled to CPRI ports on base station 2106, Ethernet network interfaces 2112 communicatively coupled to internet protocol (IP) networks 2114, and embedded distributed antenna systems 2116. The distributed antenna system 2100 also has serial link interface units 2118 and remote antenna units 2120. The various components operate as described above. Only the embedded distributed antenna system (eDAS) has not been described earlier. An eDAS includes some base station functionality in the network interface itself, such that the eDAS can connect with a wireless access network as a base station would, without requiring all the radio frequency hardware necessary for a full base station and instead relying on the distributed antenna system for signal radiation to wireless subscribers. Other topologies can also be used with various modifications to the network topology.

Embodiments of the processors described herein include or function with software programs, firmware or other computer readable instructions for carrying out various methods, process tasks, calculations, and control functions, used in the components of the systems described above.

These instructions are typically stored on any appropriate computer readable medium used for storage of computer readable instructions or data structures. The computer readable medium can be implemented as any available media that can be accessed by a general purpose or special purpose computer or processor, or any programmable logic device. Suitable processor-readable media may include storage or memory media such as magnetic or optical media. For example, storage or memory media may include conventional hard disks, Compact Disk-Read Only Memory (CD-ROM), volatile or non-volatile media such as Random Access Memory (RAM) (including, but not limited to, Synchronous Dynamic Random Access Memory (SDRAM), Double Data Rate (DDR) RAM, RAMBUS Dynamic RAM (RDRAM), Static RAM (SRAM), etc.), Read Only Memory (ROM), Electrically Erasable Programmable ROM (EEPROM), and flash memory, etc. Suitable processor-readable media may also include transmission media such as electrical, electromagnetic, or digital signals, conveyed via a communication medium such as a network and/or a wireless link.

Although specific embodiments have been illustrated and described herein, it will be appreciated by those of ordinary skill in the art that any arrangement, which is calculated to achieve the same purpose, may be substituted for the specific embodiments shown. Therefore, it is manifestly intended that this invention be limited only by the claims and the equivalents thereof.

Example Embodiments

Example 1 includes a distributed antenna switch comprising: a plurality of first interfaces, each of the plurality of first interfaces configured to receive a downlink serialized data stream from a different network interface across a different first digital communication link; at least one second interface, the at least one second interface configured to communicate an aggregate downlink serialized data stream to a remote antenna unit over a second digital communication link; and wherein the distributed antenna switch is configured to aggregate the plurality of downlink serialized data streams from the different network interfaces into the aggregate downlink serialized data stream.

Example 2 includes the distributed antenna switch of Example 1, wherein the at least one second interface is further configured to receive an aggregate uplink serialized data stream from the remote antenna unit over the second digital communication link; wherein each of the plurality of first interfaces is further configured to communicate a uplink serialized data stream to the different corresponding network interface across the different corresponding first digital communication link; and wherein the distributed antenna switch is further configured to split the aggregate uplink serialized data stream into each of the uplink serialized data stream.

Example 3 includes the distributed antenna switch of any of Examples 1-2, wherein the distributed antenna switch is configured to aggregate the plurality of downlink serialized data streams from the different network interfaces by being configured to map timeslots from each of the plurality of downlink serialized data streams to timeslots within the aggregate downlink serialized data stream.

Example 4 includes the distributed antenna switch of Example 3, wherein the timeslots from each of the plurality of downlink serialized data streams are interleaved within the aggregate downlink serialized data stream.

Example 5 includes the distributed antenna switch of any of Examples 1-4, wherein at least one first interface of the plurality of first interfaces is configured to receive a second aggregate downlink serialized data stream, wherein the second aggregate downlink serialized data stream is one of the plurality of downlink serialized data streams aggregated into the aggregate downlink serialized data stream.

Example 6 includes the distributed antenna switch of any of Examples 1-5, wherein at least one first interface of the plurality of first interfaces is configured to receive a second aggregate downlink serialized data stream; wherein the distributed antenna switch is further configured to extract at least a first downlink serialized data stream from the second aggregate downlink serialized data stream; and wherein the first downlink serialized data stream is one of the plurality of downlink serialized data streams aggregated into the aggregate downlink serialized data stream.

Example 7 includes the distributed antenna switch of any of Examples 1-6, wherein the downlink serialized data stream received from at least one different network interface across at least one different first digital communication link is a serialized baseband data stream.

Example 8 includes the distributed antenna switch of Example 7, wherein the serialized baseband data stream includes quadrature samples of I/Q pairs.

Example 9 includes the distributed antenna switch of any of Examples 1-8, wherein the at least one second interface includes a plurality of second interfaces, each of the plurality of second interfaces configured to communicate corresponding aggregate downlink serialized data streams to corresponding remote antenna units over corresponding second digital communication links.

Example 10 includes the distributed antenna switch of any of Examples 1-9, wherein the downlink serialized data stream received from at least one of the different first digital communication link includes serialized digital radio frequency signals representing a radio frequency band communicated by a base station.

Example 11 includes the distributed antenna switch of any of Examples 1-10, wherein the downlink serialized data stream received from at least one of the different first digital communication link is a second aggregate downlink serialized data stream including serialized digital radio frequency signals representing a plurality of radio frequency bands communicated by a plurality of base stations.

Example 12 includes the distributed antenna switch of any of Examples 1-11, wherein the downlink serialized data stream received from at least one of the different first digital communication link includes Ethernet frames from an internet protocol network.

Example 13 includes the distributed antenna switch of Example 12, wherein the Ethernet frames are used for wireless local area network (WLAN) backhaul.

Example 14 includes the distributed antenna switch of any of Examples 12-13, further comprising an Ethernet network switch configured to extract Ethernet frames from the at least one downlink serialized data stream received from at least one of the different first digital communication link, the Ethernet network switch further configured to route a subset of packets from the extracted Ethernet frames into the aggregate downlink serialized data stream by integrating the subset of packets into the aggregate downlink serialized data stream.

Example 15 includes the distributed antenna switch of Example 14, wherein the Ethernet network switch is further configured to route a second subset of packets form the extracted Ethernet frames into a second aggregate downlink serialized data stream by integrating the second subset of packets into the aggregate downlink serialized data stream, wherein the second aggregate downlink serialized data stream includes a plurality of downlink serialized data streams from the different network interfaces.

Example 16 includes the distributed antenna switch of any of Examples 1-15, wherein at least one first digital communication link is a fiber optic cable.

Example 17 includes the distributed antenna switch of any of Examples 1-16, wherein the second digital communication link is a fiber optic cable.

Example 18 includes a method of aggregating serialized data streams in a distributed antenna switch, the method comprising: receiving a plurality of downlink serialized data streams from a first plurality of digital communication links; aggregating the plurality of downlink serialized data streams from the different network interfaces into an aggregate downlink serialized data stream; and communicating the aggregate downlink serialized data stream to a remote antenna unit over a second digital communication link.

Example 19 includes the method of Example 18, wherein aggregating the plurality of downlink serialized data streams from the different network interfaces into the aggregate downlink serialized data stream includes mapping timeslots from each of the plurality of downlink serialized data streams to timeslots within the aggregate downlink serialized data stream.

Example 20 includes the method of any of Examples 18-19, wherein the timeslots from each of the plurality of downlink serialized data streams are interleaved within the aggregate downlink serialized data stream.

Example 21 includes the method of any of Examples 18-20, further comprising: wherein receiving a plurality of downlink serialized data streams from a first plurality of digital communication links includes receiving a second aggregate downlink serialized data stream; and wherein aggregating the plurality of downlink serialized data streams from the different network interfaces into an aggregate downlink serialized data stream includes aggregating the second aggregate downlink serialized data stream with at least one other downlink serialized data streams into the aggregate downlink serialized data stream.

Example 22 includes the method of any of Examples 18-21, further comprising: wherein receiving a plurality of downlink serialized data streams from a first plurality of digital communication links includes receiving a second aggregate downlink serialized data stream; extracting at least a first downlink serialized data stream from the second aggregate downlink serialized data stream; and wherein aggregating the plurality of downlink serialized data streams from the different network interfaces into an aggregate downlink serialized data stream includes aggregating the first downlink serialized data stream with at least one other downlink serialized data streams into the aggregate downlink serialized data stream.

Example 23 includes the method of any of Examples 18-22, wherein at least one of the plurality of downlink serialized data streams is a serialized baseband data stream.

Example 24 includes the method of Example 23, wherein the serialized baseband data stream includes quadrature samples of I/Q pairs.

Example 25 includes the method of any of Examples 18-24, further comprising communicating the aggregate downlink serialized data stream to a second remote antenna unit over a third digital communication link.

Example 26 includes the method of any of Examples 18-25, wherein receiving a plurality of downlink serialized data streams from a first plurality of digital communication links includes receiving a serialized digital radio frequency stream from at least one of the first plurality of digital communication links, wherein the serialized digital radio frequency stream represents a radio frequency band communicated by a base station.

Example 27 includes the method of any of Examples 18-26, wherein receiving a plurality of downlink serialized data streams from a first plurality of digital communication links includes receiving a second aggregate downlink serialized data stream including serialized digital radio frequency streams representing a plurality of radio frequency bands communicated by a plurality of base stations.

Example 28 includes the method of any of Examples 18-27, wherein receiving a plurality of downlink serialized data streams from a first plurality of digital communication links includes receiving a serialized Ethernet frame stream from at least one of the first plurality of digital communication links, the serialized Ethernet frame stream including Ethernet frames from an internet protocol network.

Example 29 includes the method of Example 28, wherein the Ethernet frames are used for local area network (WLAN) backhaul.

Example 30 includes the method of any of Examples 28-29, further comprising: extracting the Ethernet frames from the serialized Ethernet frame stream; and routing a subset of packets from the extracted Ethernet frames into the aggregate downlink serialized data stream by integrating the subset of packets into the aggregate downlink serialized data stream.

Example 31 includes the method of Example 30, further comprising: routing a second subset of packets from the extracted Ethernet frames into a second aggregate downlink serialized data stream by integrating the second subset of packets into the second aggregate downlink serialized data stream, wherein the second aggregate downlink serialized data stream includes a plurality of downlink serialized data streams received from the first plurality of digital communication links.

Example 32 includes the method of any of Examples 18-31, further comprising: receiving an aggregate uplink serialized data stream from the remote antenna unit over the second digital communication link; splitting the aggregate uplink serialized data stream into a plurality of uplink serialized data streams; and communicating the plurality of uplink serialized data streams through the first plurality of digital communication links.

Example 33 includes the method of any of Examples 18-32, wherein receiving the plurality of downlink serialized data streams from a first plurality of digital communication links includes receiving at least one of the plurality of downlink serialized data streams from at least one of the first plurality of communication links across a fiber optic cable.

Example 34 includes the method of any of Examples 18-33, wherein communicating the aggregate downlink serialized data stream to a remote antenna unit over a second digital communication link includes communicating the aggregate downlink serialized data stream to the remote antenna unit over a fiber optic cable.

Example 35 includes a distributed antenna switch comprising: a first interface configured to receive a first downlink serialized data stream from a first network interface across a first digital communication link; a second interface configured to receive a second downlink serialized data stream from a second network interface across a second digital communication link; a third interface configured to communicate an aggregate downlink serialized data stream to a remote antenna unit over a third digital communication link; and wherein the distributed antenna switch is configured to aggregate the first downlink serialized data stream and the second downlink data stream into the aggregate downlink serialized data stream by mapping first timeslots from the first downlink serialized data stream and second timeslots from the second downlink serialized data stream to third timeslots within the aggregate downlink serialized data stream.

Example 36 includes the distributed antenna system of Example 35, wherein the timeslots from the first downlink serialized data stream are interleaved with timeslots from the second downlink serialized data stream within the aggregate downlink serialized data stream.

What is claimed is:
1. A distributed antenna switch comprising:
a plurality of first interfaces, each of the plurality of first interfaces configured to receive a downlink serialized data stream from a different network interface across a different first digital communication link;
a first plurality of downlink selector/summer functions, each configurable to operate as at least one of a downlink selector and a downlink summer;
while operating as a downlink selector, any of the first plurality of downlink selector/summer functions are configured to generate an aggregate downlink serialized data stream by selecting and interleaving portions of at least two of the plurality of downlink serialized data streams into the aggregate downlink serialized data stream;
while operating as a downlink summer, any of the first plurality of downlink selector/summer functions are configured to generate the aggregate downlink serialized data stream by digitally summing data from timeslots of at least two of the plurality of downlink serialized data streams into the aggregate downlink serialized data stream; and
at least one second interface, the at least one second interface configured to communicate the aggregate downlink serialized data stream to a remote antenna unit over a second digital communication link.

2. The distributed antenna switch of claim 1, further comprising:
   wherein the at least one second interface is further configured to receive a first uplink serialized data stream from the remote antenna unit over the second digital communication link;
   a first plurality of uplink selector/summer functions, each configurable to operate as at least one of an uplink selector and an uplink summer;
   while operating as an uplink selector, any of the first plurality of uplink selector/summer functions are configured to generate an aggregate uplink serialized data stream by selecting and interleaving portions of at least the first uplink serialized data stream with at least one additional uplink serialized data stream into an aggregate uplink serialized data stream;
   while operating as an uplink summer, any of the first plurality of uplink selector/summer functions are configured to generate the aggregate uplink serialized data stream by digitally summing data from timeslots of the first uplink serialized data stream with data from timeslots of at least one additional uplink serialized data stream into the aggregate uplink serialized data stream; and
   wherein each of the plurality of first interfaces is further configured to communicate the aggregate uplink serialized data stream to the different corresponding network interface across the different corresponding first digital communication link.

3. The distributed antenna switch of claim 1, wherein while operating as a downlink selector, any of the first plurality of downlink selector/summer functions are configured to generate the aggregate downlink serialized data stream by mapping timeslots from each of the at least two of the plurality of downlink serialized data streams to timeslots within the aggregate downlink serialized data stream.

4. The distributed antenna switch of claim 3, wherein the timeslots from each of the at least two of the plurality of downlink serialized data streams are interleaved within the aggregate downlink serialized data stream.

5. The distributed antenna switch of claim 1, wherein at least one first interface of the plurality of first interfaces is configured to receive a second aggregate downlink serialized data stream, wherein the second aggregate downlink serialized data stream is one of the plurality of downlink serialized data streams aggregated into the aggregate downlink serialized data stream.

6. The distributed antenna switch of claim 1, wherein a first downlink selector/summer function of the first plurality of downlink selector/summer functions is operating as a downlink selector, providing a first aggregate downlink serialized data stream to the remote antenna unit through the at least one second interface across the second digital communication link, the first aggregate downlink serialized data stream including portions of at least two of the plurality of downlink serialized data streams; and
   wherein a second downlink selector/summer function of the first plurality of downlink selector/summer functions is operating as a downlink summer, providing a second aggregate downlink serialized data stream to a second remote antenna unit through the at least one second interface across a third digital communication link, the second aggregate downlink serialized data stream including a digital summation of data from timeslots of at least two of the plurality of downlink serialized data streams.

7. The distributed antenna switch of claim 1, wherein the downlink serialized data stream received from at least one different network interface across at least one different first digital communication link is a serialized baseband data stream.

8. The distributed antenna switch of claim 7, wherein the serialized baseband data stream includes quadrature samples of I/Q pairs.

9. The distributed antenna switch of claim 1, wherein the at least one second interface includes a plurality of second interfaces, each of the plurality of second interfaces configured to communicate corresponding aggregate downlink serialized data streams to corresponding remote antenna units over corresponding second digital communication links.

10. The distributed antenna switch of claim 1, wherein the downlink serialized data stream received from at least one of the different first digital communication link includes serialized digital radio frequency signals representing a radio frequency band communicated by a base station.

11. The distributed antenna switch of claim 1, wherein the downlink serialized data stream received from at least one of the different first digital communication link is a second aggregate downlink serialized data stream including serialized digital radio frequency signals representing a plurality of radio frequency bands communicated by a plurality of base stations.

12. The distributed antenna switch of claim 1, wherein the downlink serialized data stream received from at least one of the different first digital communication link includes Ethernet frames from an internet protocol network.

13. The distributed antenna switch of claim 12, wherein the Ethernet frames are used for wireless local area network (WLAN) backhaul.

14. The distributed antenna switch of claim 12, further comprising an Ethernet network switch configured to extract Ethernet frames from the at least one downlink serialized data stream received from at least one of the different first digital communication link, the Ethernet network switch further configured to route a subset of packets from the extracted Ethernet frames into the aggregate downlink serialized data stream by integrating the subset of packets into the aggregate downlink serialized data stream.

15. The distributed antenna switch of claim 14, wherein the Ethernet network switch is further configured to route a second subset of packets form the extracted Ethernet frames into a second aggregate downlink serialized data stream by integrating the second subset of packets into the aggregate downlink serialized data stream, wherein the second aggregate downlink serialized data stream includes a plurality of downlink serialized data streams from the different network interfaces.

16. The distributed antenna switch of claim 1, wherein at least one first digital communication link is a fiber optic cable.

17. The distributed antenna switch of claim 1, wherein the second digital communication link is a fiber optic cable.

18. A method of aggregating serialized data streams in a distributed antenna switch, the method comprising:
   receiving a plurality of downlink serialized data streams from a first plurality of digital communication links;
   while operating any of a plurality of downlink selector/summer functions of the distributed antenna switch as a downlink selector, selecting and interleaving portions of at least two of the plurality of corresponding downlink serialized data streams from the different network interfaces into an aggregate downlink serialized data stream at the downlink selector/summer of the distributed antenna switch;

while operating any of the plurality of downlink selector/summer functions of the distributed antenna switch as a downlink summer, digitally summing data from timeslots of at least two of the plurality of corresponding downlink serialized data streams into the aggregate downlink serialized data stream at the downlink selector/summer of the distributed antenna switch; and communicating the aggregate downlink serialized data stream to a remote antenna unit over a second digital communication link.

19. The method of claim 18, wherein while operating any of the plurality of downlink selector/summer functions of the distributed antenna switch as a downlink selector, selecting and interleaving portions of at least two of the plurality of corresponding downlink serialized data streams into the aggregate downlink serialized data stream at the downlink selector/summer of the distributed antenna switch includes mapping timeslots from each of the plurality of downlink serialized data streams to timeslots within the aggregate downlink serialized data stream.

20. The method of claim 19, wherein the timeslots from each of the at least two of the plurality of downlink serialized data streams are interleaved within the aggregate downlink serialized data stream.

21. The method of claim 18, further comprising:
wherein receiving a plurality of downlink serialized data streams from a first plurality of digital communication links includes receiving a second aggregate downlink serialized data stream; and
wherein aggregating the plurality of downlink serialized data streams from the different network interfaces into an aggregate downlink serialized data stream includes aggregating the second aggregate downlink serialized data stream with at least one other downlink serialized data streams into the aggregate downlink serialized data stream.

22. The method of claim 18, further comprising:
wherein while operating any of the plurality of downlink selector/summer functions of the distributed antenna switch as a downlink selector, providing a first aggregate downlink serialized data stream to the remote antenna unit through the at least one second interface across the second digital communication link, the first aggregate downlink serialized data stream including portions of at least two of the plurality of downlink serialized data streams; and
wherein while operating any of the plurality of downlink selector/summer functions of the distributed antenna switch as a downlink summer, providing a second aggregate downlink serialized data stream to the remote antenna unit through the at least one second interface across the second digital communication link, the second aggregate downlink serialized data stream including a digital summation of data from timeslots of at least two of the plurality of downlink serialized data streams.

23. The method of claim 18, wherein at least one of the plurality of downlink serialized data streams is a serialized baseband data stream.

24. The method of claim 23, wherein the serialized baseband data stream includes quadrature samples of I/Q pairs.

25. The method of claim 18, further comprising communicating the aggregate downlink serialized data stream to a second remote antenna unit over a third digital communication link.

26. The method of claim 18, wherein receiving a plurality of downlink serialized data streams from a first plurality of digital communication links includes receiving a serialized digital radio frequency stream from at least one of the first plurality of digital communication links, wherein the serialized digital radio frequency stream represents a radio frequency band communicated by a base station.

27. The method of claim 18, wherein receiving a plurality of downlink serialized data streams from a first plurality of digital communication links includes receiving a second aggregate downlink serialized data stream including serialized digital radio frequency streams representing a plurality of radio frequency bands communicated by a plurality of base stations.

28. The method of claim 18, wherein receiving a plurality of downlink serialized data streams from a first plurality of digital communication links includes receiving a serialized Ethernet frame stream from at least one of the first plurality of digital communication links, the serialized Ethernet frame stream including Ethernet frames from an internet protocol network.

29. The method of claim 28, wherein the Ethernet frames are used for local area network (WLAN) backhaul.

30. The method of claim 28, further comprising:
extracting the Ethernet frames from the serialized Ethernet frame stream; and
routing a subset of packets from the extracted Ethernet frames into the aggregate downlink serialized data stream by integrating the subset of packets into the aggregate downlink serialized data stream.

31. The method of claim 30, further comprising:
routing a second subset of packets from the extracted Ethernet frames into a second aggregate downlink serialized data stream by integrating the second subset of packets into the second aggregate downlink serialized data stream, wherein the second aggregate downlink serialized data stream includes a plurality of downlink serialized data streams received from the first plurality of digital communication links.

32. The method of claim 18, further comprising:
receiving a first uplink serialized data stream at the distributed antenna switch from the remote antenna unit over the second digital communication link;
while operating any of a plurality of uplink selector/summer functions of the distributed antenna switch as an uplink selector, selecting and interleaving portions of at least the first uplink serialized data stream with at least one additional uplink serialized data stream into an aggregate uplink serialized data stream;
while operating any of the plurality of uplink selector/summer functions of a distributed antenna switch as an uplink summer, digitally summing data from timeslots of the first uplink serialized data stream with data from timeslots of at least one additional uplink serialized data stream into the aggregate uplink serialized data stream; and
communicating the aggregate uplink serialized data stream through the first plurality of digital communication links.

33. The method of claim 18, wherein receiving the plurality of downlink serialized data streams from a first plurality of digital communication links includes receiving at least one of the plurality of downlink serialized data streams from at least one of the first plurality of communication links across a fiber optic cable.

34. The method of claim 18, wherein communicating the aggregate downlink serialized data stream to a remote antenna unit over a second digital communication link includes communicating the aggregate downlink serialized data stream to the remote antenna unit over a fiber optic cable.

35. A distributed antenna switch comprising:
- a first interface configured to receive a first downlink serialized data stream from a first network interface across a first digital communication link;
- a second interface configured to receive a second downlink serialized data stream from a second network interface across a second digital communication link;
- a first selector/summer function, configurable to operate as at least one of a first downlink selector and a first downlink summer;
- while operating as a first downlink selector, the first selector/summer function is configured to generate a first aggregate downlink serialized data stream by selecting and interleaving portions of the first downlink serialized data stream and the second downlink serialized data stream into the first aggregate downlink serialized data stream;
- while operating as a first downlink summer, the first selector/summer function is configured to generate a first aggregate downlink serialized data stream by digitally summing data from timeslots of the first downlink serialized data stream and data from timeslots of the second downlink serialized data stream into the first aggregate downlink serialized data stream;
- a second selector/summer function, configurable to operate as at least one of a second downlink selector and a second downlink summer;
- while operating as a second downlink selector, the second selector/summer function is configured to generate a second aggregate downlink serialized data stream by selecting and interleaving portions of the first downlink serialized data stream and the second downlink serialized data stream into the second aggregate downlink serialized data stream;
- while operating as a second downlink summer, the second selector/summer function is configured to generate a second aggregate downlink serialized data stream by digitally summing data from timeslots of the first downlink serialized data stream and data from timeslots of the second downlink serialized data stream into the second aggregate downlink serialized data stream; and
- a third interface configured to communicate at least one of the first aggregate downlink serialized data stream and the second aggregate downlink serialized data stream to a remote antenna unit over a third digital communication link.

36. The distributed antenna system of claim 35, wherein the timeslots from the first downlink serialized data stream are interleaved with timeslots from the second downlink serialized data stream within the first aggregate downlink serialized data stream.

* * * * *